United States Patent
Richards et al.

(10) Patent No.: US 9,677,370 B2
(45) Date of Patent: *Jun. 13, 2017

(54) DEFORMABLE PLUG AND SEAL WELL SYSTEM

(71) Applicant: Halliburton Energy Services, Inc., Houston, TX (US)

(72) Inventors: William Mark Richards, Flower Mound, TX (US); Andy Cheng Chang, Houston, TX (US); Timothy Edward Harms, The Colony, TX (US); Charles Timothy Smith, McKinney, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/414,667

(22) PCT Filed: Jun. 6, 2014

(86) PCT No.: PCT/US2014/041350
§ 371 (c)(1),
(2) Date: Jan. 13, 2015

(87) PCT Pub. No.: WO2014/197829
PCT Pub. Date: Dec. 11, 2014

(65) Prior Publication Data
US 2015/0167424 A1 Jun. 18, 2015

Related U.S. Application Data

(60) Provisional application No. 61/831,710, filed on Jun. 6, 2013.

(51) Int. Cl.
*E21B 33/13* (2006.01)
*E21B 33/134* (2006.01)
(Continued)

(52) U.S. Cl.
CPC ............... *E21B 33/10* (2013.01); *C09K 8/42* (2013.01); *C09K 8/487* (2013.01); *E21B 21/003* (2013.01);
(Continued)

(58) Field of Classification Search
CPC .... E21B 33/1208; E21B 33/128; E21B 33/16; E21B 33/13; E21B 33/134; E21B 33/12;
(Continued)

(56) References Cited

U.S. PATENT DOCUMENTS 3,984,604 A   10/1976   King et al.
4,102,401 A   7/1978    Erbstoesser
(Continued)

FOREIGN PATENT DOCUMENTS

EP   906927   4/1999
EP   915118   5/1999
(Continued)

OTHER PUBLICATIONS

Authorized Officer Jong Kyung Lee, PCT International Search Report and Written Opinion of the International Searching Authority, PCT/US2014/041350, Oct. 7, 2014, 9 pages.
(Continued)

*Primary Examiner* — Doug Hutton, Jr.
*Assistant Examiner* — Charles Nold
(74) *Attorney, Agent, or Firm* — John W. Wustenberg; Parker Justiss, P.C.

(57) ABSTRACT

A well system includes a drop plug element and an internal plug seat in an internal flow path of a well tubing. At least one of the plug seat or the drop plug element includes a polymer that is deformable, having a first stiffness when subjected to a first strain rate, to allow the drop plug element to pass through the plug seat. The polymer resists deformation, having a second, higher stiffness when subjected to a
(Continued)

second, higher strain rate, to resist allowing the plug element to pass through the plug seat and to seal the plug element and plug seat.

23 Claims, 16 Drawing Sheets

(51) Int. Cl.
*E21B 33/10* (2006.01)
*E21B 33/12* (2006.01)
*E21B 33/16* (2006.01)
*E21B 34/14* (2006.01)
*E21B 34/00* (2006.01)
*C09K 8/42* (2006.01)
*C09K 8/487* (2006.01)
*E21B 21/00* (2006.01)
*E21B 33/138* (2006.01)

(52) U.S. Cl.
CPC .......... *E21B 33/1208* (2013.01); *E21B 33/13* (2013.01); *E21B 33/134* (2013.01); *E21B 33/138* (2013.01); *E21B 33/16* (2013.01); *E21B 34/00* (2013.01); *E21B 34/14* (2013.01); *E21B 2033/105* (2013.01); *E21B 2034/002* (2013.01)

(58) Field of Classification Search
CPC .... E21B 33/1293; E21B 43/261; C09L 8/422; C09L 8/426
See application file for complete search history.

(56) References Cited

U.S. PATENT DOCUMENTS

| | | | |
|---|---|---|---|
| 4,702,316 A | 10/1987 | Chung et al. |
| 4,734,485 A | 3/1988 | Bartmann et al. |
| 5,064,884 A | 11/1991 | Kohler et al. |
| 5,096,209 A | 3/1992 | Ross |
| 5,112,932 A | 5/1992 | Koenig et al. |
| 5,122,588 A | 6/1992 | Koch et al. |
| 5,253,709 A | 10/1993 | Kendrick et al. |
| 5,352,727 A | 10/1994 | Okada |
| 5,374,668 A | 12/1994 | Kanemura et al. |
| 5,405,688 A | 4/1995 | Decker et al. |
| 5,977,202 A | 11/1999 | Chawla et al. |
| 6,008,293 A | 12/1999 | Nakano et al. |
| 6,011,122 A | 1/2000 | Puyenbroek |
| 6,153,719 A | 11/2000 | Abbey et al. |
| 6,194,495 B1 | 2/2001 | Yeager et al. |
| 6,207,786 B1 | 3/2001 | Ishida et al. |
| 6,239,232 B1 | 5/2001 | Camberlin et al. |
| 6,242,083 B1 | 6/2001 | McGrail et al. |
| 6,265,476 B1 | 7/2001 | Krongauz et al. |
| 6,316,516 B1 | 11/2001 | Chien et al. |
| 6,323,255 B1 | 11/2001 | Snowwhite |
| 6,355,751 B1 | 3/2002 | Hale et al. |
| 6,359,025 B1 | 3/2002 | Snowwhite et al. |
| 6,403,229 B2 | 6/2002 | Yeager et al. |
| 6,403,684 B1 | 6/2002 | Jin et al. |
| 6,548,608 B2 | 4/2003 | Camberlin et al. |
| 6,572,971 B2 | 6/2003 | Martin |
| 6,632,893 B2 | 10/2003 | Konarski et al. |
| 6,753,365 B2 | 6/2004 | Brown et al. |
| 6,875,804 B2 | 4/2005 | Zhang et al. |
| 6,890,973 B2 | 5/2005 | Zhang et al. |
| 6,894,102 B2 | 5/2005 | Merfeld |
| 6,998,497 B2 | 2/2006 | Earle et al. |
| 7,026,411 B1 | 4/2006 | Carter et al. |
| 7,037,958 B1 | 5/2006 | Hansen et al. |
| 7,115,681 B2 | 10/2006 | Shimo-Ohsako et al. |
| 7,163,973 B2 | 1/2007 | Ahsan |
| 7,579,408 B2 | 8/2009 | Walton et al. |
| 2003/0037921 A1 | 2/2003 | Goodson, Jr. |
| 2004/0099447 A1 | 5/2004 | Howlett et al. |
| 2004/0157949 A1 | 8/2004 | Hu et al. |
| 2005/0009980 A1 | 1/2005 | Swedo et al. |
| 2005/0054787 A1 | 3/2005 | Swedo et al. |
| 2005/0171237 A1 | 8/2005 | Patel et al. |
| 2006/0243455 A1 | 11/2006 | Telfer et al. |
| 2006/0293172 A1 | 12/2006 | Rubinsztajn et al. |
| 2007/0144734 A1 | 6/2007 | Xu et al. |
| 2007/0169935 A1 | 7/2007 | Akbar et al. |
| 2007/0240877 A1 | 10/2007 | O'Malley et al. |
| 2008/0060820 A1* | 3/2008 | Bour .................. C04B 26/04 166/386 |
| 2008/0217025 A1 | 9/2008 | Ruddock et al. |
| 2009/0253852 A1 | 10/2009 | Noguchi et al. |
| 2009/0286910 A1 | 11/2009 | Bloomfield |
| 2012/0329896 A1 | 12/2012 | Bloomfield |
| 2013/0014948 A1 | 1/2013 | Gambier et al. |
| 2013/0178558 A1 | 7/2013 | Rousse et al. |
| 2014/0083702 A1* | 3/2014 | Godfrey .............. C09K 8/422 166/295 |
| 2015/0060069 A1 | 3/2015 | Potapenko et al. |

FOREIGN PATENT DOCUMENTS

| | | |
|---|---|---|
| WO | WO99/00451 | 1/1999 |
| WO | WO 02/081864 | 10/2002 |
| WO | WO2011/112699 | 9/2011 |
| WO | WO2012/091758 | 7/2012 |

OTHER PUBLICATIONS

Chen et al., "Creep Behavior of Amorphous Ethylene-Sytrene Interpolymers in the Glass Transition Region," Journal of Polymer Scienct: Part B: Polymer Physics, vol. 37, 2373-2382, John Wiley & Sons, Inc., 1999, 10 pages.

Bloomfield, "Viscoelastic Silicone Rubber Devices and Related Methods", Mar. 7, 2012, 2 pages.

Samarrai, "U. Va. Physicist Bloomfield Develops New Silicone Rubber", UVA Today, Feb. 27, 2013, 2 pages.

"Physicist Develops New Silicone Rubber", Science Daily, University of Virginia, Feb. 28, 2013, 2 pages. http://www.sciencedaily.com/releases/2013/02/130228155517.htm.

PCT International Preliminary Report on Patentability, PCT/US2014/041350, Dec. 17, 2015, 6 pages.

* cited by examiner

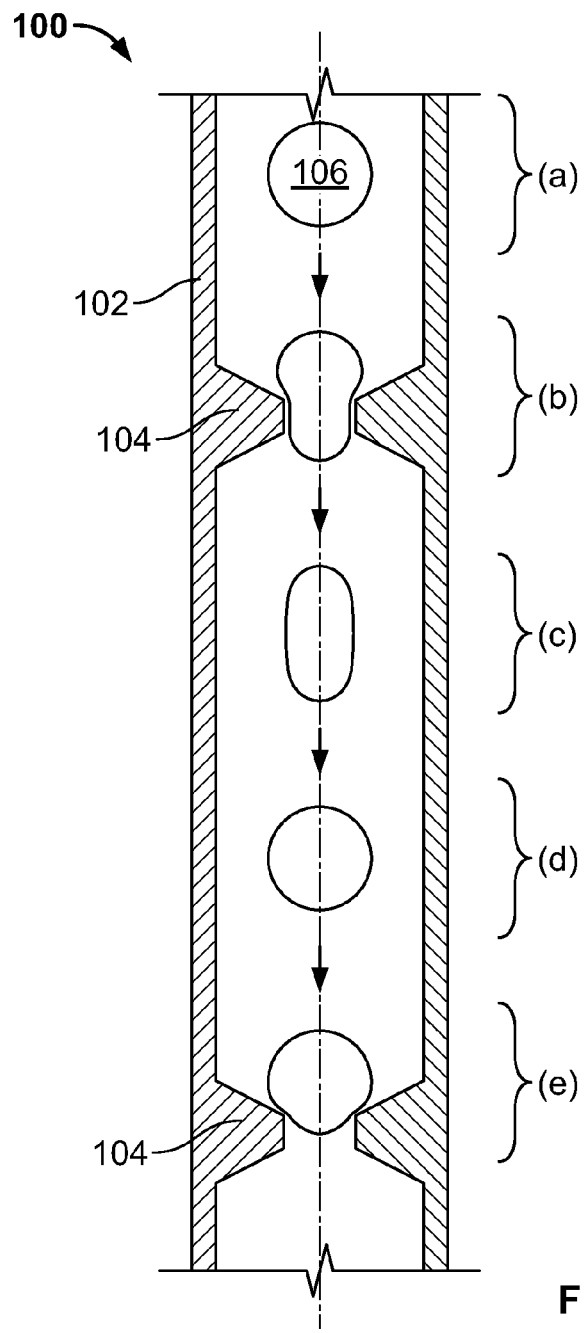
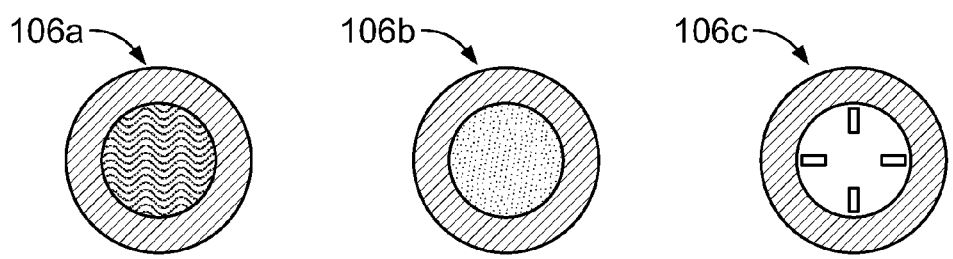
FIG. 2
FIG. 3

DEFORMABLE PLUG AND SEAL WELL SYSTEM

CLAIM OF PRIORITY

This application is a 371 National Phase Application of and claims the benefit of priority to PCT Application No. PCT/US2014/041350, for DEFORMABLE PLUG AND SEAL WELL SYSTEM, which was filed on 6 Jun. 2014, which claims priority to and the benefit of the filing date of U.S. Patent Application No. 61/831,710, for WELL APPLICATIONS OF HIGH CREEP, HIGH RECOVERY POLYMER, which was filed on 6 Jun. 2013, and which is incorporated here by reference.

BACKGROUND

The present disclosure relates to well applications of polymer materials in well tools and/or as well tools, for example, plugs and plug seats, fluid loss systems, well seal tools, and/or cementing tools.

Well tools are used in various operations in a wellbore, such as completion well tools in a production well, drilling well tools in a well being drilled, and testing well tools in a well being tested. Many varieties of downhole well tools are used to drill, treat, and/or produce wells. In some instances, activating and/or sealing a wellbore, a restriction in a wellbore, and/or a well tool is an important operation, for example, in hydrocarbon-producing wells. Tools and materials used to complete well operations sometimes vary based on a specific operation of a well tool. For example, metal balls are often used to engage and plug a ball seat to pressurize a downhole tubing, set a packer in a wellbore, activate a sliding sleeve, or for other operations. In some examples, swellable rubber is sometimes used in isolation packers to swell and seal against walls of a wellbore. Downhole well tools are sometimes limited to a single operation, becoming a restriction after the operation is complete. For example, after a metal ball is used to plug a ball seat, the metal ball is sometimes unusable for another operation and may constrict a fluid flow path in a well.

DESCRIPTION OF DRAWINGS

FIG. 2 is a schematic partial cross-sectional view of an example well tool that can be used in the well system of FIG. 1.

FIG. 3 is a cross-sectional view of example drop plug elements that can be used in the well tool of FIG. 2.

Like reference symbols in the various drawings indicate like elements.

DETAILED DESCRIPTION

This disclosure describes the use of a high creep, high recovery polymer in a variety of well systems and well applications. A stiffness of the high creep, high recovery polymer can be modified due to a variety of factors, for example, strain rate, pressure, temperature, fluid density, and flow rate of a fluid acting on the polymer. In some instances, a high creep, high recovery polymer is used in drop plug elements and plug seats to selectively pass and/or seal a well tool or other component of a well system.

Figure 1:
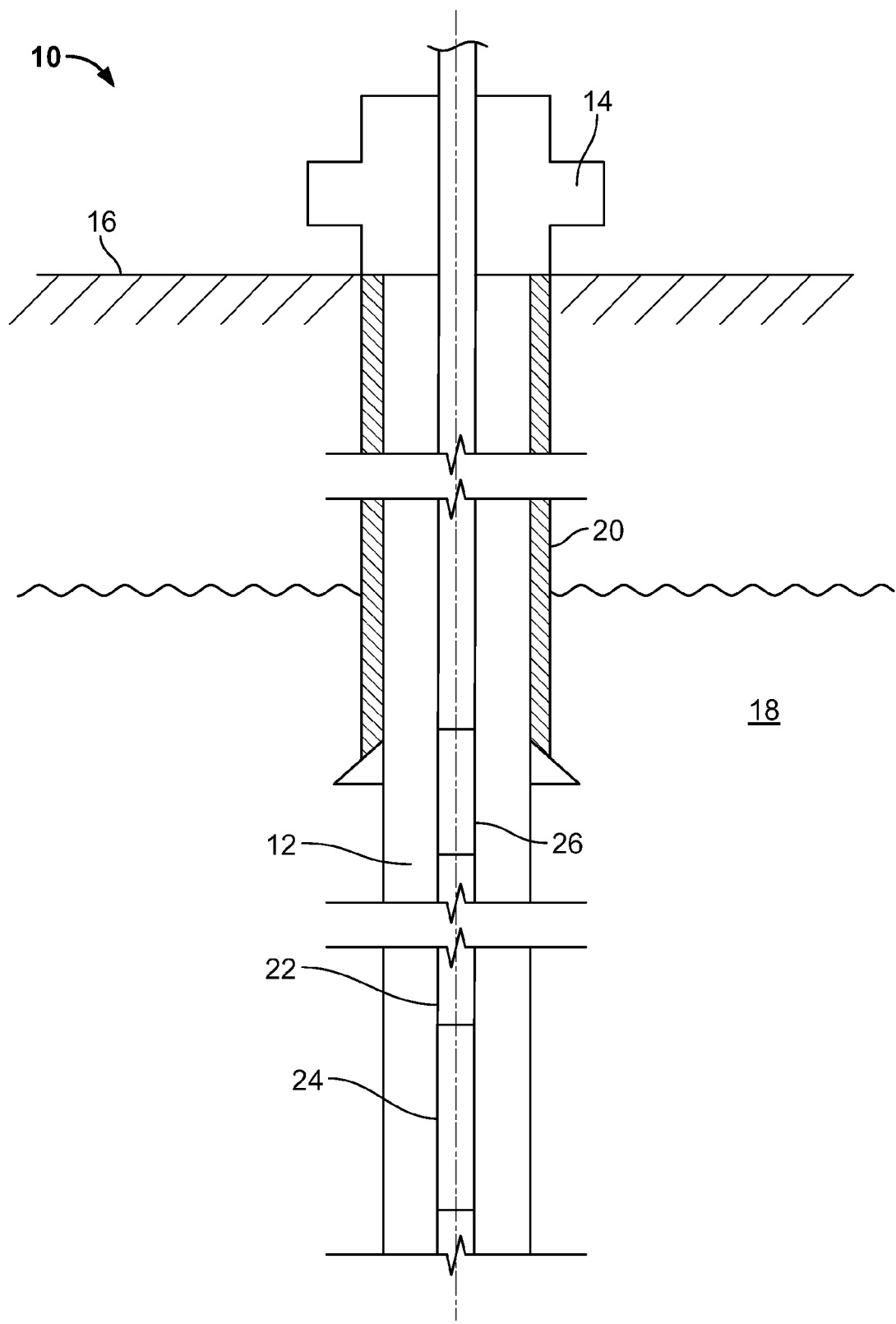
FIG. 1 is a schematic partial cross-sectional view of an example well system.

Referring first to FIG. 1, an example well system 10 generally includes a substantially cylindrical wellbore 12 that extends from a wellhead 14 at a surface 16 downward into the Earth into one or more subterranean zones of interest 18 (one shown). The subterranean zone 18 can correspond to a single formation, a portion of a formation, or more than one formation accessed by the well system 10, and a given well system 10 can access one, or more than one, subterranean zone 18. A portion of the wellbore 12 extending from the wellhead 14 to the subterranean zone 18 is lined with lengths of tubing, called casing 20. The depicted well system 10 is a vertical well, with the wellbore 12 extending substantially vertically from the surface 16 to the subterranean zone 18. The concepts herein, however, are applicable to many other different configurations of wells, including horizontal, slanted or otherwise deviated wells, and multilateral wells with legs deviating from an entry well.

A well string 22 is shown as having been lowered from the surface 16 into the wellbore 12. In some instances, the well string 22 is a series of jointed lengths of tubing coupled together end-to-end and/or a continuous (i.e., not jointed) coiled tubing. The well string 22 can include a drill string, a production string, completion string, well testing tubing, and/or other types of well strings. The well string 22 includes one or more well tools (two shown), for example, a downhole plug assembly 24 and an additional well tool 26.

Referring to FIG. 2, an example well tool 100 that can be used in the example downhole plug assembly 24 of FIG. 1 is shown in a schematic cross-sectional side view. The example well tool 100 includes a well tubing 102 with an internal plug seat 104 (two shown) in an internal flow path of the well tubing 102. A drop plug element 106 is shown in sequential stages (a) through (e) from the top to the bottom of FIG. 2. The drop plug element 106 is introduced into the well, for example, by dropping from the surface into the wellbore and/or being pumped down the wellbore through the well tubing 102 or another tubing toward the plug seat 104. The drop plug element 106 can selectively seat on the plug seat 104 to seal against passage of fluids or pass (e.g., pump through) the plug seat 104 as desired by an operator. The internal plug seat 104, the drop plug element 106, or both the internal plug seat 104 and the drop plug element 106 includes a polymer that is deformable and has a first stiffness when the polymer is subjected to a first strain rate, and resists deformation and has a second, higher stiffness when the polymer is subjected to a second, higher strain rate. The drop plug element 106 is adapted to engage, seal, activate, and/or pass through the internal plug seat 104 based on a specified strain rate of the polymer, for example, due to applied stress on the polymer by a fluid in the internal flow path. In some instances, the stiffness of the polymer is responsive to the stress applied on the polymer from one or more fluid characteristics of the fluid in the internal flow path, for example, pressure, flow rate, temperature, and/or fluid density. The polymer is deformable at the first stiffness of the polymer, for example, to allow the drop plug element to pass through the plug seat as shown in stages (a) through (c). The polymer resists deformation at the second, higher stiffness, for example, to resist allowing the drop plug element to pass through the internal plug seat and to seal the drop plug element and internal plug seat as shown in stages (d) through (e). Generally, the stiffness of the polymer is the stress on the polymer over the strain of the polymer. The stiffness of the polymer can be described in terms of the storage modulus (E'), the loss modulus (E"), the glass-transition temperature (Tg), and other characteristics of the polymer, each described below.

The drop plug element 106 can take many forms. In FIG. 2, the drop plug element 106 is substantially spherical (e.g., a ball) and made substantially of the polymer. The drop plug element 106 has a largest outer diameter that is larger than a smallest inner diameter of the internal plug seat 104. In certain examples, the drop plug element 106 is a conventional ball covered with a thin layer of the polymer, for example, to promote improved performance and/or sealing ability of the ball with a ball seat. In some instances, the drop plug element is a different shape and/or includes additional material or materials. For example, the drop plug element can be a dart-shaped, disc-shaped, egg-shaped, cone-shaped, rod-shaped, hour-glass shaped, dumbbell shaped, or shaped in another way. FIG. 3 shows example drop plug elements 106a, 106b, and 106c, each with a core surrounded by the polymer. A drop plug element can have a core of a variety of materials (e.g., metals such as brass, steel, and aluminum, slurry, foam, fluid, thermoplastic, elastomeric, ceramic, and/or other). For example, drop plug element 106a includes a core of disintegrating material, drop plug element 106b includes a core with a mixture of sand and salt, and drop plug element 106c includes a composite core with a magnet embedded in the core. In certain instances, the material of the core performs specific functions for a well system. For example, the disintegrating material core of drop plug element 106a can be a disintegrating frac ball including a controlled electrolytic metallic (CEM), a material that can damage and/or deteriorate the polymer to initiate a dissolving process after the drop plug element 106a has actuated a corresponding well tool. In some examples, drop plug element 106c with the composite core including a magnet can activate a magnetic well tool, trigger a magnetic depth sensor, and/or perform other magnetic functions in the well system.

Figure 4:
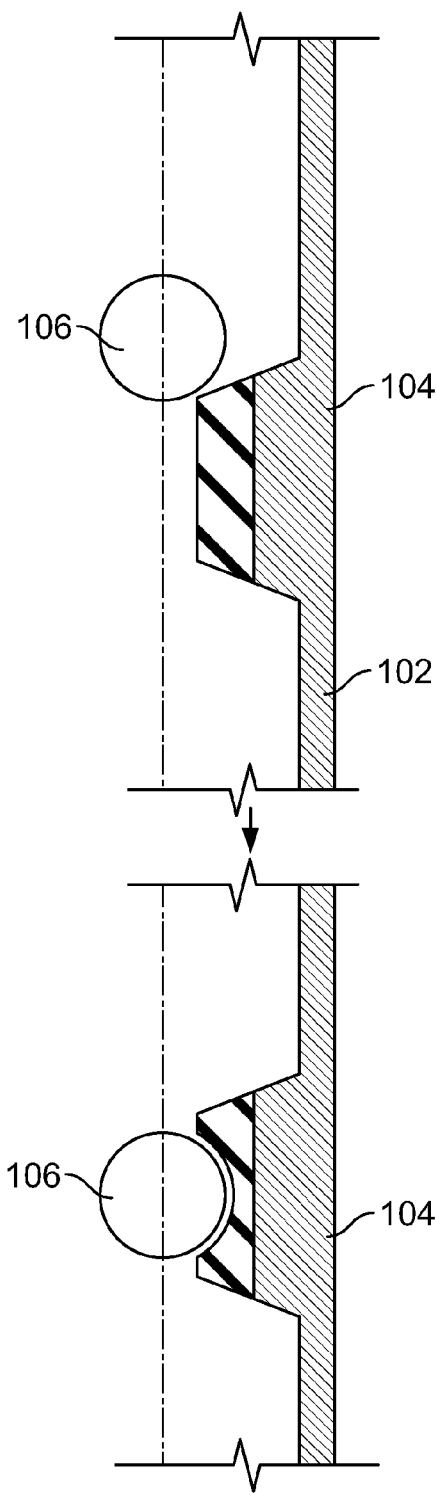
FIG. 4 is a schematic partial cross-sectional view of an example well tool that can be used in the well system of FIG. 1.

FIG. 2 shows the drop plug element 106 as including the polymer that can deform at the first stiffness when subjected to the first strain rate and resist deformation at the second, higher stiffness when subjected to the second, higher strain rate. However, other components of the example well tool 100 can include the polymer, either separately or in addition to the drop plug element 106. For example, as depicted in FIG. 4, the internal plug seat 104 includes the polymer. FIG. 4 shows the internal plug seat 104 and the drop plug element 106 in sequential stages (a) and (b). The polymer of the internal plug seat 104 is deformable when subjected to the first strain rate to allow the drop plug element 106 to pass through the internal plug seat 104. In some instances, the polymer of the internal plug seat 104 includes a ring of the polymer. The ring of the polymer has a smallest inner diameter smaller than a largest outer diameter of the drop plug element 106.

Figure 5:
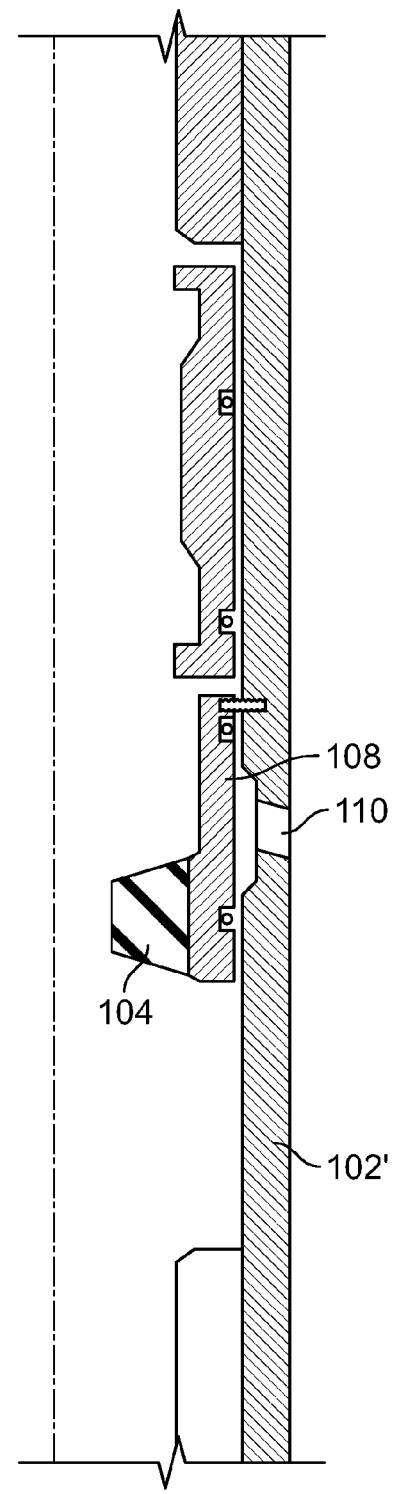
FIG. 5 is a schematic partial cross-sectional view of an example well tool with a sliding sleeve that can be used in the well system of FIG. 1.

In some instances, the well tubing 102 includes additional components that activate when the drop plug element seals against the internal plug seat. In certain instances, the additional components include tools separate from the internal plug seat that can be activated, for example, by a pressure increase in the well tubing 102. Some example additional components separate from (e.g., uphole of) the internal plug seat include tubing dump valves, hydraulic packers, and other tools that can be activated by a pressure differential in the well tubing 102 due to the drop plug element sealing against the internal plug seat. In certain instances, the additional components include tools incorporating the internal plug seat in the well tubing 102. For example, as depicted in FIG. 5, a well tubing 102' includes a shifting sleeve 108 in the well tubing 102'. The shifting sleeve 108 shifts along a longitudinal length of the well tubing 102' when the drop plug element 106 seals to the internal plug seat 104 coupled to the shifting sleeve 108. FIG. 5 shows the internal plug seat 104 as comprising the polymer; however, the drop plug element 106 can include the polymer in addition to or instead of the internal plug seat 104. The shifting sleeve 108, when shifted, opens a flow port 110 in the well tubing 102', for example, to allow fluid flow between the internal flow path of the well tubing 102' and an annulus between the well tubing 102' and walls of a wellbore.

Figure 6:
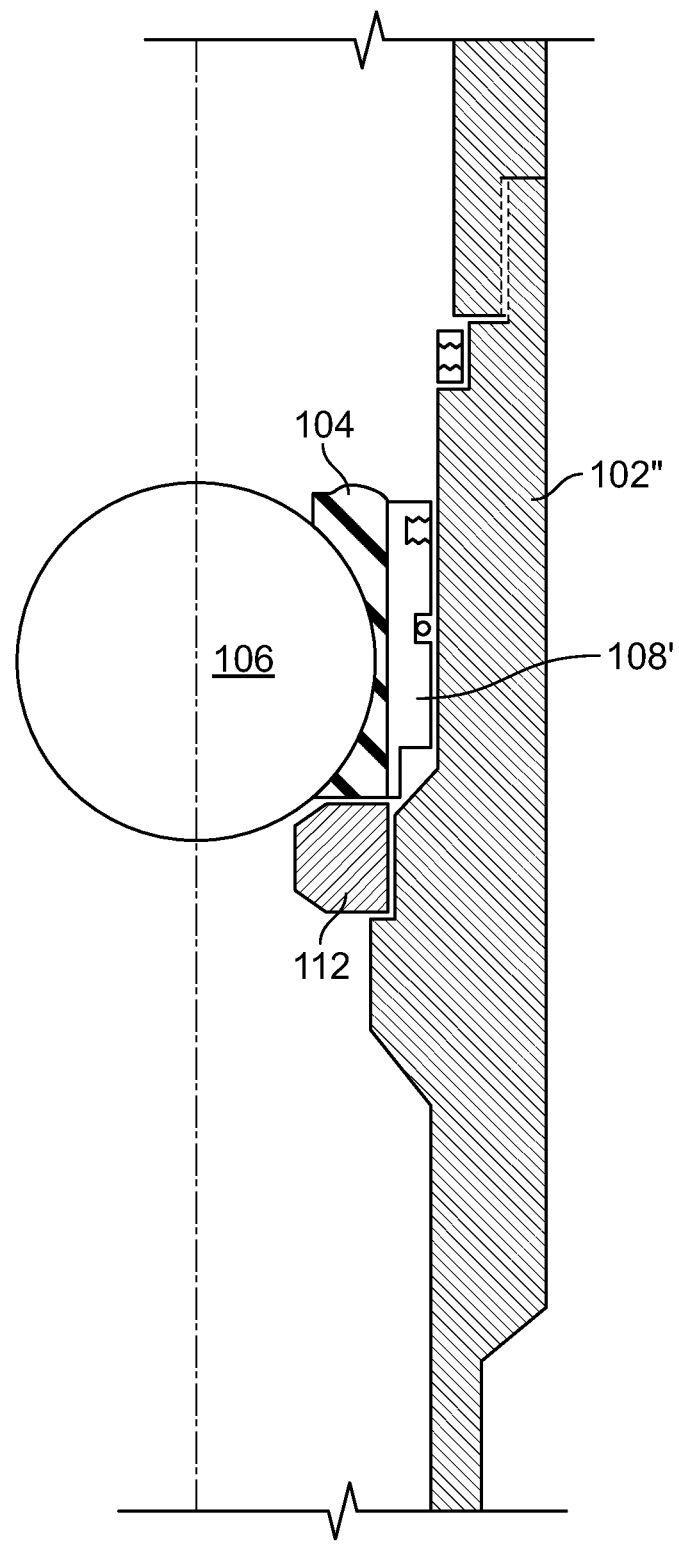
FIG. 6 is a schematic partial cross-sectional view of an example well tool that can be used in the well system of FIG. 1.

FIG. 6 shows a well tubing 102" with a shifting sleeve 108' like the well tubing 102' and shifting sleeve 108 of FIG. 5, except the well tubing 102" does not include the flow port 110, and the well tubing 102" includes a ring 112 adjacent the internal plug seat 104 to block the drop plug element 106 from passing the internal plug seat 104. In some instances, the drop plug element 106 can have a largest outer diameter larger than a smallest inner diameter of the internal plug seat 104, but a largest outer diameter of a solid core of the drop plug element 106 is greater than a smallest inner diameter of the ring 112 to keep the drop plug element from passing through the internal plug seat 104. In certain instances, the ring 112 is a C-ring movable with the shifting sleeve 108 to change from C-ring with a first diameter when the shifting sleeve 108 is in a first position to a C-ring with a second, smaller diameter when the shifting sleeve 108 is in a second, shifted position (e.g., as depicted in FIG. 6). The change in the diameter of the c-ring can be due to a reduction in an inner diameter of the well tubing 102", where the shifting sleeve 108 acts to force the C-ring into the reduced inner diameter area section of the well tubing 102" to compress the C-ring to a smaller diameter and mechanically prevent the drop plug element 106 from passing the C-ring.

Figure 7:
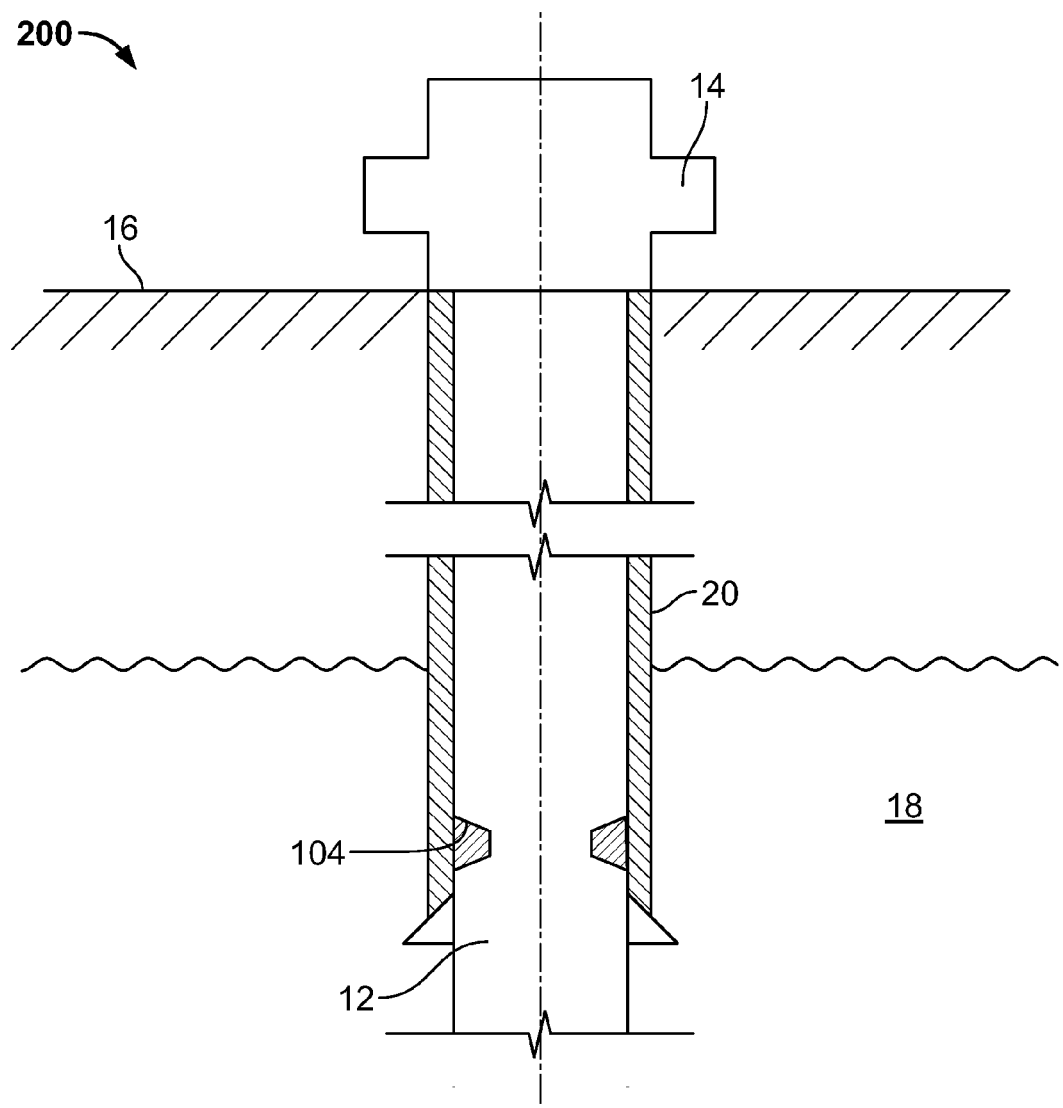
FIG. 7 is a schematic partial cross-sectional view of an example well system.

In some instances, the well tubing is a wellbore casing, a casing liner, and/or other tubular element in the wellbore. For example, as depicted in FIG. 7, an example well system 200 is shown in a partial cross-sectional view. The example well system 200 is like the example well system 10 of FIG. 1, but the casing 20 includes the internal plug seat 104 and the well system 200 excludes the well string 22 and well tools 24 and 26 of FIG. 1. The internal plug seat 104 is shown near a bottom end of the casing 20. However, the internal plug seat 104 can be in a different location on the casing 20.

In some instances, the polymer deforms, in response to the first strain rate, to allow a drop plug element to pass through a plug seat when the polymer has a first stiffness in response to the first strain rate of the polymer. The polymer resists deformation, in response to a second, higher strain rate, to seal the plug seat and the drop plug element and retain the drop plug element at the plug seat. The polymer has a second, higher stiffness in response to the second, higher strain rate. In certain instances, sealing the drop plug element 106 and the internal plug seat 104 activates a well tool. The polymer of the drop plug element 106 and/or the internal plug seat 104 allows the drop plug element 106 to selectively seal against or pass the internal plug seat 104 and/or other internal plug seats in the well tubing 102 or in other downhole locations of a well system. For example, a well tubing can include multiple internal plug seats of the same or different well tool. Two or more or all of the internal plug seats can be the same size, and one or more drop plug elements can selectively seal or pass one or more or all of the internal plug seats. In certain examples, the drop plug element is a viscoelastic polymer ball that is dropped down the well tubing to reach a first ball seat. A pump connected to the well tubing or casing can apply low pressure for a time period to slowly extrude the polymer ball through the ball seat. The pressure can be low enough to not activate or set a tool associated with the first ball seat. The polymer ball deforms as it squeezes through the ball seat, and returns to its original shape after passing the ball seat. This process can be repeated as the polymer ball passes through subsequent ball seats, for example, to a target ball seat. Sudden high pressure or oscillating high pressure (e.g., repeatedly applying the second, higher strain rate) can seal the ball to the target ball seat to activate a corresponding well tool.

The polymer can exhibit high creep, high recovery, viscoelastic characteristics and/or other characteristics that allow the polymer to be extremely resilient in response to sudden impacts, and to deform extensively when subjected to prolonged stresses. The polymer has time dependent stiffness, or in other words, degraded, time-dependent elastic properties. For example, the polymer can be hard (e.g., like a rubber bouncy ball) in that it does not change shape with impact, but will conform to a new shape under prolonged stress then return to an original molded shape when stress (e.g., the prolonged stress) is removed.

Figure 8:
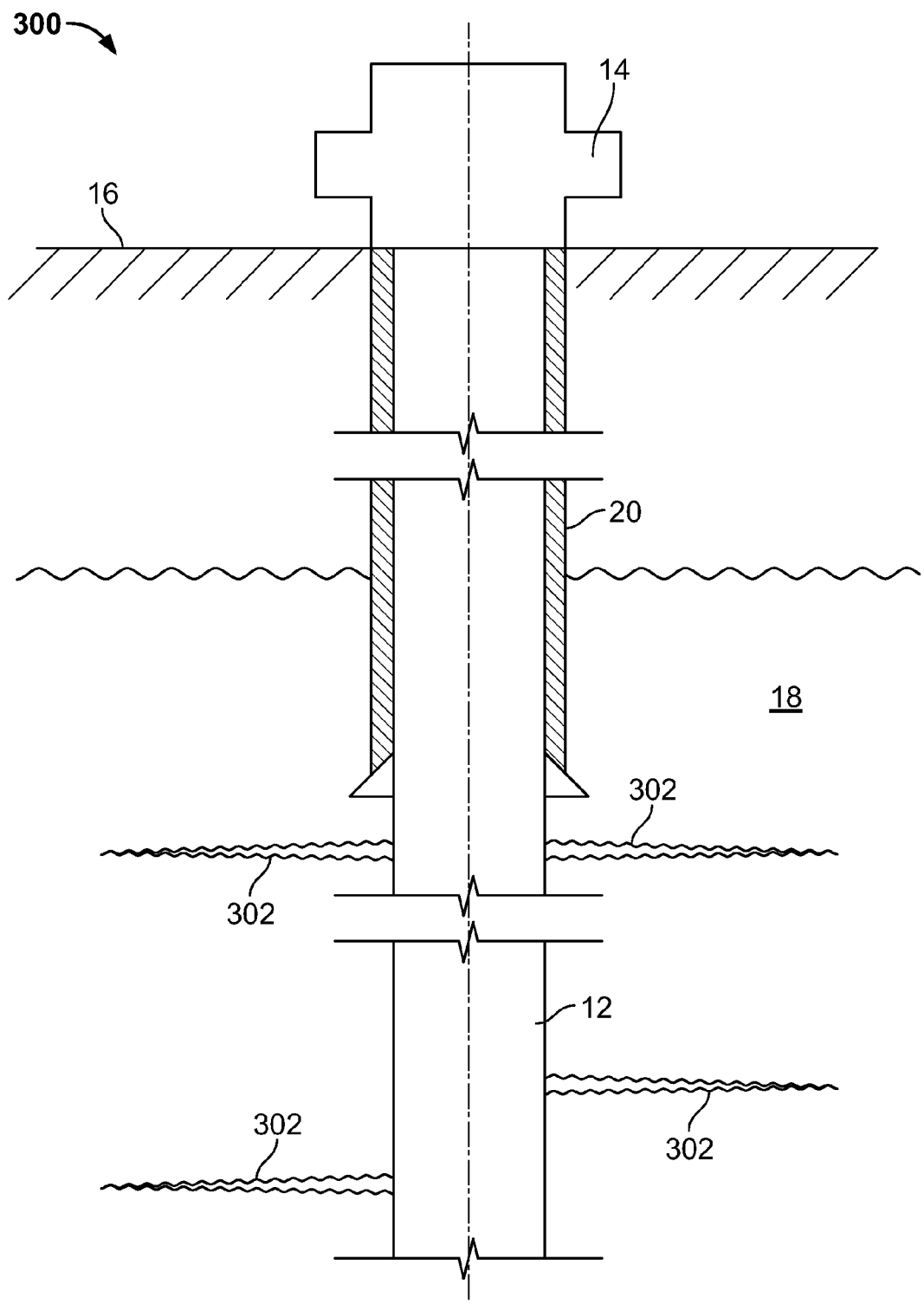
FIG. 8 is a schematic partial cross-sectional view of an example well system with fluid loss openings in a wellbore of the well system.

In some instances, a high creep, high recovery polymer is used to find and plug a fluid loss opening in a well system. Referring to FIG. 8, an example well system 300 is shown in a schematic partial cross-sectional view. The example well system 300 is like the example well system 10 of FIG. 1, except the example well system 300 includes fluid loss openings 302 in walls of the wellbore 12. Although not shown in FIG. 8, the well system 300 can include additional and/or different components, such as the well string 22 and well tools 24 and 26 of FIG. 1, and/or fluid loss openings in the casing 20. Although FIG. 8 shows the fluid loss openings 302 in the walls of the wellbore 12, the fluid loss openings 302 can be elsewhere in the well system 300. Some example fluid loss openings can include natural or man-made fractures in a subterranean zone through which communication of fluids is not desired, an opening in a water production zone of a well system, openings in a damaged portion of a casing or formation, openings in a lost circulation zone for cement slurry, openings in sand screens and inflow control devices (ICDs), and other examples of leaks or undesired fluid flow in a well system.

Figure 9:
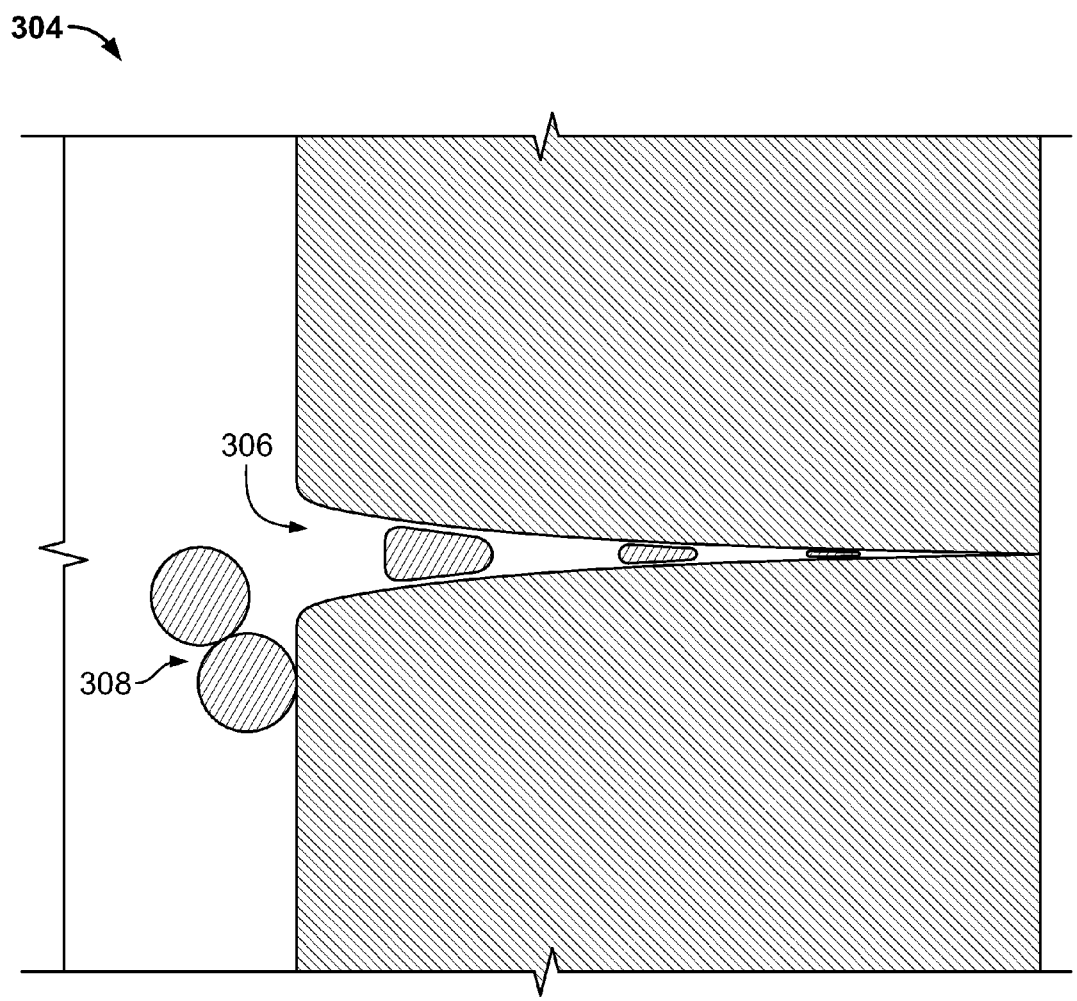
FIG. 9 is a schematic partial cross-sectional view of an example well treatment that can be used in the well system of FIG. 8.

Referring to FIG. 9, an example well treatment 304 for treating a fluid loss opening 306 (e.g., fluid loss openings 302 of FIG. 12) in a well is shown in schematic partial cross-sectional view. The well treatment 304 includes multiple discrete stop loss elements 308 to seal fluid loss opening 306. In some instances, the well treatment 304 includes the stop loss elements 308 entrained in a fluid, gel, or other carrier or stop loss elements 308 alone, apart from a carrier. For example, the stop loss elements 308 can be used as a bridging material for the well treatment 304 in a fluid loss opening, and/or as an additive to the well treatment 304. Some example fluid loss openings include openings in walls of a wellbore, casing, liner, well tool and/or another opening in a well experiencing fluid loss. The discrete stop loss elements 308 include the polymer that is resistive to deformation with an initial stiffness in response to an initial strain rate of the polymer to produce a specified initial pressure signal. The polymer is also deformable with a subsequent, lower stiffness in response to a subsequent, lower strain rate of the polymer to produce a subsequent, different specified pressure signal. The discrete stop loss elements 308 are shown in FIG. 9 as spherical balls of the polymer capable of deforming into the fluid loss opening 306. However, the discrete stop loss elements 308 can be another, different shape, such as dart-shaped, elliptical, disk, flake, ribbon, cone-shaped, or another shape to plug and seal a fluid loss opening. Each of the discrete stop loss elements 308 can be the same size, or two or more or all of the discrete stop loss elements 308 can be different sizes. The discrete stop loss elements 308 can be introduced in the well in a variety of ways, for example, by dropping the stop loss elements 308 from a surface into the well and/or pumping the discrete stop loss elements 308 into the well through a well tubing.

The discrete stop loss elements 308 stick to each other, initially plugging the fluid loss opening 306 to produce the specified initial pressure signal in the well, for example, through a pressure change in fluid in the well. A specified pressure signal (e.g., the initial specified pressure signal and the subsequent, different pressure signal) can be selected so that it is substantially different from and not easily mistaken for noise pressure variations in a wellbore. Also, the initial specified pressure signal is easily distinguishable from the subsequent, different pressure signal. In certain instances, the initial specified pressure signal and the subsequent, different pressure signal can be tailored by selecting the number, size, and/or material of the stop loss elements 308. The initial plugging can be imperfect, such as a leaky seal, as long as the discrete stop loss elements 308 seal the fluid loss opening 306 more than the fluid loss opening 306 leaks. In some instances, the initial pressure signal correlates to the stop loss elements 308 reaching the fluid loss opening 306, causing, for example, a pressure spike in the fluid in the well. The pressure spike can be caused by restricting a fluid flowing through the fluid loss opening 306 with the stop loss elements 308, initially sealing the fluid loss opening 306 from fluid flow to cause the pressure spike in the fluid in the well. The discrete stop loss elements 308 continue to plug the fluid loss opening 306 to produce the subsequent, different specified pressure signal. In some instances, the subsequent, different pressure signal correlates to the stop loss elements 308 deforming to better fill (substantially or completely) the fluid loss opening 306 than the initial plugging, causing a consistently higher pressure signal (e.g., gradual increase in pressure) than the initial pressure signal. In some instances, the subsequent, different pressure signal correlates to the stop loss elements 308 moving deeper into the fluid loss opening (e.g., into a subterranean zone) and filling the fluid loss opening 306. An operator can look for the initial and subsequent, different pressure signals (e.g., pressure spike, gradual pressure increases, and/or others) to know when the stop loss elements 308 initially seal the fluid loss opening 306 and, in some instances, pass into a subterranean zone beyond the fluid loss opening 306. In some instances, the well treatment 304 includes a pressure sensor in the well to assess the pressure signals caused by the discrete stop loss elements 308 sealing the fluid loss opening 306.

In some instances, the initial strain rate of the polymer is a substantially oscillating strain rate to allow the polymer to retain the initial stiffness. For example, the substantially oscillating strain rate can be created by pumping fluid in a well at an oscillating pressure. In some instances, the subsequent, lower strain rate is a substantially constant strain rate to allow the polymer of the discrete stop loss elements 308 to deform at the subsequent, lower stiffness into the fluid loss opening 306. For example, the substantially constant strain rate can be created by pumping fluid in a well at a constant pressure.

Figure 10A:
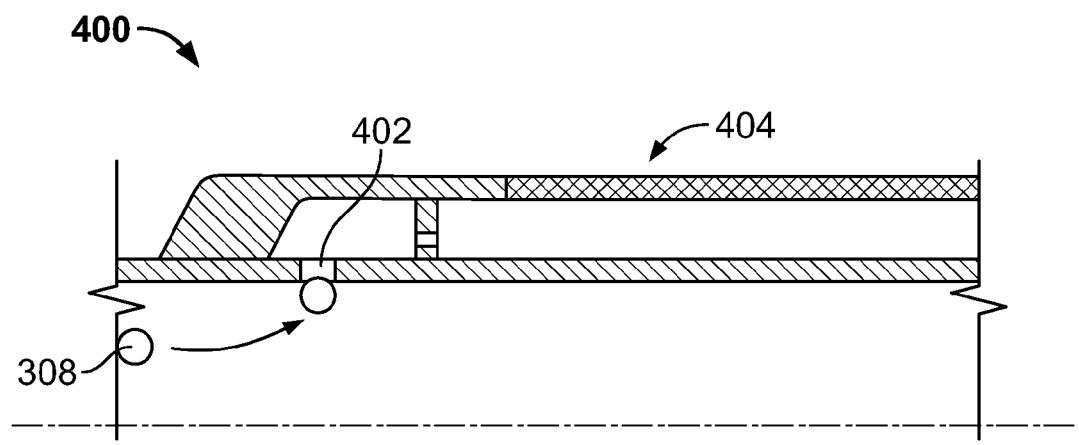
FIGS. 10A and 10B are schematic partial cross-sectional views of example well treatments in example well tools.
Figure 10B:
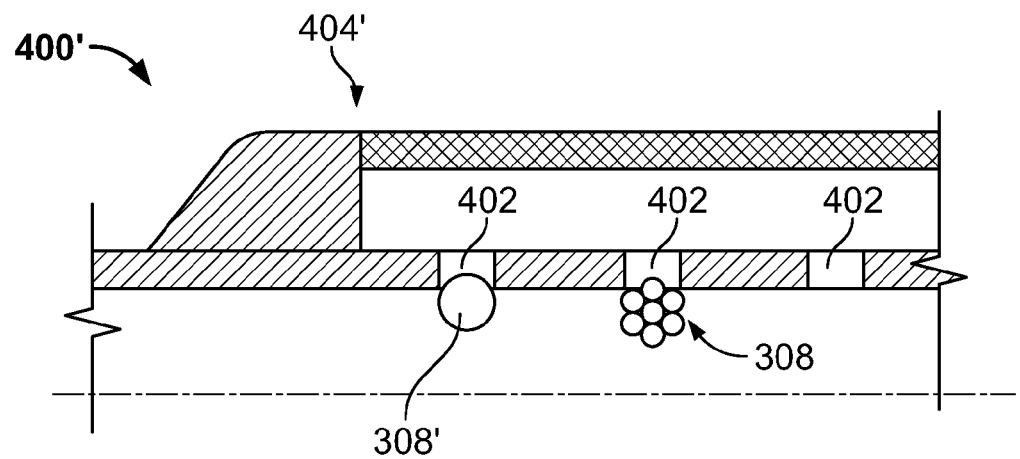

In some instances, a fluid loss opening of a well is an opening of a downhole well tool. For example, referring to FIG. 10A, an example well treatment 400 includes a stop loss element 308 to seal a fluid loss opening 402 of a well tool 404 (e.g., sand screen filter, in-flow control device, and/or other). FIG. 10B shows an example well treatment 400' that is like the example well treatment 400, except well treatment 400' includes a well tool 404' with multiple fluid loss openings 402 in the well tool 404'. Each of the fluid loss openings 402 can be sealed with a single stop loss element 308' or multiple discrete stop loss elements 308. In certain instances, the single stop loss element 308' and/or multiple discrete stop loss elements 308 can pass through the fluid loss opening(s) 402 to unplug the fluid loss opening(s) 402 when the polymer further deforms at the subsequent, lower stiffness, for example, in response to a constant applied stress on the polymer.

In certain instances, materials making up the discrete stop loss elements are introduced into a wellbore for in-well (i.e., in situ) curing of the discrete stop loss elements. For example, materials comprising the stop loss elements can be pumped into the well to form the discrete stop loss elements (e.g., the polymer) in the wellbore, which is described in more detail below. In some instances, discrete stop loss elements are filled with additional material (e.g., filler material, water, oil-swellable rubber, cement, sand, proppant, fiber, chemical treatment, and/or other) to aid in sealing fluid loss openings. For example, discrete stop loss elements can be filled with a sealing material such as cement slurry or a chemical plug to seal a fluid loss opening when the discrete stop loss elements reach the fluid loss opening. Stop loss elements filled with additional material, such as cement slurry or a chemical plug, can carry the additional material deep into the fluid loss opening, then break up and deform to release the additional material. For example, the stop loss elements can initially plug a fluid loss opening at a surface of the fluid loss opening while also sealing a deeper portion of the fluid loss opening with the polymer and/or additional material. In some instances, the plurality of discrete stop loss elements flow in a wellbore or casing in a treatment fluid to the fluid loss opening. The treatment fluid can include a plugging material (e.g., cement, slurry, chemical treatment fluid, and/or other). The discrete stop loss elements initially plug the fluid loss opening to create the pressure signal (i.e., pressure spike) in the wellbore or casing, while the treatment fluid begins to plug the fluid loss opening. The pressure signal can act as an indication that the treatment fluid has reached the fluid loss opening. Both the initial plug of the discrete stop loss elements and the treatment fluid plug may be leaky. In certain instances, while the stop loss elements plug the fluid loss opening, the plugging material forms in the fluid loss opening to create a more permanent plug. For example, cement can cure in the fluid loss opening to create a permanent cement plug in the fluid loss opening.

Figure 11:
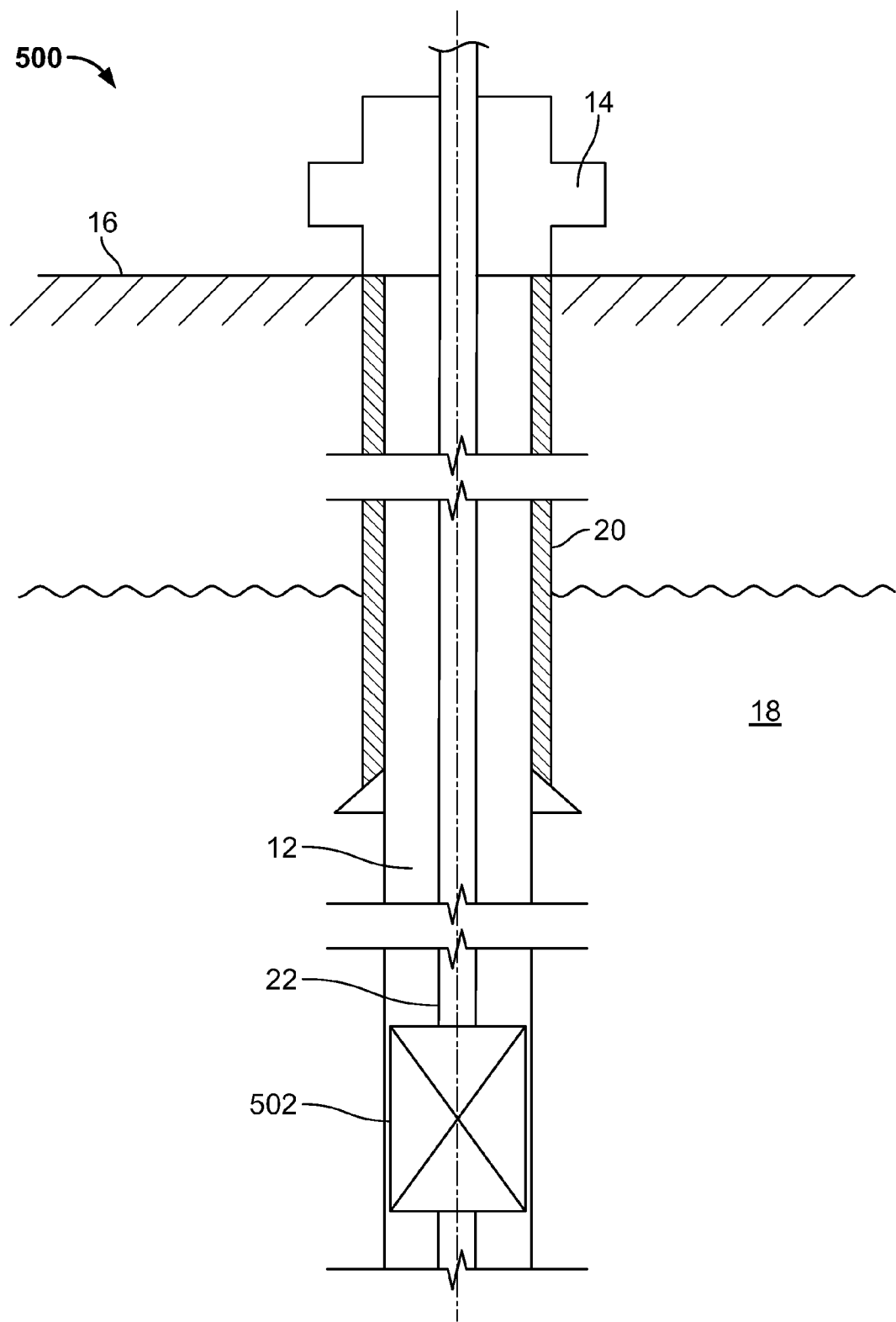
FIG. 11 is a schematic partial cross-sectional view of an example well system with a downhole seal assembly.

In some instances, a high creep, high recovery polymer is used in well seals (e.g., packers, bridge plugs, frac plugs and/or other seals) to seal a wellbore and/or reinforce a wellbore seal of a well system. Referring to FIG. 11, an example well system 500 is shown in a schematic partial cross-sectional view. The example well system 500 is like the example well system 10 of FIG. 1, except the example well system 500 includes a downhole seal assembly 502 that is different from the downhole plug assembly 24 of FIG. 1. The downhole seal assembly 502 includes a well seal tool that creates a seal against the walls of the wellbore 12 or other tubular element of a well (e.g., casing 20, well string 22, and/or other). Each well seal tool includes a seal element including the polymer. The seal element is an element of the seal against the walls of the wellbore 12. Although not depicted in FIG. 11, the example well system 500 can include additional well tools, such as well tool 26 of FIG. 1.

Figure 12:
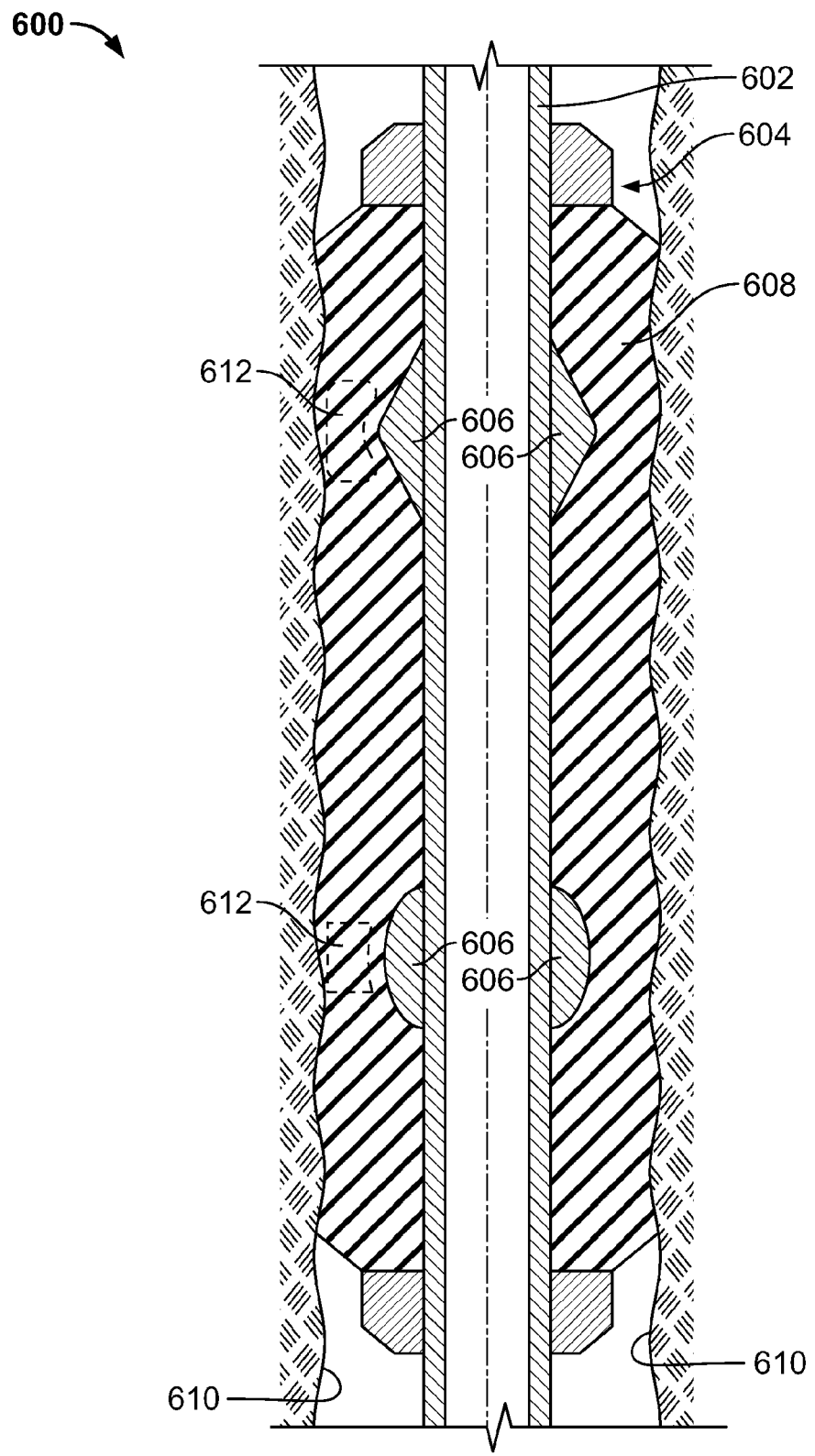
FIG. 12 is a schematic cross-sectional view of an example well seal tool.

Referring to FIG. 12, an example well seal tool 600 that can be used in the downhole seal assembly 502 of FIG. 11 is shown in partial cross-sectional view. The example well tool can be configured as a packer, bridge plug, frac plug and/or other type of plug. The example well seal tool 600 includes a base tubing 602 (e.g., well string 22 of FIG. 11) and a seal element 604 about the base tubing 602 and carried on an exterior of the base tubing 602. In the example well seal tool 600, the seal element 604 includes two rings 606 of the polymer about the base tubing 602 and a swellable material (e.g., swellable rubber 608) about the base tubing 602 and exterior to the rings 606. In some instances, the seal element 604 includes a different number of polymer rings and/or the polymer takes on a different form about the base tubing 602. The seal element 604 (e.g., the polymer) has a first stiffness in response to a first strain rate of the polymer and a second, substantially higher stiffness in response to a second, higher strain rate of the polymer. The polymer of the rings 606 is changeable between a compressed state and a sealing state based in part on the stiffness and strain rate of the polymer, for example, to increase rubber pressure of an exterior of the swellable rubber 608 against wellbore walls 610. In certain instances, the rings 606 can be molded, and the sealing state can correspond to the as-molded shape of the rings 606.

The seal element 604 is shown sealing against the wellbore walls 610, although in other instances, the seal element 604 could seal against the wall of a tubular, such as the casing, liner, well string and/or other tubular in the well. In some instances, the swellable rubber 608 expands (e.g., swells) from an initial, unswelled state when exposed to fluid, such as hydrocarbon-containing fluid, in a wellbore. As the swellable rubber 608 expands, it loses stiffness and causes a lesser strain rate on the polymer of the rings 606 than when in the initial, unswelled state. The seal element 604 seals the wellbore by sealing the swellable rubber 608 against the wellbore walls 610. In some instances, the polymer of the seal element 604 expands from the initial, compressed state to the second, sealing state as depicted in FIG. 12 to reinforce portions of the swellable rubber 608, such as portions 612, against the wellbore walls 610. As the swellable rubber 608 expands, the polymer is subjected to a low strain rate, and therefore provides a low stiffness against expansion of the polymer to the sealing state. Then, if the swellable rubber 608 is subjected to a pressure spike, the polymer is subjected to a high strain rate and provides a high stiffness that supports the swellable rubber 608 against deformation (e.g., disengagement of the swellable rubber 608 from the walls 610 of the wellbore, axial extrusion of the swellable rubber 608 through the annular space between the base tubing 602 and the walls 610 of the wellbore, and/or other deformation of the swellable rubber 608), helping the swellable rubber 608 maintain its seal on the walls 610 of the wellbore. The polymer provides the first stiffness in response to the first strain rate, and provides the second, substantially higher stiffness in response to the second strain rate, both while the seal element 604 seals the wellbore, for example, by pressing the swellable rubber 608 against the wellbore walls 610. In some instances, the well seal tool 600 can have a specified pressure rating at a given temperature for steady-state pressure conditions, and the substantially higher stiffness can allow the well seal tool 600 to maintain a seal for a pressure spike that is 5% or greater (e.g., 5%, 10%, 25%, or 50%) than the specified pressure rating. In certain instances, a substantially higher stiffness and/or a delta between the first stiffness and the second, substantially higher stiffness is greater than would be experienced by butyl, Viton®, or nitrile when exposed to the same strain rates. The strain rate of the polymer depends on a strain characteristic, such as pressure, temperature, fluid flow rate, and fluid density.

Figure 13A:
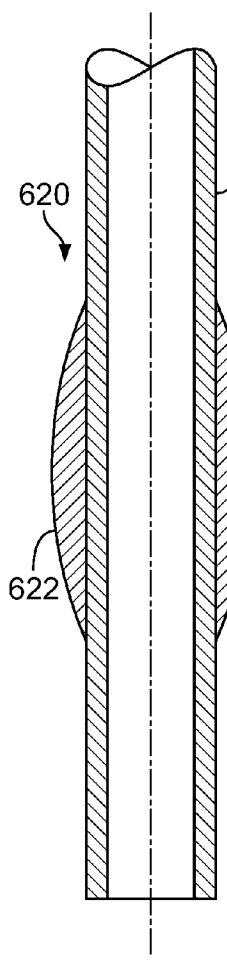
FIGS. 13A and 13C are schematic cross-sectional views of example well seal tools.
Figure 13B:
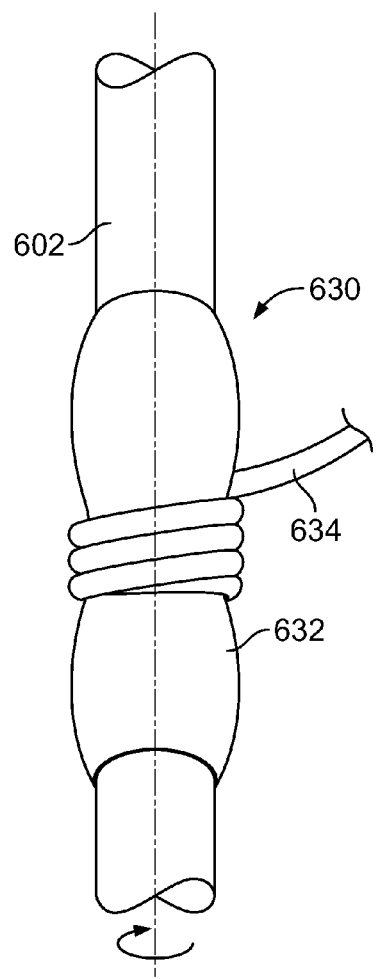
FIG. 13B is a schematic side view of an example well seal tool.
Figure 13C:
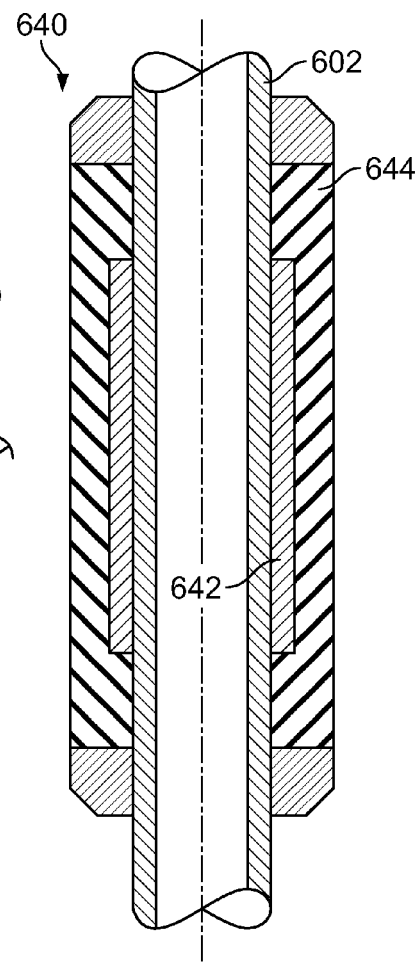

The seal element 604 can take many forms. In some instances, the polymer can include a variety of shapes between the base tubing 602 and a swellable material to reinforce the swellable material. For example, the polymer, in its compressed state, can be flattened about the base tubing 602 in the form of one or more rings, belts, coils, pegs, and/or other form. In its sealing state, the polymer can expand to seal against a wall of a tubular element (e.g., wellbore) in which the base tubing 602 is inserted and/or reinforce a material exterior to the polymer to seal against the tubular element in which the base tubing 602 is inserted. FIGS. 13A-13C depict a variety of example seal elements carried on the base tubing 602 with the polymer in its initial, compressed state. In FIG. 13A, an example seal element 620 including the polymer is wrapped about the base tubing 602 to form a ring 622 with a bowed surface. In certain instances, when the polymer ring 622 of the seal element 620 expands to its sealing state, the ring 622 expands to seal against walls of a wellbore or other tubular element in a wellbore. In certain instances, the seal element 620 includes additional material, such as swellable rubber within the ring 622 and/or exterior to the ring 622. In FIG. 13B, an example seal element 630 is shown in a partial side view. The seal element 630 includes a ring 632 of the polymer being compressed by a retention cord 634 to compact the ring 632 of the polymer into its compressed state. The ring 632 can include a swellable rubber, the polymer, and/or another element that can be configured to degrade, expand, or otherwise change, for example, in the presence of fluid in a wellbore, after a specified amount of time, at a specified strain rate, and/or by another factor. In certain instances, the retention cord 634 wraps completely around the polymer ring 632 to hold the polymer in its compressed state. In certain instances, the retention cord 634 is wrapped around the polymer ring 632 and cured into a single solid swellable element. In some instances, a material of the retention cord 634 is swellable rubber. In other instances, all or a portion of the retention cord 634 can have a different absorption rate than the swellable rubber described previously, for example, to delay a release and/or expansion of the polymer. FIG. 13C shows an example seal element 640 including a belt 642 of the polymer on an exterior of the base tubing 602, and a swellable material 644 (e.g., swellable rubber 608 of FIG. 12) exterior to the base tubing 602 and the belt 642 of the polymer. In some instances, the belt 642 of the polymer expands to a sealing state after the swellable material 644 subjects the first strain rate on the polymer of the belt 642, for example, as the swellable material 644 swells and loses stiffness. The seal element 640 can seal against walls of a wellbore or other tubular element with the swellable material 644, reinforced by the belt 642 of polymer expanded to its sealing state (not shown).

Figure 14:
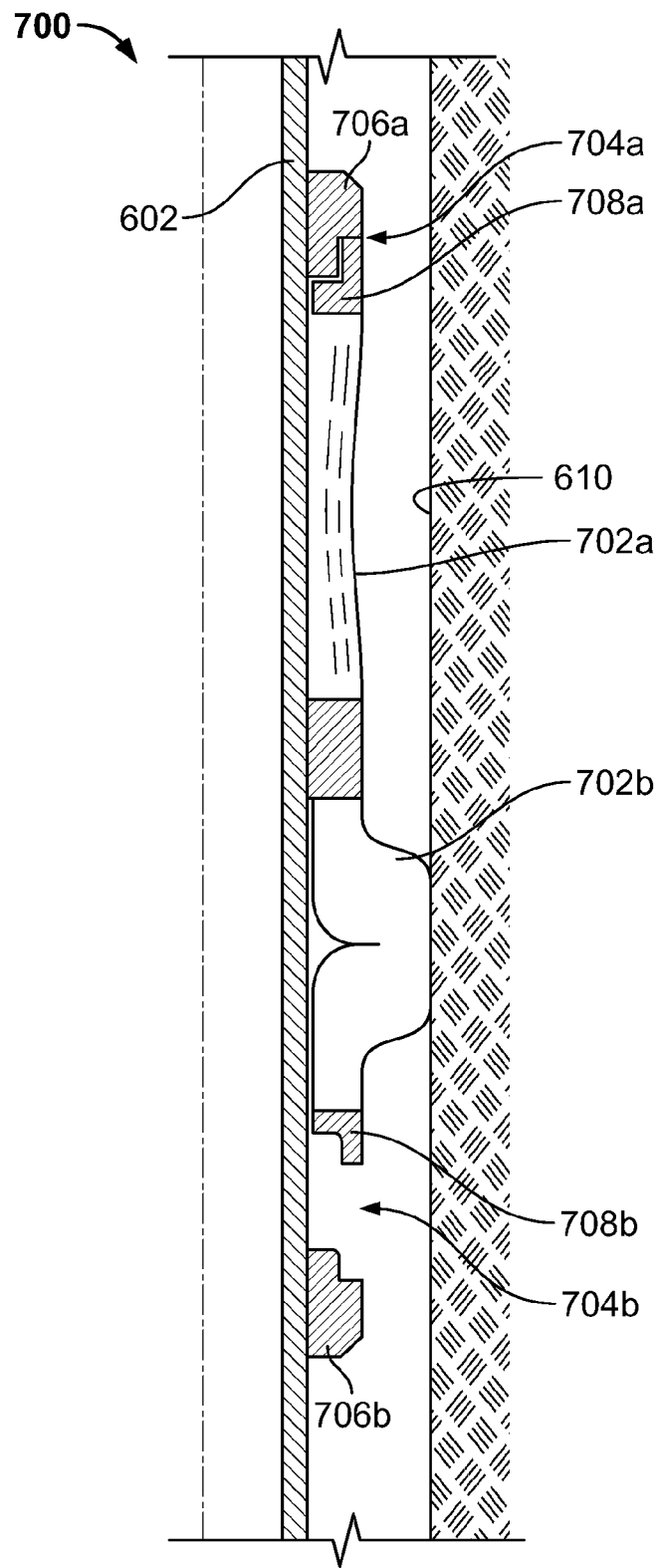
FIG. 14 is a schematic partial cross-sectional view of an example well seal tool.

Referring to FIG. 14, an example well seal tool 700 that can be used in the downhole seal assembly 502 of FIG. 11 is shown in partial cross-sectional view. The example well seal tool 700 is like the example well seal tool 600 of FIG. 12 in that the example well seal tool 700 includes a seal element including the polymer carried on the base tubing 602 to seal against wellbore walls 610 of a wellbore (or other tubular), except the well seal tool 700 includes more than one seal element that are different from seal element 604 of FIG. 12. The example well seal tool 700 includes the base tubing 602, a seal element 702a with the polymer in a compressed state, a seal element 702b with the polymer in a sealing state, a release system 704a connected to seal element 702a to allow the polymer of the seal element 702a to change (e.g., expand) to a sealing state (e.g. seal element 702b), and a release system 704b connected to seal element 702a. Seal element 702a is shown as substantially linear in its compressed state along the base tubing 602. In some instances, the compressed state of the polymer can be shaped differently, such as with a small fold or bow in the seal element 702a that still allows the base tubing 602 with the seal element 702a to be run into a wellbore. Seal element 702b is shown as having one fold in its sealing shape along the base tubing 602. In some instances, the sealing shape of the polymer can be different, such as including more than one fold in the seal element 702b or excluding a fold in the seal element 702b. Although FIG. 14 shows two seal elements 702a and 702b and two release systems 704a and 704b, there can be a different number of seal elements and release systems on the base tubing 602. For example, a well seal tool can include one seal element or three or more seal elements. Similarly, a well seal tool can include one release system or three or more release systems. In some instances, a well seal tool excludes a release system.

FIG. 14 shows seal element 702a with the polymer in the compressed state and seal element 702b with the polymer in the sealing state. In some instances, seal element 702a can be in the sealed state and/or seal element 702b can be in the compressed state. Each seal element 702a and 702b includes the polymer allowing the respective seal elements 702a and 702b to be changeable from the compressed state depicted by seal element 702a to the sealing state depicted by seal element 702b. In some instances, each seal element 702a and 702b can provide improved pressure resistance of the wellbore seal in response to one or more pressure spikes subjected on the polymer of the seal elements 702a and 702b, and/or compression or tension applied to the base tubing 602.

Release system 704a includes a release element 706a coupled to (e.g., mounted on) the base tubing 602 and a latch 708a bonded to the seal element 702a. The release element 706a retains the latch 708a to hold the polymer of the seal element 702a in the compressed state. In certain instances, the latch 708a disconnects from the release element 706a in response to a signal. The signal can be electrical, mechanical, acoustic, pressure-based, time-delayed, temperature-based, hydrostatic, ECHO, and/or other signal. Stiffness of the seal element 702a and strain rate of the polymer can change based, in part, on releasing the latch 708a from the release element 706a, for example, to allow the polymer of the seal element 702a to change from its compressed state to the sealing state. When the latch 708a is released, the polymer of the seal element 702a is subjected to a low strain rate, and therefore provides a low stiffness (e.g., the first stiffness) against expansion of the seal element 702a to the sealing state. If the seal element 702a is subjected to a pressure spike, the polymer is subjected to a high strain rate and provides a high stiffness (e.g., the second, substantially higher stiffness) that resists deformation of the seal element 702a. Similar to the example well seal tool 600 of FIG. 12, the example well seal tool 700 can have a specified pressure rating at a given temperature for steady-state pressure conditions, where the second, substantially higher stiffness allows the well seal tool 700 to maintain a seal for a range of pressure spikes. In certain instances, the polymer has a specified molded memory that correlates to the sealing state of the polymer, such that releasing the latch 708a from the release element 706a allows the polymer to gradually change from the compressed state to the sealing state due, in part, to the molded memory. For example, the polymer can be molded to the sealing state, stretched to the axially-compressed state with a release system, then return to the sealing state in a wellbore due to high recovery properties of the polymer when the release system releases the polymer from the compressed state. The sealing state of the polymer has the same or larger diameter than a diameter of the wellbore. In certain instances, the polymer of the seal element 702a returns to its sealing state in minutes. Release system 704b includes components similar to the components of release system 704a that operate similarly to the components of release system 704a, including a release element 706b coupled to the base tubing 602 and a latch 708b bonded to the seal element 702b. In FIG. 14, seal element 702a is oriented opposite seal element 702b. In some instances, seal element 702a when in its sealed state holds pressure in the wellbore from a first direction and seal element 702b when in its sealed state holds pressure in the wellbore from a second, opposite direction. In certain instances, seal elements 702a and 702b are not oriented in opposite directions along the base tubing 602. For example, seal elements 702a and 702b can be oriented similarly about a base tubing to provide redundancy in sealing against a wellbore or other tubular element in a wellbore.

In some instances, release system 704a includes an actuator (not shown) connected to the latch 708a to return the latch 708a to the release element 706a, and subsequently return the seal element 702a from its sealing state to its compressed state, for example, to disengage the well seal tool 700 with the wellbore walls 610 and remove the well seal tool 700 from a wellbore. In some instances, release system 704a also includes a track (not shown) on the base tubing to guide movement of the latch 708a, for example, during transition of the seal element 702a from its compressed state to its sealing state and/or from its sealing state to its compressed state. Similarly, release system 704a can include an actuator and a guide similar to the actuator and the guide of release system 704a.

In certain instances, a well seal tool can include additional and/or different components to reinforce a seal element. For example, a well seal tool can include a body lock ring, a hydraulic cylinder to pack off or apply rubber pressure to the seal element, and/or a hydrostatic chamber to lock in significant pressure of the seal element.

Figure 15:
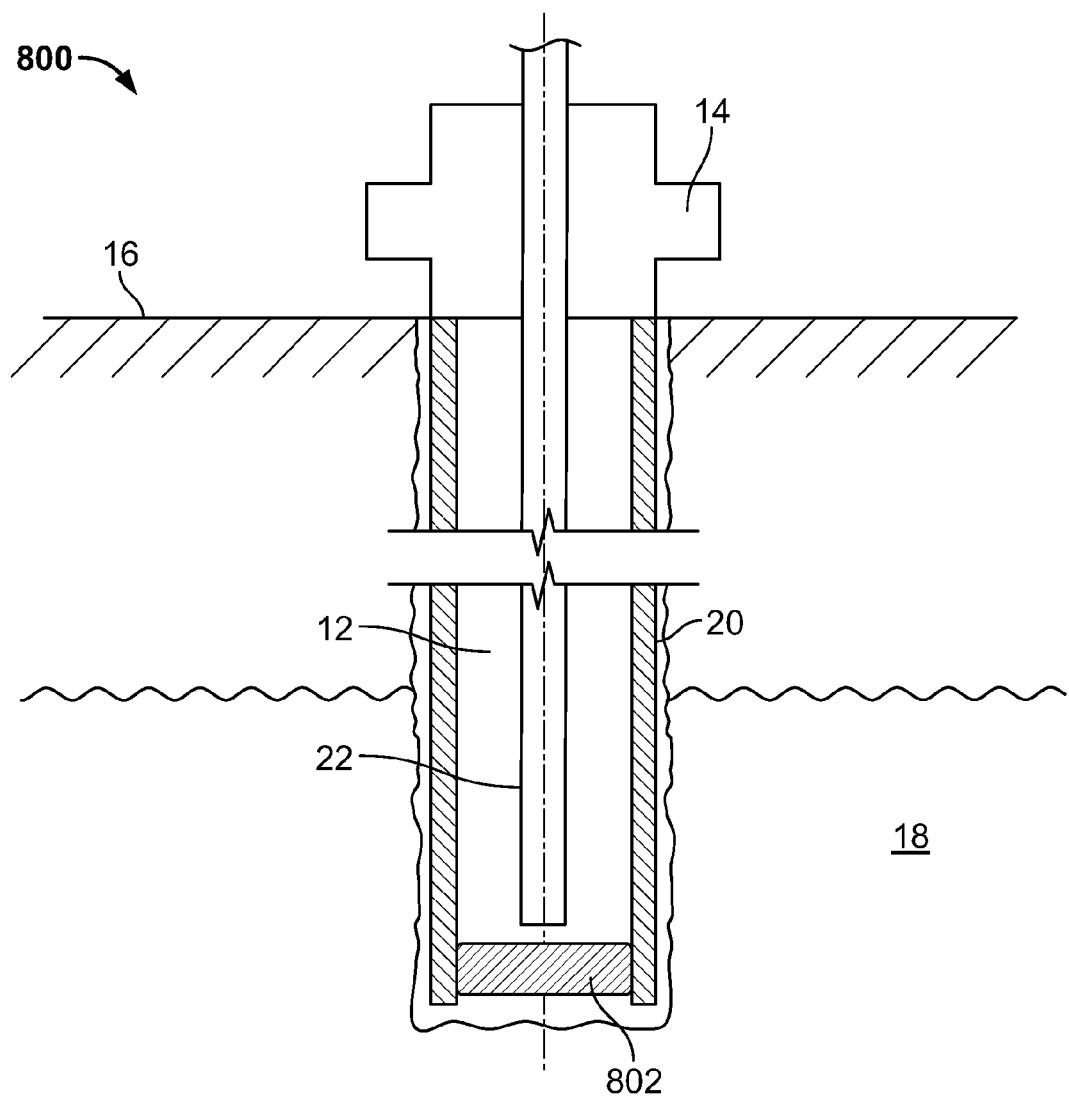
FIG. 15 is a schematic partial cross-sectional view of an example well system with a well plug assembly.

In some instances, a high creep, high recovery polymer is used in cementing plugs to provide a selectively movable cement plug that seals against passage of cement in a wellbore of a well system. Referring to FIG. 15, an example well system 800 is shown in a schematic partial cross-sectional view. The example well system 800 is like the example well system 10 of FIG. 1, except the well system 800 includes a well plug assembly 802 at a bottom of the casing 20 in the wellbore 12 and excludes the downhole plug assembly 24 of FIG. 1. Although not depicted in FIG. 15, the example well system 800 can include additional well tools, such as well tool 26 of FIG. 1.

Figure 16:
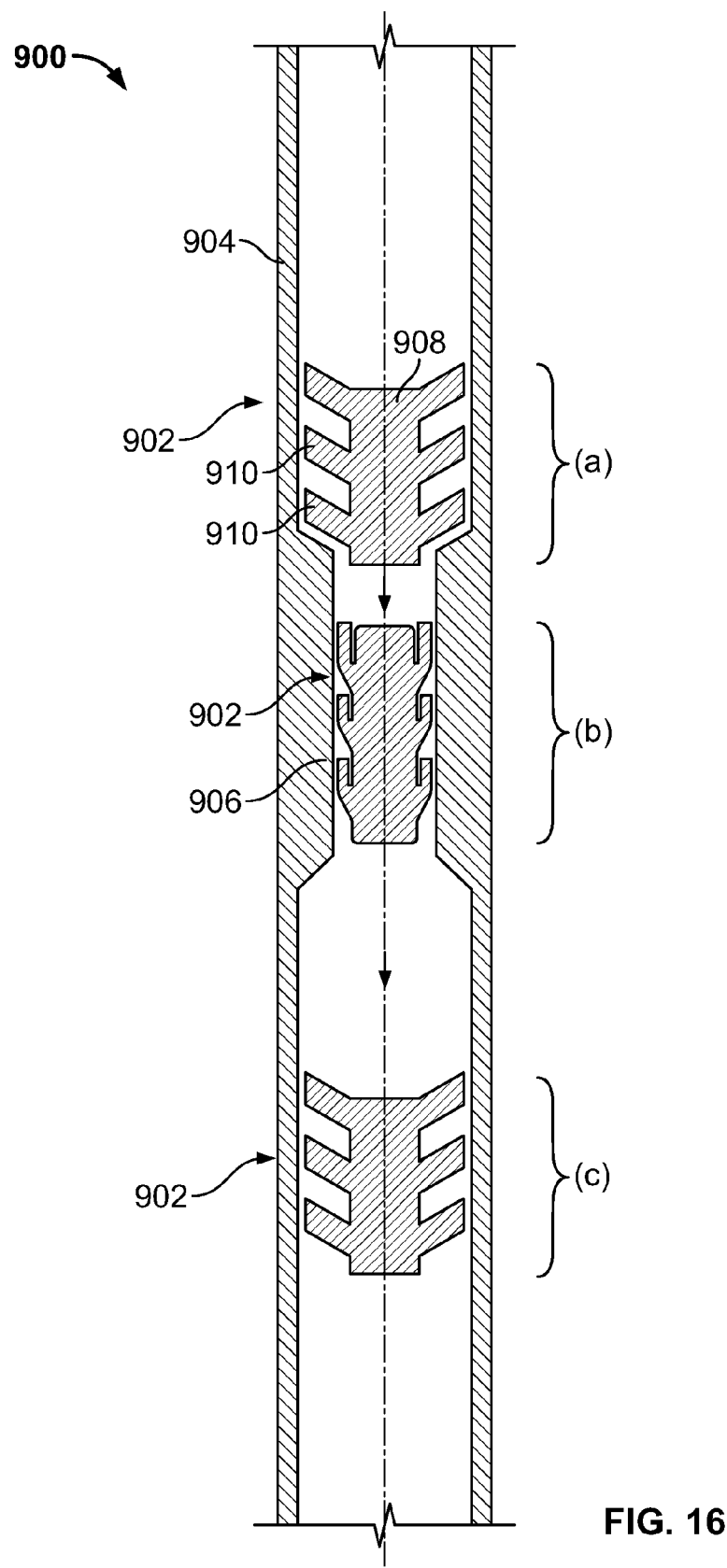
FIG. 16 is a schematic cross-sectional view of an example wellbore cementing plug assembly that can be used in the well system of FIG. 15.

Referring to FIG. 16, an example wellbore cementing plug assembly 900 that can be used in the well plug assembly 802 of FIG. 15 is shown in a cross-sectional side view. The example wellbore cementing plug assembly 900 includes a plug element 902 in a tubing section 904 (e.g., the wellbore 12, casing 20, or well string 22 of FIG. 15). The plug element 902 is shown in sequential stages (a) through (c) from the top to the bottom of FIG. 16. The plug element 902 is introduced into the tubing section 904, for example, by pumping the plug element 902 down the tubing section 904. The plug element 902 seals against the walls of the tubing section 904 to prevent passage of fluid, such as cement or cement slurry, past the plug element 902. The plug element grips against movement down the tubing section 904 or seals while moving the plug element 902 down the tubing section 904, whichever is desired by an operator. The plug element 902 includes the polymer that is deformable at a first stiffness when subjected to a first strain rate to allow the plug element 902 to pass through the tubing section 904, for example, while sealing against passage of cement past the plug element 902. The polymer also resists deformation at a second, higher stiffness when subjected to a second, higher strain rate to resist allowing the plug element 902 to pass through the tubing section 904, for example, while sealing against passage of cement past the plug element 902.

The plug element 902 is adapted to engage and seal against walls of the tubing section 904 based on a specified strain rate of the polymer, for example, due to applied stress on the polymer by a pressure and/or a fluid (e.g., well fluid, cement slurry, and/or other) in the tubing section 904. In some instances, the stiffness of the polymer is responsive to the stress applied on the polymer from one or more fluid characteristics of the fluid in the tubing section 904, for example, pressure, flow rate, temperature, and/or fluid density. In some instances, the stiffness of the polymer is responsive to a tubing pressure in the wellbore (e.g., in the tubing section 904). The polymer is deformable at the first stiffness of the polymer, for example, to allow the plug element 902 to pass through a restriction 906 in the tubing section 904 as shown in stage (b). The polymer resists deformation at the second, higher stiffness, for example, to resist allowing the plug element to pass through the restriction 906 while sealing the tubing section 904 against passage of fluid (e.g., cement) past the plug element 902 as shown in stage (a). In stage (c), the polymer seals the tubing section 904 against passage of fluid (e.g., cement) past the plug element 902 and either deforms to allow the plug element 902 to pass through the tubing section 904 or grips the tubing section 904 to resist allowing the plug element 902 to pass through the tubing section 904. Generally, the stiffness of the polymer is the stress on the polymer over the strain of the polymer. The stiffness of the polymer can be described in terms of the storage modulus (E'), the loss modulus (E''), the glass-transition temperature (Tg), and other characteristics of the polymer, each described below.

In some instances, the tubing section 904 includes additional components that activate when the plug element 902 grips the walls of the tubing section 904. In certain instances, the additional components include tools separate from the plug element 902 and/or restriction 906 in the tubing section 904 that can be activated, for example, by a pressure increase in the tubing section 904. Some example additional components separate from (e.g., uphole of) the plug element 902 include tubing dump valves, hydraulic packers, and other tools that can be activated by a pressure differential in the tubing section 904 due to the plug element 902 gripping the tubing section 904.

Figure 17:
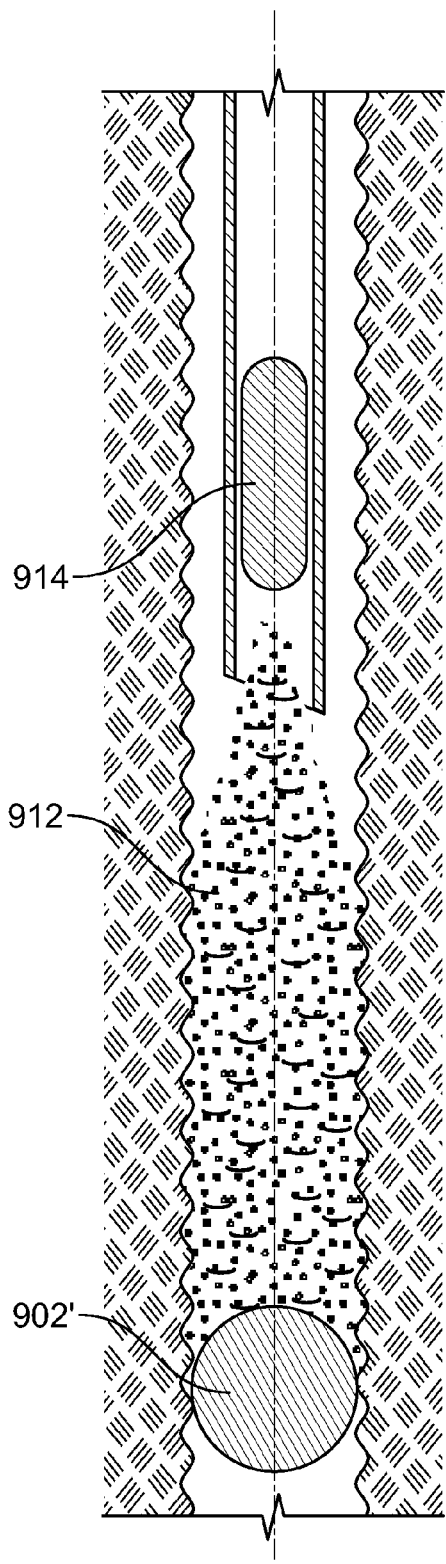
FIG. 17 is a schematic cross-sectional view of an example wellbore cementing plug assembly that can be used in the well system of FIG. 15.
Figure 18:
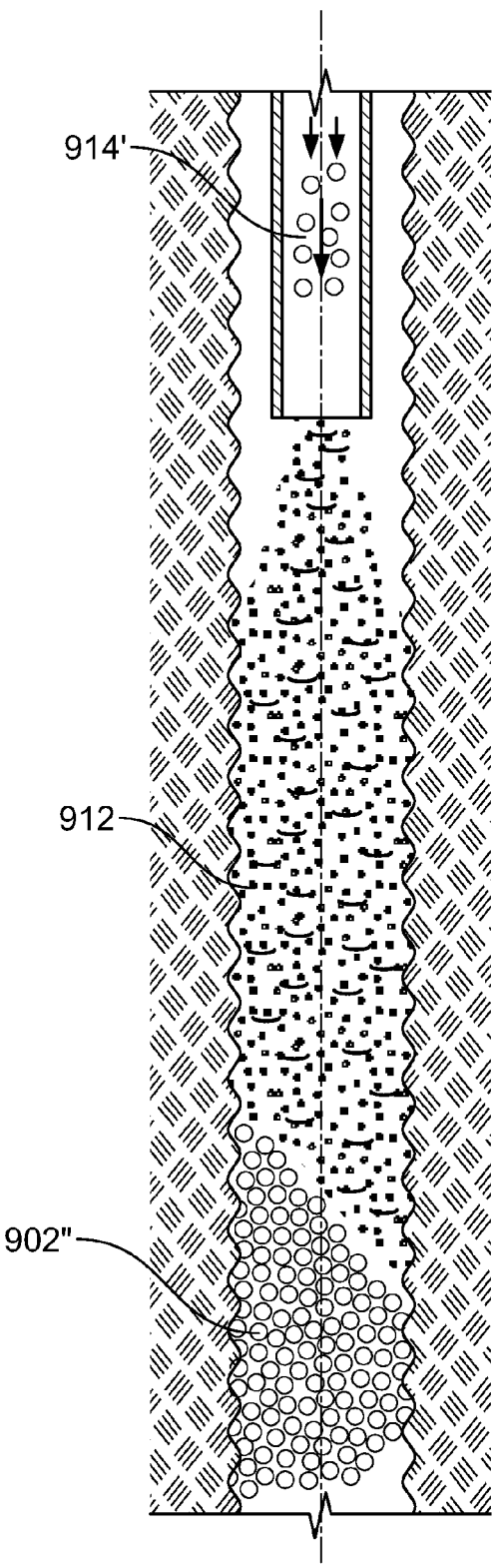
FIG. 18 is a schematic cross-sectional view of an example wellbore cementing plug assembly that can be used in the well system of FIG. 15.

The plug element 902 can take many forms. In FIG. 16, the plug element 902 includes a core 908 and fins 910 extending (substantially or directly) radially from the core 908 to the walls of the tubing section 904. The core 908 is cylindrical and the fins 910 are disc-shaped protrusions about the core 908. In some instances, the core 908, the fins 910, or both the core 908 and the fins 910 include the polymer. In some instances, the core includes metal, plastic, fiber composite, or other rigid material. The fins 910 engage the walls of the tubing section 904 to seal against passage of fluid past the plug element 902. In some instances, the plug element 902 is a different shape and/or includes different or additional material. For example, FIG. 17 shows an example plug element 902' in a wellbore (e.g., the wellbore 12 of FIG. 15) as a single spherical mass of the polymer. A cross-section of the single mass of the polymer in an initial, sealing state is equal to or larger than a cross-section of the wellbore to promote sealing of the wellbore against passage of cement 912 past the plug element 902'. Cement 912 can include a variety of mixtures such as traditional cement (e.g., Portland cement and mixtures of Portland cement), polymer based-cement (e.g., resin, epoxy, and/or other), and/or another type of cement or cement mixture. In some instances, such as depicted in FIG. 18, a plug element 902'' includes a plurality of discrete polymer elements that stick together to form a plug in the wellbore.

In some instances, such as depicted in FIG. 17, a wellbore cementing plug assembly includes a second plug element 914 in the wellbore. The second plug element 914 also includes the polymer and seals against passage of cement 912 in the wellbore between the plug element 902' and the second plug element 914. In FIG. 17, the second plug element 914 is shown as being pumped down a tubing (e.g., well string 22) following the cement 912. In certain instances, the second plug element 914 is pumped out of the tubing and expands to seal against the walls of the wellbore, for example, to isolate the cement 912 between the plug element 902' and the second plug element 914 in the wellbore. FIG. 18 shows a second plug element 914' like the second plug element 914 of FIG. 17, except the second plug element 914' of FIG. 18 includes a second plurality of discrete polymer elements.

In some instances, the polymer of a well plug element deforms at a first stiffness in response to a first strain rate of the polymer to allow the well plug element and cement in a wellbore to pass through the wellbore while sealing against passage of cement past the well plug element. The polymer grips the wellbore against movement of the well plug element through the wellbore at a second, higher stiffness in response to a second, higher strain rate of the polymer while sealing against passage of cement past the well plug element. In certain instances, sealing against passage of cement includes resisting fluidic communication between the cement and fluid in the wellbore on an opposite side of the well plug element. In some instances, gripping the wellbore with the polymer against movement of the well plug element includes activating a well tool in the wellbore with the well plug element. In certain instances, the wellbore includes more than one plug element with cement between the plug elements in the wellbore (e.g., FIGS. 17 and 18). In some examples, a sliding sleeve of a cement collar can be activated using a first plug element to allow cement to exit through an opening of a tubing section, and a second plug element can optionally close the sliding sleeve after a portion of or all of the cement exits through the opening of the tubing section. Other examples of well components that can be activated with plug elements include inflatable packers, depth indicators, liner hangers, and/or other well components.

In certain instances, a well plug element includes additional or different materials. For example, a well plug element can include a magnetic material that triggers a magnetic depth sensor. Example well plug elements that include the magnetic depth sensor can be helpful in a variety of applications, for example, in locating a specified depth to cure a cement slurry, where the well plug element seals against movement in the wellbore while sealing against passage of cement past the well plug element. In examples with more than one plug element with magnetic depth sensors, the plug elements can signal how much cement from between the plug elements has been placed in a wellbore annulus.

The polymer can take many forms and can have additional and/or different features and properties. In some instances, the polymer described herein has viscoelastic properties, including rubber (liquid-like) properties and glass (solid-like) properties. The polymer can be in the form of a solid substance, foam, gel, and/or other form. Rubber properties (hardness) depend on the curing method. Some curing methods include addition cure, peroxide cure, and condensation cure.

In some instances, the polymer is a silicone rubber, viscoelastic polymer (hereinafter referred to as "VES rubber") and has similar material properties as standard silicone rubber. For example, silicon rubber will withstand 500° F.;

however, the elastic properties of the silicon rubber will be degraded, and, in some instances, the silicon rubber will interact with oilfield chemicals. VES rubber is inert to most oil field chemicals, can be made to stick to itself and not to other materials, and has time dependent stiffness. In other words, VES rubber will initially resist deforming, then slowly deform to a substantially consistent stress applied.

An example VES rubber is Vistik, a high creep, high recovery silicone polymer that has time dependent stiffness.

1. Viscoelastic Performance

A polymeric component may allow a well tool to achieve certain multifunctional characteristics. In some instances, the viscoelastic performance of polymers can be approximately described by time-temperature superposition. This theory recognizes that there is a general equivalence between time and temperature [R. J. Young and P. A. Lovell, *Introduction to Polymers*, 2nd ed. by Chapman and Hall, London, 1991]. A polymer which displays rubbery (liquid-like) characteristics under a given set of testing conditions can be induced to show glassy (solid-like) behavior by either reducing the temperature or increasing the testing rate or frequency. In the rubbery condition, the polymer can conform and change shape, for example, to allow a tool with the polymer to activate and function. To determine suitability for use of a given viscoelastic polymeric component, it is useful to apply measures of viscoelastic performance. Among the various suitable methods, dynamic mechanical thermal analysis (DMTA) is the method of convenience used in this disclosure.

Figure 19:
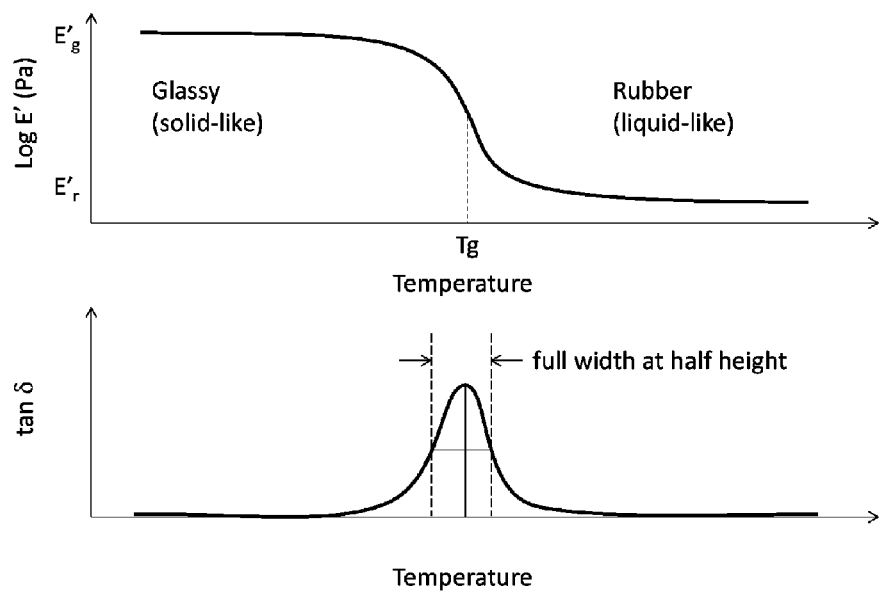
FIG. 19 shows two schematic graphs indicating a glass transition temperature of a viscoelastic component of a polymer.

In order to enable reliable differences between tool settings (e.g., open/closed settings for a sleeve), it is thought that a viscoelastic component (e.g., the polymer) of a tool should exhibit contrasting differences between rubbery and glassy states. Quantities of interest include but are not limited to the storage modulus (E'), loss modulus (E"), and tan δ=E"/E', temperature (T), the glass transition temperature (Tg). The breadth of the glass transition taken as the full width at half height of the tan δ peak associated with the glass transition temperature (Tg) can be measured as shown in FIG. 19. It is further recognized that those of average skill in the art can apply or adapt this or other commonly available methods to discern the contrast between rubbery and glassy states for a given polymer. In certain instances, polymers including viscoelastic composition(s) may also have other components that result in multiple transitions that may appear during DMTA. In some instances, other viscoelastic transitions may be suitable.

a. Timescale

The ability of the multifunctional tool (i.e. a well tool including the polymer, as described above) to allow or resist flow is sometimes thought to derive from such a characteristic on the timescale of the well-bore operation (i.e. time required to isolate flow for a given frack stage). It is useful to define a shift parameter ($a_T'$) as the logarithm of the ratio of the time between solid-like to liquid-like performance:

$$\text{Log}(a_T') = \text{Log}(t_s/t_l)$$

Such that $t_s$ is the time required for the solid-like performance and $t_l$ is the time required for liquid-like performance. Example transitions between liquid-like to solid-like behaviors are shown in Table 1.

TABLE 1

Example ranges for time scale of viscoelastic phenomenon and associated quantities

| Solid-like time (s) | Liquid-like time (s) | log ($a_T$) | log ($h_s/h_l$) |
|---|---|---|---|
| 0.01 | 108000 | −7.0 | 7.0 |
| 0.5 | 72000 | −5.2 | 5.2 |
| 1 | 36000 | −4.6 | 4.6 |
| 10 | 18000 | −3.3 | 3.3 |
| 60 | 7200 | −2.1 | 2.1 |
| 300 | 5400 | −1.3 | 1.3 | b. Glass Transition Temperature (Tg)

Although not intended to be limited by theory, the ability of the multifunctional tool to allow or resist flow is thought to be advantaged by proximity of the Tg to the service temperature. Example ranges are indicated in Table 2.

TABLE 2

Example embodiments for glass transition temperatures

| Min (° C.) | Max (° C.) | Min (° F.) | Max (° F.) |
|---|---|---|---|
| 78 | 156.1 | 173.3 | 313.0 |
| 82 | 142.9 | 178.8 | 289.1 |
| 83 | 139.4 | 180.7 | 282.9 |
| 85 | 133.0 | 185.4 | 271.4 |
| 88 | 128.1 | 190.1 | 262.6 |
| 90 | 125.1 | 193.7 | 257.2 | c. Breadth of Transition

In some instances, lower breadth of glass transition as quantified by the full width at half height of the tan δ peak enables tool design and operation, for example, because narrower breadth gives a sharper transition between states (i.e. open/close for a sliding sleeve or extrude/seal for a plug and perf tool). Certain embodiments are shown in Table 3. It is further recognized that specification of a breadth of the transition does not necessarily indicate a tool that is controlled by a temperature change. Such a tool can also be controlled based on strain rate per principle as described by time-temperature superposition, discussed below. In some instances, at least one viscoelastic transition is used for the purpose of the multifunctional tool. In some instances, the glass transition of at least one polymer is used. In some instances, a crystalline transition of at least one polymer is used. In some instances, an interfacial transition of at least two phases within the viscoelastic polymeric component is used. In some instances, more than one transition is used.

TABLE 3

Example Embodiments for Breadth of Glass Transition Full width at Half Height of tan δ peak

| (° C.) | (° F.) |
|---|---|
| less than or equal to 70 | less than or equal to 158 |
| less than or equal to 60 | less than or equal to 140 |
| less than or equal to 55 | less than or equal to 131 |
| less than or equal to 50 | less than or equal to 122 |
| less than or equal to 45 | less than or equal to 113 |
| less than or equal to 40 | less than or equal to 104 | d. Ratio of Moduli of Glassy to Rubbery State log($E'_g/E'_r$)

In certain instances, higher ratios of moduli of two states employed for the viscoelastic component (i.e. glassy to rubbery state as quantified by log ($E'_g/E'_r$)) facilitates tool design and operation, for example, because lower breadth gives a sharper transition between states (i.e. open/close for a sliding sleeve or extrude/seal for a plug and perf tool). Certain embodiments are shown in Table 4. In certain instances, a transition other than the glass transition (i.e. crystalline transition, interfacial transition, or other) is used.

TABLE 4

Example Embodiments for Ratio of Moduli of Glassy to Rubbery State log ($E'_g/E'_r$)

log ($E'_g/E'_r$)

greater than or equal to 0.5
greater than or equal to 0.75
greater than or equal to 1
greater than or equal to 1.25
greater than or equal to 1.5
greater than or equal to 2

Certain characteristics and criteria of the polymer may be chosen based on the application of the polymer, the desired characteristics of the polymer by a well operator, and/or other reasons. For example, swelling of the polymer in the presence of the hydrocarbons may be desired in some applications, whereas resistance to swelling of the polymer in the presence of hydrocarbons may be desired in some applications. In some instances, a combination of swellable and swelling-resistant materials is used.

2. Polymer Compositions

In certain instances, the polymer includes thermosets and/or thermoplastics. Some examples include silicones, epoxy, polyurethanes (PUs), thermoplastic polyurethanes (TPUs), thermoplastic vulcanizates (TPVs), polyether ester block copolymers (COPEs), thermoplastic polyamides (CO-PAs), silicone containing thermoplastic elastomers, fluorine containing thermoplastic elastomers, phenolics, cyanate ester based resins, certain high temperature resistant thermoplastics, polyetherimides, polyphenylene ether, polyoxyphenylenes, polysulphone, syndiotactic polystyrene, polyaryl ether ketones, polycarbonates, acetals, polyimides, polyarylene sulfides, polyurethane based compositions, and/or others.

a. Silicones

In some instances, polymer compositions including silicone can include, for example, polymer compositions described in US2012/0329896A1 and US2009/0286910A1. The viscoelastic nature of the polymer can derive its viscoelastic response from a complex origin. In some instances, the polymer includes a silicone rubber formulation having two overlapping and possibly interconnected networks: one permanent and the other temporary. The permanent network has a fixed topology and gives the material a permanent equilibrium shape (e.g., initial, molded shape)—the shape to which it will return when reduced stress for a sufficient period of time. When the material is subject to constant strain, that permanent network produces a substantially constant stress. The temporary network, however, has a topology that evolves with time and it relaxes so as to relieve stress.

b. Thermoset

In some instances, the polymer includes a thermoset composition to form a composite, with the thermoset composition having a glass transition temperature of 150° C. or greater, a tan δ peak of 0.2 or greater, and a tan δ peak width measured at half-height larger than about 40° C., as measured by dynamic thermo-mechanical analysis (DMTA) at a frequency of 1 Hz.

In some instances, the composite includes at least one viscoelastic transition at elevated temperatures. The composite may include a thermoset composition disposed on a substrate, where the thermoset composition has a glass transition temperature of 78° C. or greater, a tan δ peak of 0.2 or greater, and a tan δ peak width measured at half-height less than about 70° C., as measured by dynamic thermo-mechanical analysis (DMTA) at a frequency of 1 Hz.

In some instances, thermoset compositions have at least one viscoelastic transition at elevated temperatures. The thermoset compositions may include: a reaction product of a curable composition including at least one thermosetting resin and at least one hardener. In some instances, the thermoset composition has a glass transition temperature of 78° C. or greater, a tan δ peak of 0.2 or greater, and a tan δ peak width measured at half-height less than about 70° C., as measured by dynamic thermo-mechanical analysis (DMTA) at a frequency of 1 Hz.

In some instances, a process for well operation includes using a well tool having at least one viscoelastic transition. The process may include disposing a polymer with a thermoset composition on a substrate to form a composite, where the thermoset composition has a glass transition temperature of 78° C. or greater, a tan δ peak of 0.2 or greater, and a tan δ peak width measured at half-height less than about 70° C., as measured by dynamic thermo-mechanical analysis (DMTA) at a frequency of 1 Hz.

In some instances, composites are used in well operation tools having at least one viscoelastic transition. The composites may include a thermoset composition disposed on a substrate. The thermoset composition can have a glass transition temperature of 78° C. or greater, a tan δ peak of 0.2 or greater, and a tan δ peak width measured at half-height larger than about 70° C., as measured by dynamic thermo-mechanical analysis (DMTA) at a frequency of 1 Hz; wherein the composite is exposed to vibrations at temperatures of 100° C. or greater.

In some instances, thermoset compositions have improved dampening properties at elevated temperatures. The thermoset compositions may include a reaction product of a curable composition including at least one thermosetting resin and at least one hardener. The thermoset composition can have a glass transition temperature of 150° C. or greater, a tan δ peak of 0.2 or greater, and a tan δ peak width measured at half-height larger than about 40° C., as measured by dynamic thermo-mechanical analysis (DMTA) at a frequency of 1 Hz.

In some instances, elastomers are defined as materials which experience large reversible deformations under relatively low stress. Some examples of commercially available elastomers include natural rubber, ethylene/propylene (EPM) copolymers, ethylene/propylene/diene (EPDM) copolymers, styrene/butadiene copolymers, chlorinated polyethylene, and silicone rubber.

Thermoplastic elastomers are elastomers having thermoplastic properties. That is, thermoplastic elastomers are optionally molded or otherwise shaped and reprocessed at temperatures above their melting or softening point. One example of a thermoplastic elastomer is styrene-butadiene-styrene (SBS) block copolymer. SBS block copolymers exhibit a two phase morphology including glassy polystyrene domains connected by rubbery butadiene segments.

Thermoset elastomers are elastomers having thermoset properties. That is, thermoset elastomers irreversibly solidify or "set" when heated, generally due to an irreversible crosslinking reaction. Two examples of thermoset elastomers are crosslinked ethylene-propylene monomer rubber (EPM) and crosslinked ethylene-propylene-diene monomer rubber (EPDM). EPM materials are made by copolymerization of ethylene and propylene. EPM materials are typically cured with peroxides to give rise to crosslinking, and thereby induce thermoset properties. EPDM materials are linear interpolymers of ethylene, propylene, and a nonconjugated diene such as 1,4-hexadiene, dicyclopentadiene, or ethylidene norbornene. EPDM materials are typically vulcanized with sulfur to induce thermoset properties, although they also can be cured with peroxides. While EPM and EPDM thermoset materials are advantageous in that they have applicability in higher temperature applications, EPM and EPDM elastomers have relatively low green strength (at lower ethylene contents), relatively low oil resistance, and relatively low resistance to surface modification.

Thermoplastic vulcanizates (TPV's) include thermoplastic matrices, such as crystalline, through which thermoset elastomers are generally uniformly distributed. Some examples of thermoplastic vulcanizates include ethylene-propylene monomer rubber and ethylene-propylene-diene monomer rubber thermoset materials distributed in a crystalline polypropylene matrix. One example of a commercial TPV is Santoprene® thermoplastic rubber which is manufactured by Advanced Elastomer Systems and is a mixture of crosslinked EPDM particles in a crystalline polypropylene matrix. These materials have found utility in many applications which previously used vulcanized rubber, e.g., hoses, gaskets, and the like.

Commercial TPVs are typically based on vulcanized rubbers in which a phenolic resin or sulfur cure system is used to vulcanize, that is to crosslink, a diene (or more generally, a polyene) copolymer rubber by way of dynamic vulcanization, that is crosslinking while mixing (typically vigorously), in a thermoplastic matrix.

In some instances, the polymer includes thermosetting compositions for use as dampener materials at elevated temperatures. In some instances, the polymer includes a viscoelastic component having a high glass transition temperature and a high dampening factor. In some examples, the polymer includes thermoset dampener materials with a glass transition temperature of at least 70° C. and a high dampening factor defined by tan δ greater than 0.2 with a peak width at half-height of less than about 70° C. Such viscoelastic components may be useful for transportation, aerospace, castings, coatings, electronics/electrical applications, and/or other applications requiring high service temperature dampening.

In certain instances, the viscoelastic component of the polymer includes compositions based upon thermosetting resins capable of generating a crosslinked network upon curing. Thermosetting resins may include epoxy resins, phenolic resins and/or resins capable of generating phenolic moieties at high temperature, vinylic resins, cycloaliphatic epoxy resins, nitrogen containing resins such as cyanate ester based resins, and/or other thermosetting compositions, or combinations thereof. The viscoelastic component may also include various additives, including other resins such as high temperature resistant thermoplastics. Additionally, curable compositions for forming the thermoset viscoelastic component may include hardeners and catalysts.

For example, thermosetting viscoelastic components may include at least one thermosetting resin, and optionally at least one of a hardener, a catalyst, an inorganic filler, a fibrous reinforcement, a high temperature resistant thermoplastic resin, and a solvent. In certain instances, following cure of the thermosetting composition, the cured composition may have at least one of a glass transition temperature of at least 78° C., a high dampening factor defined by tan δ greater than 0.2 with a peak width at half-height of less than 70° C., as measured by dynamic thermo-mechanical analysis (DMTA) at a frequency of 1 Hz.

In some instances, the glass transition temperature of the cured polymer is between about 70° C. and 110° C. In other instances, the glass transition temperature of the cured composition is less than 70° C. or more than 110° C. In some instances, the cured composition is measured using DMTA at a frequency of 1 Hz.

In some instances, the height of the tan δ peak of the cured polymer is higher than about 0.2 and less than about 7, as measured using DMTA at a frequency of 1 Hz.

In some instances, the width of the tan δ peak of the cured polymer is less than about 70° C. and greater than about 2° C., when measured at half-height for sonic embodiments of the cured polymer.

In some instances, a shoulder or a secondary tan δ peak is shown by the cured polymer when measured by DMTA. The shoulder of the secondary tan δ peak may be at a lower or higher temperature than the primary tan δ peak. In some instances, the secondary tan δ peak is located at more than about 10° C. from the main tan δ peak and less than about 400° C.

In some instances, the polymer having viscoelastic components may reduce vibrations observed at a temperature higher than about 78° C. and less than about 400° C.

In some instances, the polymer having a thermoset viscoelastic component is attached to, for example, an article or substrate of a well tool by any suitable means. For example, thermoset dampener materials disclosed herein may be attached to an article or substrate by coating, spraying, dipping, casting, potting, laminating, gluing, sandwiching, and/or other. In some instances, the uncured polymer is disposed on a substrate and cured in place, for example, to produce a modified article with reduced vibration at high temperatures.

In some instances, thermoset dampener materials include one or more thermosetting resins, such as epoxy resins, phenolic resins, vinylic resins, cyanate ester resins, and/or others. Dampener materials may also include various additives, such as high temperature resistant thermoplastics, among other additives. Each of these are described below.

Epoxy Resin

A thermoset dampener of the polymer can be an epoxy component. Epoxy resins disclosed herein may vary and include conventional and commercially available epoxy resins, which can be used alone or in combinations of two or more epoxy resins including, for example, novalac resins, isocyanate modified epoxy resins, carboxylate adducts, and/or others. The epoxy resin component may be any type of epoxy resin useful in molding compositions, including any material containing one or more reactive oxirane groups, referred to herein as "epoxy groups" or "epoxy functionality." Epoxy resins may include mono-functional epoxy resins, multi- or poly-functional epoxy resins, and combinations thereof. Monomeric and polymeric epoxy resins may be aliphatic, cycloaliphatic, aromatic, or heterocyclic epoxy resins. The polymeric epoxies include linear polymers having terminal epoxy groups (a diglycidyl ether of a polyoxyalkylene glycol, for example), polymer skeletal oxirane units (polybutadiene polyepoxide, for example) and polymers having pendant epoxy groups (such as a glycidyl methacrylate polymer or copolymer, for example). The epoxies may be pure compounds, and/or mixtures or compounds containing one, two or more epoxy groups per molecule. In certain instances, epoxy resins also include reactive —OH groups, which may react at higher temperatures with anhydrides, organic acids, amino resins, phenolic resins, or with epoxy groups (when catalyzed) to result in additional crosslinking.

The epoxy resins may be glycidated resins, cycloaliphatic resins, epoxidized oils, and so forth. The glycidated resins are frequently the reaction product of a glycidyl ether, such as epichlorohydrin, and a bisphenol compound such as bisphenol A; C4 to C28 alkyl glycidyl ethers; C2 to C28 alkyl- and alkenyl-glycidyl esters; C1 to C28 alkyl-, mono- and poly-phenol glycidyl ethers; polyglycidyl ethers of polyvalent phenols, such as pyrocatechol, resorcinol, hydroquinone, 4,4'-dihydroxydiphenyl methane (or bisphenol F), 4,4'-dihydroxy-3,3'-dimethyldiphenyl methane, 4,4'-dihydroxydiphenyl dimethyl methane (or bisphenol A), 4,4'-dihydroxydiphenyl methyl methane, 4,4'-dihydroxydiphenyl cyclohexane, 4,4'-dihydroxy-3,3'-dimethyldiphenyl propane, 4,4'-dihydroxydiphenyl sulfone, and tris(4-hydroxyphynyl)methane; polyglycidyl ethers of the chlorination and bromination products of the above-mentioned diphenols; polyglycidyl ethers of novolacs; polyglycidyl ethers of diphenols obtained by esterifying ethers of diphenols obtained by esterifying salts of an aromatic hydrocarboxylic acid with a dihaloalkane or dihalogen dialkyl ether; polyglycidyl ethers of polyphenols obtained by condensing phenols and long-chain halogen paraffins containing at least two halogen atoms. Other examples of epoxy resins useful in embodiments disclosed herein include bis-4,4'-(1-methylethylidene)phenol diglycidyl ether and (chloromethyl)oxirane bisphenol A diglycidyl ether.

In some instances, the epoxy resin includes glycidyl ether type; glycidyl-ester type; alicyclic type; heterocyclic type, and halogenated epoxy resins, etc. Some examples of suitable epoxy resins may include cresol novolac epoxy resin, phenolic novolac epoxy resin, biphenyl epoxy resin, hydroquinone epoxy resin, stilbene epoxy resin, and mixtures and combinations thereof.

Suitable polyepoxy compounds may include resorcinol diglycidyl ether (1,3-bis-(2,3-epoxypropoxy)benzene), diglycidyl ether of bisphenol A (2,2-bis(p-(2,3-epoxypropoxy)phenyl)propane), triglycidyl p-aminophenol(4-(2,3-epoxypropoxy)-N,N-bis(2,3-epoxypropyl)aniline), diglycidyl ether of bromobispehnol A (2,2-bis(4-(2,3-poxypropoxy)3-bromo-phenyl)propane), diglydicylether of bisphenol F (2,2-bis(p-(2,3-epoxypropoxy)phenyl)methane), triglycidyl ether of meta- and/or para-aminophenol(3-(2,3-epoxypropoxy)N,N-bis(2,3-epoxypropyl)aniline), and tetraglycidyl methylene dianiline(N,N,N,N',N'-tetra(2,3-epoxypropyl)4,4'-diaminodiphenyl methane), and mixtures of two or more polyepoxy compounds. Additional examples of epoxy resins may be found in Lee, H. and Neville, K., Handbook of Epoxy Resins, McGraw-Hill Book Company, 1982 reissue.

Other suitable epoxy resins include polyepoxy compounds based on aromatic amines and epichlorohydrin, such as N,N'-diglycidyl-aniline; N,N'-dimethyl-N,N'-diglycidyl-4,4'-diaminodiphenyl methane; N,N,N'N'-tetraglycidyl-4,4'-diaminodiphenyl methane; N-diglycidyl-4-aminophenyl glycidyl ether; and N,N,N',N'-tetraglycidyl-1,3-propylene bis-4-aminobenzoate. Epoxy resins may also include glycidyl derivatives of one or more of: aromatic diamines, aromatic monoprimary amines, aminophenols, polyhydric phenols, polyhydric alcohols, polycarboxylic acids.

Some example epoxy resins include polyglycidyl ethers of polyhydric polyols, such as ethylene glycol, triethylene glycol, 1,2-propylene glycol, 1,5-pentanediol, 1,2,6-hexanetriol, glycerol, and 2,2-bis(4-hydroxy cyclohexyl)propane; polyglycidyl ethers of aliphatic and aromatic polycarboxylic acids, such as, for example, oxalic acid, succinic acid, glutaric acid, terephthalic acid, 2,6-napthalene dicarboxylic acid, and dimerized linoleic acid; polyglycidyl ethers of polyphenols, such as, for example, bis-phenol A, bis-phenol F, 1,1-bis(4-hydroxyphenyl)ethane, 1,1-bis(4-hydroxyphenyl)isobutane, and 1,5-dihydroxy napthalene; modified epoxy resins with acrylate or urethane moieties; glycidyl amine epoxy resins; and novolac resins.

The epoxy compounds may be cycloaliphatic or alicyclic epoxides. Examples of cycloaliphatic epoxides include diepoxides of cycloaliphatic esters of dicarboxylic acids such as bis(3,4-epoxycyclohexylmethyl)oxalate, bis(3,4-epoxycyclohexylmethyl)adipate, bis(3,4-epoxy-6-methylcyclohexylmethyl)adipate, bis(3,4-epoxycyclohexylmethyl)pimelate; vinylcyclohexene diepoxide; limonene diepoxide; dicyclopentadiene diepoxide; and the like. Other suitable diepoxides of cycloaliphatic esters of dicarboxylic acids are described, for example, in U.S. Pat. No. 2,750,395.

Other cycloaliphatic epoxides include 3,4-epoxycyclohexylmethyl-3,4-epoxycyclohexane carboxylates such as 3,4-epoxycyclohexylmethyl-3,4-epoxycyclohexane carboxylate; 3,4-epoxy-1-methylcyclohexyl-methyl-3,4-epoxy-1-methylcyclohexane carboxylate; 6-methyl-3,4-epoxycyclohexylmethylmethyl-6-methyl-3,4 epoxycyclohexane carboxylate; 3,4-epoxy-2-methylcyclohexylmethyl-3,4-epoxy-2-methylcyclohexane carboxylate; 3,4-epoxy-3-methylcyclohexyl-methyl-3,4-epoxy-3-methylcyclohexane carboxylate; 3,4-epoxy-5-methyleyelohexyl-methyl-3,4-epoxy-5-methylcyclohexane carboxylate and the like. Other suitable 3,4-epoxycyclohexylmethyl-3,4-epoxycyclohexane carboxylates are described, for example, in U.S. Pat. No. 2,890,194.

Some example epoxy-containing materials which are particularly useful include those based on glycidyl ether monomers. Examples are di- or polyglycidyl ethers of polyhydric phenols obtained by reacting a polyhydric phenol with an excess of chlorohydrin such as epichlorohydrin. Such polyhydric phenols include resorcinol, bis(4-hydroxyphenyl) methane (known as bisphenol F), 2,2-bis(4-hydroxyphenyl) propane (known as bisphenol A), 2,2-bis(4'-hydroxy-3',5'-dibromophenyl)propane, 1,1,2,2-tetrakis(4'-hydroxyphenyl)ethane or condensates of phenols with formaldehyde that are obtained under acid conditions such as phenol novolacs and cresol novolacs. Examples of this type of epoxy resin are described in U.S. Pat. No. 3,018,262. Other examples include di- or polyglycidyl ethers of polyhydric alcohols such as 1,4-butanediol, or polyalkylene glycols such as polypropylene glycol and di- or polyglycidyl ethers of cycloaliphatic polyols such as 2,2-bis(4-hydroxycyclohexyl)propane. Other examples are monofunctional resins such as cresyl glycidyl ether or butyl glycidyl ether.

Another class of epoxy compounds are polyglycidyl esters and poly(beta-methylglycidyl)esters of polyvalent carboxylic acids such as phthalic acid, terephthalic acid, tetrahydrophthalic acid or hexahydrophthalic acid. A further class of epoxy compounds are N-glycidyl derivatives of amines, amides and heterocyclic nitrogen bases such as N,N-diglycidyl aniline, N,N-diglycidyl toluidine, N,N,N'N'-tetraglycidyl bis(4-aminophenyl)methane, triglycidyl isocyanurate, N,N'-diglycidyl ethyl urea, N,N'-diglycidyl-5,5-dimethylhydantoin, and N,N'-diglycidyl-5-isopropylhydantoin.

Some example epoxy-containing materials are copolymers of acrylic acid esters of glycidol such as glycidylacrylate and glycidylmethacrylate with one or more copolymerizable vinyl compounds. Examples of such copolymers are 1:1 styrene-glycidylmethacrylate, 1:1 methyl-methacrylateglycidylacrylate and a 62.5:24:13.5 methylmethacrylate-ethyl acrylate-glycidylmethacrylate.

Epoxy compounds that are readily available include octadecylene oxide; glycidylmethacrylate; D.E.R. 331 (bisphenol A liquid epoxy resin) and D.E.R. 332 (diglycidyl ether of bisphenol A) available from The Dow Chemical Company, Midland, Mich.; vinylcyclohexene dioxide; 3,4-epoxycyclohexylmethyl-3,4-epoxycyclohexane carboxylate; 3,4-epoxy-6-methylcyclohexyl-methyl-3,4-epoxy-6-methylcyclohexane carboxylate; bis(3,4-epoxy-6-methylcyclohexyl-methyl) adipate; bis(2,3-epoxycyclopentyl) ether; aliphatic epoxy modified with polypropylene glycol; dipentene dioxide; epoxidized polybutadiene; silicone resin containing epoxy functionality; flame retardant epoxy resins (such as a brominated bisphenol type epoxy resin available under the tradename D.E.R. 580, available from The Dow Chemical Company, Midland, Mich.); 1,4-butanediol diglycidyl ether of phenolformaldehyde novolac (such as those available under the tradenames D.E.N. 431 and D.E.N. 438 available from The Dow Chemical Company, Midland, Mich.); and resorcinol diglycidyl ether. Although not specifically mentioned, other epoxy resins under the tradename designations D.E.R. and D.E.N. available from the Dow Chemical Company may also be used.

Epoxy resins may also include isocyanate modified epoxy resins. Polyepoxide polymers or copolymers with isocyanate or polyisocyanate functionality may include epoxy-polyurethane copolymers. These materials may be formed by the use of a polyepoxide prepolymer having one or more oxirane rings to give a 1,2-epoxy functionality and also having open oxirane rings, which are useful as the hydroxyl groups for the dihydroxyl-containing compounds for reaction with diisocyanate or polyisocyanates. The isocyanate moiety opens the oxirane ring and the reaction continues as an isocyanate reaction with a primary or secondary hydroxyl group. There is sufficient epoxide functionality on the polyepoxide resin to enable the production of an epoxy polyurethane copolymer still having effective oxirane rings. Linear polymers may be produced through reactions of diepoxides and diisocyanates. The di- or polyisocyanates may be aromatic or aliphatic in some embodiments. Some example epoxy resins are disclosed in, for example, U.S. Pat. Nos. 7,163,973, 6,632,893, 6,242,083, 7,037,958, 6,572,971, 6,153,719, and 5,405,688 and U.S. Patent Application Publication Nos. 20060293172 and 20050171237.

In some instances, curing agents and toughening agents may include epoxy functional groups.

Phenolic Resins

In some instances, phenolic resins may include any aldehyde condensate resins derived from aldehydes such as methanol, ethanal, benzaldehyde or furfuraldehyde and phenols such as phenol, cresols, dihydric phenols, chlorophenols and C1-9 alkyl phenols, such as phenol, 3- and 4-cresol (1-methyl, 3- and 4-hydroxy benzene), catechol (2-hydroxy phenol), resorcinol (1,3-dihydroxy benzene) and quinol (1,4-dihydroxy benzene). In some instances, phenolic resins may include cresol and novolac phenols.

In some instances, phenolic resins include the reaction products of phenolic compounds, such as mono-functional phenols, di-functional phenols, and multi- or poly-functional phenols, and an aldehyde, such as formaldehyde. Examples of mono-functional phenols include phenol; cresol; 2-bromo-4-methylphenol; 2-allylphenol; 1,4-aminophenol; and the like. Examples of di-functional phenols (polyphenolic compounds) include phenolphthalane; biphenol; 4-4'-methylene-di-phenol; 4-4'-dihydroxybenzophenone; bisphenol-A; 1,8-dihydroxyanthraquinone; 1,6-dihydroxynaphthalene; 2,2'-dihydroxyazobenzene; resorcinol; fluorene bisphenol; and the like. Examples of tri-functional phenols include 1,3,5-trihydroxy benzene and the like. Polyvinyl phenol may also be a suitable phenolic resin. For example, phenolic resins disclosed in U.S. Pat. No. 6,207,786 may be used.

In certain instances, phenolic resins may have a low formaldehyde to phenol ratio. For example, a two part system having a long shelf and pot life, using formaldehyde-free curing technology and being non-corrosive to dies, having a low solvent content and generating no water cure may be used. For example, the phenolic resins disclosed in U.S. Patent Application Publication Nos. 2005/0009980 and 2005/0054787 may be used.

Cyanate Ester Based Resins

In certain instances, cyanate ester resins include one or more compounds of the general formula NCOAr(YxArm)qOCN and oligomers and/or polycyanate esters and combinations thereof. In some instances, each Ar is independently a single or fused aromatic or substituted aromatics and combinations thereof and therebetween nucleus linked in the ortho, meta and/or para position; x is an integer from 0 to 2; and m and q are each independently an integer from 0 to 5. Y is a linking unit selected from the group consisting of oxygen, carbonyl, sulphur, sulphur oxides, chemical bond, aromatic linked in ortho, meta and/or para positions and/or CR1R2, P(R3R4R4'R5), or Si(R3R4R4'R6). R1 and R2 are independently hydrogen, halogenated alkanes, such as the fluorinated alkanes, and/or substituted aromatics and/or hydrocarbon units wherein said hydrocarbon units are singularly or multiply linked and include up to 20 carbon atoms for each R1 and/or R2. R3 is alkyl, aryl, alkoxy or hydroxyl. R'4 may be equal to R4 and has a singly linked oxygen or chemical bond. R5 has a doubly linked oxygen or chemical bond. R5 and R6 are defined similar to R3 above. Optionally, the thermoset can include cyanate esters of phenol/formaldehyde derived novolacs or dicyclopentadiene derivatives thereof, an example of which is XU71787 sold by the Dow Chemical Company, Midland, Mich.

In certain instances, the cyanate ester may include bis(4-cyanatophenyl)methane bis(3-methyl-4-cyanatophenyl)methane, bis(3-ethyl-4-cyanatophenyl)methane, bis(3,5-dimethyl-4-cyanatophenyl)methane, 1,1-bis(4-cyanatophenyl)ethane, 2,2-bis(4-cyanatophenyl)propane, 2,2-bis(4-cyanatophenyl)1,1,1,3,3,3-hexafluoropropane, di(4-cyanatophenyl)ether, di(4-cyanatophenyl)thio ether, 4,4-dicyanatobiphenyl, 1,3-bis(4-cyanatophenyl-1-(1-methylethylidene))benzene, 1,4-bis(4-cyanatophenyl-1-(1-methylethylidene))benzene and resorcinol dicyanate. Other cyanate esters may include the cyanate ester of phenol formaldehyde novolak, cyanate ester of phenol dicyclopentadiene novolak, 1,1,1-tris(4-cyanatophenyl)ethane.

In some instances, cyanate ester prepolymers are prepolymers produced by partial curing of the cyanate ester in the presence or absence of a catalyst. A typical example of such a cyanate ester prepolymer is partially cured bis(3,5-dimethyl-4-cyanatophenyl)methane, sold under the tradename AROCY M-20 by Ciba. Other cyanate esters are described in, for example, U.S. Pat. Nos. 7,115,681, 7,026,411, 6,403,229 and 6,194,495, each of which are incorporated herein by reference.

Curing Agent/Hardener

Hardeners and curing agents may be provided for promoting the cure of the thermosetting resins. For example, a hardener or curing agent may be provided for promoting crosslinking of the epoxy resin composition to form a polymer composition. The hardeners and curing agents described herein may be used individually or as a mixture of two or more.

Curing agents may include primary and secondary polyamines and their adducts, anhydrides, and polyamides. For example, polyfunctional amines may include aliphatic amine compounds such as diethylene triamine (D.E.H. 20, available from The Dow Chemical Company, Midland, Mich.), triethylene tetramine (D.E.H. 24, available from The Dow Chemical Company, Midland, Mich.), tetraethylene pentamine (D.E.H. 26, available from The Dow Chemical Company, Midland, Mich.), as well as adducts of the above amines with epoxy resins, diluents, or other amine-reactive compounds. Aromatic amines, such as metaphenylene diamine and diamine diphenyl sulfone, aliphatic polyamines, such as amino ethyl piperazine and polyethylene polyamine, and aromatic polyamines, such as metaphenylene diamine, diamino diphenyl sulfone, and diethyltoluene diamine, may also be used.

Anhydride curing agents may include, for example, nadic methyl anhydride, hexahydrophthalic anhydride, trimellitic anhydride, dodecenyl succinic anhydride, phthalic anhydride, methyl hexahydrophthalic anhydride, tetrahydrophthalic anhydride, methyl tetrahydrophthalic anhydride, and/or others.

The hardener or curing agent may include a phenol-derived or substituted phenol-derived novolac or an anhydride. Non-limiting examples of suitable hardeners include phenol novolac hardener, cresol novolac hardener, dicyclopentadiene phenol hardener, limonene type hardener, anhydrides, and mixtures thereof.

In some instances, the phenol novolac hardener may contain a biphenyl or naphthyl moiety. The phenolic hydroxy groups may be attached to the biphenyl or naphthyl moiety of the compound. This type of hardener may be prepared, for example, according to the methods described in EP915118A1. For example, a hardener containing a biphenyl moiety may be prepared by reacting phenol with bismethoxy-methylene biphenyl.

In some instances, curing agents may include dicyandiamide and diaminocyclohexane. Curing agents may also include imidazoles, their salts, and adducts. These epoxy curing agents are typically solid at room temperature. Examples of suitable imidazole curing agents are disclosed in EP906927A1. Other curing agents include aromatic amines, aliphatic amines, anhydrides, and phenols.

In some instances, the curing agents may be an amino compound having a molecular weight up to 500 per amino group, such as an aromatic amine or a guanidine derivative. Examples of amino curing agents include 4-chlorophenyl-N,N-dimethyl-urea and 3,4-dichlorophenyl-N,N-dimethyl-urea.

Some examples of curing agents include: 3,3'- and 4,4'-diaminodiphenylsulfone; methylenedianiline; bis(4-amino-3,5-dimethylphenyl)-1,4-diisopropylbenzene available as EPON 1062 from Shell Chemical Co.; and bis(4-aminophenyl)-1,4-diisopropylbenzene available as EPON 1061 from Shell Chemical Co.

In some instances, thiol curing agents for epoxy compounds can be used. For example, thiol curing agents are described in U.S. Pat. No. 5,374,668. In some instances, "thiol" can also include polythiol or polymercaptan curing agents. Some example thiols include aliphatic thiols such as methanedithiol, propanedithiol, cyclohexanedithiol, 2-mercaptoethyl-2,3-dimercaptosuccinate, 2,3-dimercapto-1-propanol(2-mercaptoacetate), diethylene glycol bis(2-mercaptoacetate), 1,2-dimercaptopropyl methyl ether, bis(2-mercaptoethyl)ether, trimethylolpropane tris(thioglycolate), pentaerythritol tetra(mercaptopropionate), pentaerythritol tetra(thioglycolate), ethyleneglycol dithioglycolate, trimethylolpropane tris(beta-thiopropionate), tris-mercaptan derivative of tri-glycidyl ether of propoxylated alkane, and dipentaerythritol poly(beta-thiopropionate); halogen-substituted derivatives of the aliphatic thiols; aromatic thiols such as di-, tris- or tetra-mercaptobenzene, bis-, tris- or tetra-(mercaptoalkyl)benzene, dimercaptobiphenyl, toluenedithiol and naphthalenedithiol; halogen-substituted derivatives of the aromatic thiols; heterocyclic ring-containing thiols such as amino-4,6-dithiol-sym-triazine, alkoxy-4,6-dithiol-symtriazine, aryloxy-4,6-dithiol-sym-triazine and 1,3,5-tris(3-mercaptopropyl) isocyanurate; halogen-substituted derivatives of the heterocyclic ring-containing thiols; thiol compounds having at least two mercapto groups and containing sulfur atoms in addition to the mercapto groups such as bis-, tris- or tetra(mercaptoalkylthio)benzene, bis-, tris- or tetra(mercaptoalkylthio)alkane, bis(mercaptoalkyl) disulfide, hydroxyalkylsulfidebis(mercaptopropionate), hydroxyalkylsulfidebis(mercaptoacetate), mercaptoethyl ether bis(mercaptopropionate), 1,4-dithian-2,5-diolbis(mercaptoacetate), thiodiglycolic acid bis(mercaptoalkyl ester), thiodipropionic acid bis(2-mercaptoalkyl ester), 4,4-thiobutyric acid bis(2-mercaptoalkyl ester), 3,4-thiophenedithiol, bismuththiol and 2,5-dimercapto-1,3,4-thiadiazol.

Aliphatic polyamines that are modified by adduction with epoxy resins, acrylonitrile, or (meth)acrylates may also be utilized as curing agents. In addition, various Mannich bases can be used. Aromatic amines wherein the amine groups are directly attached to the aromatic ring may also be used.

The suitability of the curing agent for use herein may be determined by reference to manufacturer specifications or routine experimentation. Manufacturer specifications may be used to determine if the curing agent is an amorphous solid or a crystalline solid at the desired temperatures for mixing with the liquid or solid epoxy. Alternatively, the solid curing agent may be tested using simple crystallography to determine the amorphous or crystalline nature of the solid curing agent and the suitability of the curing agent for mixing with the epoxy resin in either liquid or solid form.

In some instances, the hardener may be used at a concentration to achieve a molar ratio of the respective reactive groups (thermoset resin to hardener) between about 0.2 and about 5, for example, between about 0.5 and 2, between about 0.8 and 1.25, and/or between about 0.9 and 1.1.

Chain Extenders

Chain extenders may be used as an optional component in the polymer. Compounds which may be used in the curable polymer as a chain extender include any compound having an average of about 2 hydrogen atoms per molecule which are reactive with vicinal epoxy groups. In some instances, dihydric and polyhydric phenolic compounds may be used, including, for example, xanthenes, phthaleins and sulfonphthaleins having two phenolic hydroxyl groups.

In some instances, chain extenders may include phenolic hydroxyl-containing compounds such as, for example, resorcinol, catechol, hydroquinone, bisphenol A, bisphenol K, bisphenol S, tetramethylbisphenol A, tetratertiarybutyl-bisphenol A, tetrabromobisphenol A, phenolphthalein, phenolsulfonphthalein, fluorescein, 4,4'-dihydroxybiphenyl, 3,5,3',5-tetramethyl-4,4'-dihydroxybiphenyl, 3,5,3',5'-tetrabromodihydroxybiphenyl, 3,5,3',5'-tetramethyl-2,6,2',6'-tetrabromo-4,4'-dihydroxybiphenyl, reaction products of dicyclopentadiene or oligomers thereof and a phenolic compound, mixtures thereof and the like. Other suitable chain extenders may include, for example, aniline, toluidine, butylamine, ethanolamine, N,N'-dimethyl phenylene diamine, phthalic acid, adipic acid, fumaric acid, 1,2-dimereapto-4-methylbenzene, diphenyloxide dithiol, 1,4-butanedithiol, mixtures thereof and the like.

In some instances, the chain extender may be a nitrogen-containing monomer for example, an isocyanate, and amine or amide. In some instances, chain extenders may include epoxy-polyisocyanate compounds, for example, as described in WO 99/00451 and U.S. Pat. No. 5,112,932. Isocyanate compounds useful as chain extenders include, for example, MDI, TDI and isomers thereof.

The nitrogen-containing chain extender may also be, for example an amine- or amino amide-containing compound which forms epoxy-terminated amine compounds having two N—H bonds capable of reacting with an epoxy group. Amine-containing chain extenders include, for example, mono-primary amines of the general formula R—NH2 wherein R is alkyl, cycloalkyl or aryl moieties; di-secondary amines of the general formula R—NH—R'—NH—R" wherein R, R' and R" are alkyl, cycloalkyl or aryl moieties; and heterocyclic di-secondary amines wherein one or both of the N atoms is part of a nitrogen containing heterocyclic compound. Examples of amine-containing chain extender may include 2,6-dimethyl cyclohexylamine or 2,6-xylidine (1-amino-2,6-dimethylbenzene). Aromatic diamines may be used in other embodiments, such as, for example, with 3,3'-dichloro-4,4'-diaminodiphenyl methane or 4,4'-methylene-bis(3-chloro-2,6-diethylaniline) and 3,3-dimethyl-4,4'-diaminodiphenyl.

Amino amide-containing compounds useful as chain extenders include, for example, derivatives of carboxylic acid amides as well as derivatives of sulfonic acid amides having additionally one primary or two secondary amino groups. Examples of such compounds include amino-aryl carboxylic acid amides and amino-arylsulfonamides, such as sulfanilamide(4-amino benzenesulfonamide) and anthranilamide(2-aminobenzamide).

In some instances, the amount of the chain extender used is an amount from 1 to 40 weight percent, based on the epoxy resin. For example, the chain extender may be used in an amount ranging from 2 to 35 weight percent, from 3 to 30 weight percent, and/or from 5 to 25 weight percent, each based on the amount of epoxy resin.

Solvent

In some instances, a solvent or a blend of solvents is added to the curable polymer including the epoxy resin composition. The solvent used in the epoxy resin composition may be miscible with the other components in the resin composition. The solvent used may be selected from those typically used in making electrical laminates. Examples of suitable solvents include, for example, ketones, ethers, acetates, aromatic hydrocarbons, cyclohexanone, dimethylformamide, glycol ethers, and combinations thereof.

Solvents for the catalyst and the inhibitor may include polar solvents. Lower alcohols having from 1 to 20 carbon atoms, such as, for example, methanol, provide good solubility and volatility for removal from the resin matrix when prepregs are formed. Other useful solvents may include, for example, N,-methyl-2-pyrrolidone, dimethylsulfoxide, dimethylformamide, tetrahydrofuran, 1,2-propane diol, ethylene glycol and glycerine.

The total amount of solvent used in the curable polymer including the epoxy resin composition generally may range from about 1 to about 65 weight percent in some embodiments. In other instances, the total amount of solvent may range from 2 to 60 weight percent; from 3 to 50 weight percent in other embodiments; and from 5 to 40 weight percent in yet other embodiments.

Catalyst

In some instances, a catalyst may be used to promote the reaction between the epoxy resin component and the curing agent or hardener. Catalysts may include, for example, an imidazole or a tertiary amine. Other catalysts may include tetraalkylphosphonium salts, tetraalkylammonium salts, and the like; benzyl dimethylamine; dimethyl aminomethyl phenol; and amines, such as triethylamine, imadazole derivatives, and the like.

Tertiary amine catalysts are described, for example, in U.S. Pat. No. 5,385,990. Illustrative tertiary amines include methyldiethanolamine, triethanolamine, diethylaminopropylamine, benzyldimethyl amine, m-xylylenedi(dimethylamine), N,N'-dimethylpiperazine, N-methylpyrrolidine, N-methyl hydroxypiperidine, N,N,N',N'-tetramethyldiaminoethane, N,N,N',N',N'-pentamethyldiethylenetriamine, tributyl amine, trimethyl amine, diethyldecyl amine, triethylene diamine, N-methyl morpholine, N,N,N'N'-tetramethyl propane diamine, N-methyl piperidine, N,N'-dimethyl-1,3-(4-piperidino)propane, pyrridine and the like. Other tertiary amines include 1,8-diazobicyclo[5.4.0]undec-7-ene, 1,8-diazabicyclo[2.2.2]octane, 4-dimethylaminopyrridine, 4-(N-pyrrolidino)pyrridine, triethyl amine and 2,4,6-tris(dimethylaminomethyl)phenol.

Catalysts may include imidazole compounds including compounds having one imidazole ring per molecule, such as imidazole, 2-methylimidazole, 2-ethyl-4-methylimidazole, 2-undecylimidazole, 2-heptadecylimidazole, 2-phenylimidazole, 2-phenyl-4-methylimidazole, 1-benzyl-2-methylimidazole, 2-ethylimidazole, 2-isopropylimidazole, 2-phenyl-4-benzylimidazole, 1-cyanoethyl-2-methylimidazole, 1-cyanoethyl-2-ethyl-4-methylimidazole, 1-cyanoethyl-2-undecylimidazole, 1-cyanoethyl-2-isopropylimidazole, 1-cyanoethyl-2-phenyl imidazole, 2,4-diamino-6-[2'-methylimidazolyl-(1)']ethyl-s-triazine, 2,4-diamino-6-[2'-ethyl-4-methylimidazolyl-(1)']-ethyl-s-triazine, 2,4-diamino-6-[2'-undecylimidazolyl-(1)']-ethyl-s-triazine, 2-methylimidazolium-isocyanuric acid adduct, 2-phenyl imidazolium-isocyanuric acid adduct, 1-aminoethyl-2-methylimidazole, 2-phenyl-4,5-dihydroxymethylimidazole, 2-phenyl-4-methyl-5-hydroxymethylimidazole, 2-phenyl-4-benzyl-5-hydroxymethylimidazole and the like; and compounds containing 2 or more imidazole rings per molecule which are obtained by dehydrating above-named hydroxymethyl-containing imidazole compounds such as 2-phenyl-4,5-dihydroxymethylimidazole, 2-phenyl-4-methyl-5-hydroxymethylimidazole and 2-phenyl-4-benzyl-5-hydroxymethylimidazole; and condensing them by deformaldehyde reaction, e.g., 4,4'-methylene-bis-(2-ethyl-5-methylimidazole), and the like.

Catalysts that may be used with cyanate ester resins, for example, may include carboxylate salts, phenols, alcohols, amines, urea derivatives, imidazoles, and metal chelates. In some instances, the catalyst may include octoate, carboxylate, or acetylacetonate salts of zinc, cobalt, copper, manganese, iron, nickel, or aluminum.

Catalysts that may be used to form phenolic resins may include, for example, various amines and hydroxides, examples of which include caustic sodium hydroxide, triethylamine, ammonia, lithium hydroxide, ammonium hydroxide and triethanolamine.

In some instances, combinations of two or more catalyst may be used. In certain instances, at least one catalyst used may react at a temperature greater than that of the curing agent used in the composition. For example, where a curing agent initiates reaction at a temperature of 150° C., the catalyst may initiate react at 180° C.

The concentration of catalyst used in curable compositions disclosed herein may be between about 10 ppm and about 5 percent by weight based on the total weight of thermosetting resin and hardener, if used; between about 100 ppm and 3 percent by weight in other embodiments; and between 1000 ppm and 2 percent by weight in yet other embodiments.

High Temperature Resistant Thermoplastics

High temperature resistant thermoplastics may be combined with the above described thermosetting resins to improve at least one of dampening ranges, performance at high temperatures, and processability. For example, high temperature resistant thermoplastics may include polyetherimides, polyphenylene ether, polyoxyphenylenes, polysulphone, syndiotactic polystyrene, polyaryl ether ketones, polycarbonates, acetals, polyimides, polyarylene sulfides, and/or others.

Examples of polyphenylene ethers and a method for their production are described in, for example, U.S. Pat. No. 4,734,485. Examples of polyarylene sulfides are described in, for example, U.S. Pat. No. 5,064,884. Examples of polyaryl ether ketones are described in, for example, U.S. Pat. No. 5,122,588.

Polyetherimide resins may include, for example, the reaction product formed by melt polymerization of 2,2-bis[4-(3,4-dicarboxyphenoxy)phenyl]propane dianhydride with one or more of paraphenylene diamine and metaphenylene diamine, such as disclosed in U.S. Pat. No. 6,753,365. Other polyetherimides resins may include those described in, for example, U.S. Pat. Nos. 6,239,232, 6,403,684, and 6,011,122. Other high temperature resistant thermoplastics are described in, for example, U.S. Pat. Nos. 6,548,608, 3,984,604, 6,894,102, 6,890,973, 6,875,804, 6,008,293, and 5,352,727.

In some instances, the high temperature resistant thermoplastic resin used in the thermosetting compositions are selected from any thermoplastic resin that does not undergo a thermal decomposition of more than about 5 weight percent at about 100° C. In some instances, the thermoplastic resin does not undergo a thermal decomposition of more than about 5 weight percent at about 150° C. In some instances, the thermoplastic resin does not undergo a thermal decomposition of more than about 5 weight percent at about 200° C.

In some instances, the concentration of high temperature resistant thermoplastic resins may be between about 0.1 percent and 60 percent, based on the total weight of the thermosetting composition. For example, the concentration of high temperature resistant thermoplastic resins may be between about 0.5 percent and 50 percent by weight, between about 1 percent and 40 percent by, between about 2 percent and about 30 percent by weight, and/or between about 5 percent and 20 percent by weight.

In some instances, the resulting thermoset dampener composition has distinct phases, including a thermoset resin phase and a high temperature thermoplastic resin phase. In certain instances, the thermoset dampener compositions maintain the concentration of high temperature thermoplastic resin below a maximum concentration, such that the cured thermoset resin forms the continuous phase. In some instances, the thermoplastic phase forms discretely dispersed particles within the thermoset network such that the size of the dispersed thermoplastic domains is less than about 100 microns. For example, the size of the dispersed thermoplastic domains can be 50 microns, 20 microns, 10 microns, 5 microns, and/or less than 5 microns.

Optional Additives

The polymer may also include optional additives and fillers conventionally found in thermoset or epoxy systems. For example, thermoset compositions and dampener materials may include toughening agents, curing inhibitors, wetting agents, colorants, processing aids, UV blocking compounds, fluorescent compounds, and other additives.

Additives and fillers may include silica, glass, talc, quartz, metal powders, titanium dioxide, wetting agents, pigments, coloring agents, mold release agents, coupling agents, flame retardants, ion scavengers, UV stabilizers, flexibilizing agents, and tackifying agents. Additives and fillers may also include fumed silica, aggregates such as glass beads, polytetrafluoroethylene, polyol resins, polyester resins, phenolic resins, graphite, molybdenum disulfide, abrasive pigments, viscosity reducing agents, boron nitride, mica, nucleating agents, stabilizers, and/or others. Fillers and modifiers may be preheated to drive off moisture prior to addition to the epoxy resin composition. Additionally, these optional additives may have an effect on the properties of the polymer, before and/or after curing, and should be taken into account when formulating the polymer and the desired reaction product.

In some instances, the polymer includes toughening agents. Toughening agents function by forming a secondary phase within the polymer matrix. This secondary phase is rubbery and hence is capable of crack growth arrestment, providing improved impact toughness. Toughening agents may include polysulfones, silicon-containing elastomeric polymers, polysiloxanes, and other rubber toughening agents known in the art.

Inorganic fillers may have at least one average dimension between about 1 mm and 2 nm. For example, an average dimension of the inorganic filters can be about 100 microns, about 50 microns, about 10 microns, about 10 nm, about 20 nm, or about 50 nm.

In some instances, the thermosetting compositions include fibrous reinforcement materials, such as continuous and/or chopped fibers. The fibrous reinforcement material may include glass fibers, carbon fibers, or organic fibers such as polyamide, polyimide, and polyester. The concentration of fibrous reinforcements used in the thermosetting compositions may be between about 1 percent to about 95 percent by weight, based on the total weight of the composition. For example, the concentration of fibrous reinforcements used in the thermosetting compositions can be between about 5 percent and 90 percent by weight, between about 10 percent and 80 percent, between about 20 percent and 70 percent, and/or between 30 percent and 60 percent.

In some instances, the polymer disclosed herein may include nanofillers. Nanofillers may include inorganic, organic, or metallic, and may be in the form of powders, whiskers, fibers, plates or films. The nanofillers may be generally any filler or combination of fillers having at least one dimension (length, width, or thickness) from about 0.1 to about 100 nanometers. For example, for powders, the at least one dimension may be characterized as the grain size; for whiskers and fibers, the at least one dimension is the diameter; and for plates and films, the at least one dimension is the thickness. Clays, for example, may be dispersed in an epoxy resin-based matrix, and the clays may be broken down into very thin constituent layers when dispersed in the epoxy resin under shear. Nanofillers may include clays, organo-clays, carbon nanotubes, nanowhiskers (such as SiC), SiO2, elements, anions, or salts of one or more elements selected from the s, p, d, and f groups of the periodic table, metals, metal oxides, and ceramics.

The concentration of any of the above described additives, when used in the thermosetting compositions described herein, may be between about 1 percent and 95 percent, based on the total weight of the composition.

Substrates

The substrate [or object] can take many forms. In some instances, substrates include metals, such as stainless steel, iron, steel, copper, zinc, tin, aluminium, alumite and the like; alloys of such metals, and sheets which are plated with such metals and laminated sheets of such metals. Substrates may also include polymers, glass, and various fibers, such as, for example, carbon/graphite; boron; quartz; aluminum oxide; glass such as E glass, S glass, S-2 GLASS® or C glass; and silicon carbide or silicon carbide fibers containing titanium. Commercially available fibers may include: organic fibers, such as KEVLAR; aluminum oxide-containing fibers, such as NEXTEL fibers from 3M; silicon carbide fibers, such as NICALON from Nippon Carbon; and silicon carbide fibers containing titanium, such as TYRRANO from Ube. In some instances, the substrate may be coated with a compatibilizer to improve the adhesion of the curable or cured composition to the substrate.

In certain instances, the curable polymer may be used as coatings for substrates that cannot tolerate high temperatures. In some instances, the curable polymer may be used with substrates whose dimensions and shape make it difficult to apply homogeneous heating, for example, such as windmill blades.

Composites and Coated Structures

The curable polymer and the composites described herein may be produced conventionally, accounting for the alteration in the epoxy resin compositions before they are cured, including the stoichiometric excess of epoxy resin and the temperature stable catalyst. In some instances, composites may be formed by curing the curable polymer. In some instances, composites may be formed by applying a curable epoxy resin composition to a substrate or a reinforcing material, such as by impregnating or coating the substrate or reinforcing material, and curing the curable polymer.

In some instances, the above described curable polymer may be in the form of a powder, slurry, or a liquid. After a curable polymer has been produced, it may be disposed on, in, and/or between the above described substrates, before, during, or after cure of the curable polymer.

For example, a composite may be formed by coating a substrate with a curable polymer. Coating may be performed by various procedures, including spray coating, curtain flow coating, coating with a roll coater or a gravure coater, brush coating, and dipping or immersion coating.

In certain instances, the substrate may be monolayer or multi-layer. For example, the substrate may be a composite of two alloys, a multi-layered polymeric article, a metal-coated polymer, and/or others, for example. In some instances, one or more layers of the curable polymer may be disposed on a substrate. For example, a substrate coated with a polyurethane-rich curable polymer may additionally be coated with an epoxy resin-rich curable composition. Other multi-layer composites, formed by various combinations of substrate layers and curable composition layers are also envisaged herein.

In some instances, the heating of the curable polymer may be localized, such as to avoid overheating of a temperature-sensitive substrate, for example. In some instances, the heating may include heating the substrate and the curable polymer.

In some instances, the curable polymer, composites, and coated structures described above may be cured by heating the curable polymer to a temperature sufficient to initiate reaction of the curing agent. During the initial cure, secondary hydroxyl groups may be formed as the curing agent reacts. Following at least partial reaction of the curing agent and epoxy, the temperature of the curable polymer, composite, or coated structure may be increased to a temperature sufficient for the catalyst to catalyze the reaction of the secondary hydroxyl groups with the excess epoxy resin. In this manner, the stoichiometric excess of epoxy may be reacted without significant degradation of the epoxy thermoset.

In some instances, the additional crosslinking that forms during the reaction of the excess epoxy may decrease the bulk density of the epoxy thermoset, and/or may increase the fracture toughness of the epoxy thermoset. In some instances, the reaction of the stoichiometric excess of epoxy may avoid the deleterious effects that unreacted epoxy may have on the thermoset composition, as described in the prior art, resulting in a thermoset composition having one or more of adequate or improved heat resistance, solvent resistance, low moisture absorption, reflow reliability, electrical properties, glass transition temperature, adhesion, and/or others.

Curing of the curable polymer may require a temperature of at least about 30° C., up to about 250° C., for periods of minutes up to hours, depending on the epoxy resin, curing agent, and catalyst, if used. In some instances, curing may occur at a temperature of at least 100° C., for periods of minutes up to hours. Post-treatments may be used, for example, at temperatures between about 100° C. and 250° C.

In some instances, curing may be staged to prevent exotherms. Staging, for example, includes curing for a period of time at a temperature followed by curing for a period of time at a higher temperature. Staged curing may include two or more curing stages, and may commence at temperatures below about 180° C. in some instances, for example, below about 150° C.

In some instances, curing temperatures may range from a lower limit of 30° C. to an upper limit of 250° C. In certain instances, curing temperatures include a consistent temperature throughout curing. In certain instances, curing temperatures include a range of temperatures between 30° C. and 250° C., or a range within 30° C. to 250° C. For example, curing temperatures may be 40° C., 50° C., 60° C., 70° C., 80° C., 90° C., 100° C., 110° C., 120° C., 130° C., 140° C., 150° C., 160° C., 170° C., or 180° C., 190° C., 200° C., 210° C., 220° C., 230° C., and/or 240° C. In some instances, curing occurs in a manufacturing step of the tool.

In some instances, the materials for the polymer are introduced (e.g., pumped) downhole for in situ curing. Such compositions may include at least one thermosetting resin, and optionally at least one of a hardener, a catalyst, an inorganic filler, a fibrous reinforcement, a high temperature resistant thermoplastic resin, and a solvent. In some instances, following cure of the thermosetting composition, the cured polymer may have at least one of a glass transition temperature of at least 78° C., a high dampening factor defined by tan δ greater than 0.2 with a peak width at half-height of less than 70° C., as measured by dynamic thermo-mechanical analysis (DMTA) at a frequency of 1 Hz.

In some instances, additional components are introduced downhole with the polymer. Such components could directly or indirectly influence the performance of the polymer. For example, a soluble material (i.e. hydrocarbon oil, gas, or similar) pumped into the wellbore and absorbed into the polymer would plasticize the polymer and further soften the material. Such a step would depress the relevant transition (i.e. glass transition temperature) to induce a pronounced change in the viscoelastic response as described elsewhere in this document. In another example, a soluble material (i.e. tackifier, higher Tg polymer, crosslinker, formulation or similar) or equivalent process (e.g., radiation induced cross-linking) would elevate the relevant transition (i.e. the glass transition temperature) of the polymer and thereby induce a more pronounced change in the viscoelastic response. In some instances, addition of higher amounts of plasticizer or Tg elevating materials could result in diminishment of viscoelastic response. In certain instances, addition of high amounts of plasticizer that shifts Tg well below the service temperature results in a rubbery state with substantially rate insensitive behavior. In certain instances, addition of high amounts of material that shifts Tg well above the service temperature results in a glassy state with substantially rate insensitive behavior. In certain instances, the temperature of the polymer is changed to induce a specific response (e.g., lowered for stiffer, glassy properties; higher for softer, rubbery behavior). Temperature change of the polymer can be accomplished, for example, through a material change (e.g., cooling or heating liquid) or a process (e.g., heat transfer). In certain instances, a change to the relevant transition or the change in temperature occurs due to other components or tools accompanying the polymer. Such triggered responses used to toggle on/off viscoelasticity by means of introduction of additional component(s) would be beneficial in terms of additional means control of the polymer, for example, to increase operating efficiency and reliability of a well tool. For example, polymer particles can be pumped into a well screen to bridge off the well screen. The particles can then be softened and removed to reopen the well screen. In another example, a packer including the polymer is set in a wellbore, and a tackifier is added to stiffen the material to increase elastomeric properties of the polymer at specified wellbore temperatures. In another example, a cement plug of the polymer is pumped to the bottom of a well, and a large amount of tackifier is pumped to the cement plug to transition the cement plug to a glassy state. In certain instances, the glassy state is easier to drill through, for example, in drilling up the cement plug with a drill bit or mill.

The curable polymer disclosed herein may be useful in composites containing high strength filaments or fibers such as carbon (graphite), glass, boron, and the like. In some instances, the composites may contain from about 30% to about 70% of these fibers based on the total volume of the composite.

Fiber reinforced composites, for example, may be formed by hot melt prepregging. The prepregging method is characterized by impregnating bands or fabrics of continuous fiber with a thermosetting epoxy resin composition as described herein in molten form to yield a prepreg, which is laid up and cured to provide a composite of fiber and thermoset resin.

Other processing techniques can be used to form composites containing epoxy-based compositions. For example, filament winding, solvent prepregging, and pultrusion are typical processing techniques in which the uncured epoxy resin may be used. Moreover, fibers in the form of bundles may be coated with the uncured epoxy resin composition, laid up as by filament winding, and cured to form a composite.

c. TPV Compositions

In some instances, the polymer includes a thermoplastic vulcanizate (TPV). The TPV compositions include at least a thermoplastic polymer as the matrix phase. Example thermoplastic polymers include polyethylene, polypropylene, polycarbonate, olefin block copolymers, block composites, polystyrene, polyethylene terephthalate, nylon, branched polyethylene (such as high density polyethylene), branched polypropylene, branched polycarbonate, branched polystyrene, branched polyethylene terephthalate, and/or branched nylon. In some instances, the polymer does not use a thermoplastic polyolefin, whereas in other instances, the polymer uses a thermoplastic polyolefin. For example, some thermoplastic polyolefins that can be used in the polymer are described in U.S. Pat. No. 7,579,408, col. 25, line 4 through col. 28, line 28.

In some instances, the TPV compositions also include at least a vulcanizable elastomer. Any vulcanizable elastomer may be used to form a TPV, provided that it can be cross-linked (i.e., vulcanized) by a cross-linking agent. Vulcanizable elastomers, although thermoplastic in the uncured state, are normally classified as thermosets because they undergo an irreversible process of thermosetting to an unprocessable state. Examples of vulcanizable elastomers include those disclosed in U.S. Pat. No. 7,579,408, col. 29, line 61 through col. 31, line 40. In some examples, the vulcanizable elastomers are EPDM, ethylene/α-olefins, olefin block copolymers and/or block composites.

In some instances, the polymer can include any cross-linking agent which is capable of curing an elastomer, preferably without substantially degrading and/or curing the thermoplastic polymer used in a TPV. The cross-linking agent can include phenolic resin, peroxides, azides, aldehyde-amine reaction products, vinyl silane grafted moieties, hydrosilylation, substituted ureas, substituted guanidines, substituted xanthates, substituted dithiocarbamates, sulfur-containing compounds such as thiazoles, imidazoles, sulfenamides, thiuramidisulfides, paraquinonedioxime, dibenzoparaquinonedioxime, sulfur, combinations thereof, and/or other cross-linking agents. For example, suitable cross-linking agents may include those disclosed in U.S. Pat. No. 7,579,408, col. 31, line 54 through col. 34, line 52.

The properties of a TPV may be modified, either before or after vulcanization, by addition of ingredients which are conventional in the compounding of EPDM rubber, thermoplastic polymer resin and blends thereof. Examples of such ingredients include particulate filler such as carbon black, amorphous precipitated or fumed silica, titanium dioxide, colored pigments, clay, talc, calcium carbonate, wollastonite, mica, montmorillonite, glass beads, hollow glass spheres, glass fibers, zinc oxide and stearic acid, stabilizers, antidegradants, flame retardants, processing aids, adhesives, tackifiers, plasticizers, wax, discontinuous fibers, such as wood cellulose fibers and extender oils. Example additives can include those disclosed in U.S. Pat. No. 7,579,408, col. 34, line 54 through col. 35, line 39.

Thermoplastic vulcanizates are typically prepared by blending plastic and cured rubbers by dynamic vulcanization. The compositions can be prepared by any suitable method for mixing of rubbery polymers including mixing on a rubber mill or in internal mixers such as a Banbury mixer. Example details on suitable methods can include those disclosed in U.S. Pat. No. 7,579,408, col. 35, line 40 through col. 39, line 16.

Thermoplastic vulcanizate compositions are useful for making a variety of articles such as tires, hoses, belts, gaskets, moldings and molded parts. They are particularly useful for applications that require high melt strength such as large part blow molding, foams, and wire cables. They also are useful for modifying thermoplastic resins, in particular, thermoplastic polymer resins. Example TPV applications can include those disclosed in U.S. Pat. No. 7,579,408, col. 39, line 25 through col. 40, line 45.

It is further recognized that viscoelastic components including polyolefins, EPDM, and the like tend to absorb hydrocarbons and swell. In some instances, a viscoelastic component with a hydrocarbon absorbing polymer uses swelling in a normal operation of a tool. In some instances, it is undesirable for the polymer to swell in the normal operation of a tool due to exposure to another material (i.e. hydrocarbon, water, gases, Hg, etc.). In certain instances, additional components can be used in a variety of composite configurations in the polymer to act as a barrier to exposure of the polymer to the hydrocarbon.

d. Polyurethane

In some instances, the polymer includes a urethane component. For example, a "radiation curable urethane component" is a compound having urethane linkages and at least one functional group that can be cured by exposure to radiation. The first of these components generally imparts a high Tg to the polymer, and includes at least three radiation curable functionalities. In some instances, the second of these components generally imparts a high elongation to the polymer. The polymer can also include one or more mono- or poly-functional reactive monomers that can also influence the properties of coating compositions. Additives standard in the art, such as photoinitiators, thermal initiators, releasing agents, anti-oxidants, UV absorbers, stabilizers and the like can also optionally be added.

The first radiation curable urethane generally imparts a Tg to the final composition of equal to or greater than about 50° C.; particularly suitable for matrix coating are those that impart a Tg of equal to or greater than about 85° C. The Tg of the composition can be measured using a dynamic mechanical analyzer following methods standard in the art, such as those described in the examples below. As used herein, "Tg" is defined as the temperature at the peak of Tan δ during a dynamic thermo mechanical test. It should be noted that "high Tg" refers to the Tg of the final composition and not the Tg of the radiation curable urethane itself.

The high Tg imparting radiation curable urethane can be formed by means standard in the art, such as through the reaction of a curable functionality-terminating aromatic-containing polyol oligomer, a polyisocyanate and an endcapping monomer. A particularly suitable starting material is one where the polyol oligomer is a diphenylmethane-containing polyol oligomer. A "diphenylmethane-containing polyol oligomer" refers to a compound containing at least one diphenylmethane moiety and comprising two terminating curable functionalities and at least two hydroxyl functionalities. The diphenylmethane-containing polyol generally comprises from 1 to 4 diphenylmethane groups, for example, as depicted in FIG. 20.

Figure 20:
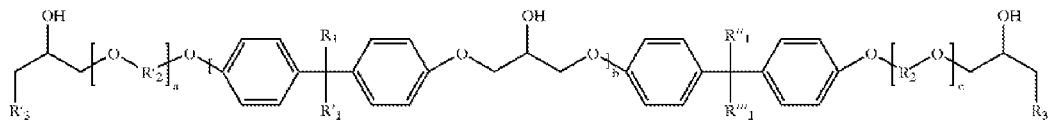
FIG. 20 is a schematic chemical structure of an example diphenylmethane-containing polyl.

In FIG. 20, $R_1$, $R'_1$, $R''_1$, and $R'''_1$ are the same or different and are selected from hydrogen or a linear or branched lower alkyl group having 1 to 16 carbon atoms; $R_2$ and $R'_2$ are the same or different and are selected from linear or branched alkyl groups having 2 to 8 carbon atoms; $R_3$ and $R'_3$ are the same or different and include reactive moieties selected from acrylic, methacrylic, vinylic, allylic, styrenic, acrylamide, norbornenyl, acetylenic, epoxy, mercapto, amino, itanoic and crotonic moieties; a and c are the same or different and are from 0 to 20; and b is from 0 to 3. The "$R_1$" structures are typically hydrogen, methyl, ethyl, propyl, butyl and the like. In a particularly suitable embodiment, $R_3$ and $R'_3$ are acrylic ester structures, b is 0, and a and c are 0 to 6. Even more suitable is an implementation where all of the "$R_1$" structures are methyl and a, b, and c are all 0. Typically, these polyols are derived from diacrylated bisphenol diglycidyl ethers or their alkoxylated derivatives, i.e. compounds where there are alkoxyl chains between the bisphenol structure and the glycidyl structure. In some examples, the bisphenols used in producing these polyols are bisphenol A. Examples of such polyols include the so-called epoxy acrylate oligomers from Sartomer Company (Exton, Pa.) known as CN-104 and CN-120.

The polyisocyanate component can be either aromatic or aliphatic. Aliphatic polyisocyanates of 4 to 20 carbon atoms may be employed. Suitable saturated aliphatic polyisocyanates include but are not limited to isophorone diisocyanate, methylenebis(4-cyclohexyl isocyanate), hydrogenated diphenylmethane diisocyanate, hydrogenated xylylene diisocyanate, 1,4-cyclohexyl diisocyanate, 1,3-cyclohexyl diisocyanate. Isophorone diisocyanate and methylenebis(4-cyclohexyl isocyanate) are particularly suitable. Suitable aromatic polyisocyanates include 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, and mixtures thereof.

The high Tg imparting radiation curable urethane has one or more cyclic ring structures per molecule, and, in some instances, has three or more cyclic rings. In some examples, at least one of the three or more cyclic ring structures per molecule in the high Tg imparting oligomer is aromatic. In examples where an aromatic ring is present, the aromatic ring can be introduced through the diacrylate-polyol, the polyisocyanate, or both. It will be appreciated that when an aromatic polyol and/or polyisocyanate is used, the resulting radiation curable urethane is not wholly aliphatic.

The endcapping monomer may be one that is capable of providing at least one radiation curable functionality, which, for example, may be acrylic, methylacrylic, vinylic, allylic, styrenic, acrylamide, norbornenyl, acetylenic, epoxy, mercapto, amino, itanoic, and crotonic moieties. The radiation-curable functionality typically used is ethylenic unsaturation, which can be polymerized through radical polymerization or cationic polymerization. Some examples of suitable ethylenic unsaturation include groups containing (meth)acrylate, styrene, vinylether, vinyl ester, N-substituted acrylamide, N-vinyl amide, maleate esters, and fumarate esters. "(Meth)acrylate" refers to both methacrylate and acrylate. Acrylate functionality is particularly suitable. Endcapping monomers that provide acrylate or methacrylate termini are particularly suitable and include but are not limited to hydroxyalkyl(meth)acrylates such as hydroxyethyl(meth)acrylate, hydroxypropyl(meth)acrylate, hydroxybutyl(meth)acrylate, 2-hydroxy-3-phenyloxypropyl(meth)acrylate, 1,4-butanediol mono(meth)acrylate, 4-hydroxycyclohexyl(meth)acrylate, 1,6-hexanediol mono(meth)acrylate, neopentyl glycol mono(meth)acrylate, trimethylolpropane di(meth)acrylate, trimethylolethane di(meth)acrylate, pentaerythritol tri(meth)acrylate, dipentaerythritol penta(meth)acrylate, and the like. A particularly suitable endcapping monomer is hydroxyethyl(meth)acrylate. 4-hydroxybutyl vinyl ether is a particularly suitable endcapping group for introducing vinyl ether termini.

In some instances, the molar ratio of the diphenylmethane-containing polyol, polyisocyanate and endcapping monomer used in preparing the high Tg imparting component is typically about 1:2-3:1-2, for example, a molar ratio of 1:2.5:1.5. The high Tg urethane acrylate based on the polyol of FIG. 20 will have a structure similar to the example diphenylmethane-containing polyl of FIG. 21.

Figure 21:
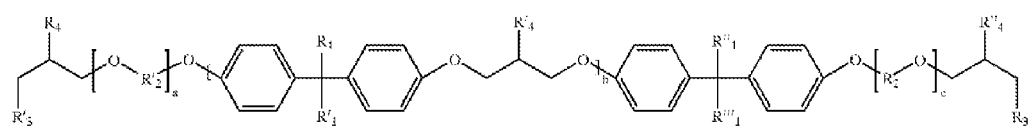
FIG. 21 is a schematic chemical structure of an example diphenylmethane-containing polyl with a high glass transition urethane acrylate.

As depicted in FIG. 21, all the hydroxyl groups from FIG. 20 are now shown as an "$R_4$" structure ($R_4$, $R'_4$, and $R''_4$). $R_4$, $R'_4$, and $R''_4$ can be the same or different and at least one of the "$R_4$" structures contains any of the reactive groups as defined above for $R_3$ and $R'_3$. It will be understood that only one of the hydroxyl groups shown in FIG. 20 needs to be functionalized with an "$R_4$" structure; such a molecule would contain three radiation-curable functionalities. The remaining "$R_4$" structures, if not further functionalized, would just be hydroxyl groups.

It is evident that one skilled in the art can devise other methods to synthesize the urethane compounds having structures as shown in FIG. 20 and FIG. 21. For example, such a product can be derived from a suitable alkoxylated bisphenol A diol, a diisocyanate, and a suitable endcapping monomer having more than one radiation curable moiety.

In some instances, the high Tg imparting urethane component is typically present in the polymer in amounts from 20 to 80 weight percent, such as from 30 to 70 weight percent, with weight percent being based on the total weight of the two urethane oligomers, or from 10 to 40 weight percent, with weight percent being based on the total weight of the polymer.

The second component of the polymer is a radiation curable urethane oligomer that imparts high elongation to the polymer. By "high elongation" is meant an elongation at break of equal to or greater than about 15 percent. The elongation will typically be less than 100 percent. In some instances, the coating is a matrix coating having an elongation of 35 to 65 percent and in other instances the coating is a secondary coating having an elongation of 15 to 25 percent.

Whether a particular radiation curable urethane polymer imparts a high elongation to a composition can be determined by one skilled in the art using standard methods. More specifically, the radiation curable urethane can be prepared and added into the polymer, which can then be tested for elongation on an Instron according to ASTM D-882 using 5 mil films. It should be noted that "high elongation" refers to the elongation of the final composition and not the elongation of the radiation curable urethane itself.

The high elongation imparting component can be prepared by reacting a polyol, a polyisocyanate and an endcapping monomer. More specifically, the high elongation imparting urethane component of the present compositions is the reaction product of an aliphatic or aromatic polyol, an aliphatic or aromatic polyisocyanate, and an endcapping monomer capable of supplying a reactive terminus. The polyol used in the reaction will typically be based on a diol having an Mn of at least about 2000 daltons. This includes polyether polyols such as polyols obtained by ring-opening polymerization or copolymerization of at least one type of compound selected from ethylene oxide, propylene oxide, butylene oxide, tetrahydrofuran, 2-methyl-tetrahydrofuran, 3-methyl-tetrahydrofuran, oxetane, and substituted oxetane. Other suitable polyols include propylene glycol and polypropylene glycol. Mixtures of all of these polyols can also be used. Examples of desirable polyol compounds are polytetramethylene glycol with an Mn of at least 2000 daltons. Particularly suitable polyols are polyTHF 2000 and polyTHF 2900 from BASF Corporation as well as TERATHANE 2000 and TERATHANE 2900 from DuPont. Other examples of desirable polyol compounds are polypropylene glycols with a number average molecular weight of at least 2000 such as PPG 2025 from Bayer or PLURACOL 4000 from BASF Corporation. Aromatic polyols can also be used here provided their Mn is at least 2000. Smaller polyols with more than two hydroxyl groups are also often used in addition to these relatively high molecular weight diols. Such polyols include 1,1,1-trimethylolpropane and its dimer, pentaerythritol and its dimer, glycerine and ribose, with 1,1,1-trimethylolpropane being particularly suitable.

Many of the aliphatic and aromatic polyisocyanates discussed above for the high Tg imparting component can also be used here. Tetramethylxylylene diisocyanate (TMXDI) is especially suitable. Additional suitable aliphatic polyisocyanates include 1,4-tetramethylene diisocyanate, 1,5-pentamethylene diisocyanate, 1,6-hexamethylene diisocyanate, 1,7-heptamethylene diisocyanate, 1,8-octamethylene diisocyanate, 1,9-nonamethylene diisocyanate, 1,10-decamethylene diisocyanate, and mixtures thereof. It will be appreciated that many of the aliphatic isocyanates listed here are more suited to the high elongation imparting component than the high Tg imparting component; that is because these isocyanates are very flexible and give low Tg materials.

The endcapping monomer is also described above for the high Tg imparting component; hydroxy alkyl acrylates are again particularly suitable.

The molar ratio of polyol, polyisocyanate and endcapping monomer used in preparing the high elongation imparting component is 0.8-3.0:1.0-4.0:1, for example, 1.0-2.2:1.5-3.0:1.

An example high elongation imparting component combines polytetramethylene glycol having an Mn of 2000 with trimethylolpropane, TMXDI, and hydroxyethyl acrylate in a molar ratio of 2.1:2.8:1. TERATHANE 2000 is a polytetramethylene glycol having an Mn of 2000. This molecule contains aromaticity and is therefore not wholly aliphatic. In some instances, both the high Tg and high elongation imparting components have aromatic moieties and thus neither are wholly aliphatic.

In some instances, the high elongation imparting radiation curable urethane is present in the polymer in an amount from about 20 to 70 weight percent, such as from 30 to 60 weight percent, with weight percent being based on the total weight of the urethane components. In some instances, the high elongation imparting radiation curable urethane is present in the polymer in an amount from 10 to 40 weight percent, with weight percent being based on the total weight of the polymer. In some instances, the amount of high elongation imparting component is less than 30 weight percent, for example, less than 20 weight percent of the total weight of the polymer. In certain instances, the ratio of high Tg imparting radiation curable urethane to high elongation imparting radiation curable urethane ranges from about 1:3 to about 3:1.

In some instances, neither of the radiation curable urethane oligomers contain isocyanurate structure, silicone-modified moieties, aliphatic diisocyanate residues and/or propoxylated acrylates. In some examples, neither of the oligomers has the structure described as the second oligomer, such as the oligomers of U.S. Pat. No. 5,837,750.

In some instances, both of the radiation curable urethane components of the polymer can be prepared using methods standard in the art. There are generally two protocols for making the radiation curable urethane oligomers described herein. One protocol involves reacting the isocyanate component with the polyol first and then reacting the resulting product with the endcapping monomer. It is suitable to synthesize the high Tg imparting oligomer using this protocol. The other protocol involves reacting the isocyanate component with the endcapping monomer followed by reaction with the polyol. It is suitable to prepare the high elongation imparting oligomer using this protocol. The "polyol", in the case of the first radiation curable urethane, refers to the aromatic-containing polyol oligomer. Suitable catalysts can be used to increase the reaction rate between the hydroxyl group and the polyisocyanate; such catalysts are known in the art and include, for example, dibutyltindilaurate, dibutyltinoxide, dibutyl tin di-2-hexoate, stannous oleate, stannous octoate, lead, octoate, ferrous acetoacetate, and amines such as triethyleneamine, diethylmethylamine, triethylenediamine, dimethylethylamine, morpholine, N-ethyl morpholine, piperazine, N,N-dimethyl benzylamine, N,N-dimethyl lauralamine and mixtures thereof.

In certain instances, the high elongation imparting radiation curable urethane component imparts elongation properties to the polymer. It is therefore possible to achieve a polymer having suitable elongation without the use of various thiol elongation promoters, such as the example mercapto or sulfide elongation promoters described in U.S. Pat. No. 6,265,476.

In some instances, the polymer includes one or more mono- or polyfunctional reactive monomers. These monomers can perform numerous functions in the polymer; for example, the reactive monomer(s) can be used to adjust the viscosity of the coating compositions or to increase the crosslinking density of the polymer. The monomers are reactive, which means they contain at least one functional group capable of polymerization under radiation curable conditions.

The monomers can be mono-, or polyfunctional. In some instances, a suitable combination is one in which two monofunctional monomers are combined with one polyfunctional monomer, such as a tri- or tetra-functional mix. An example combination includes isobornyl acrylate, N-vinylpyrrolidone ("NVP") and dipentaerythritol pentaacrylate. In this example combination, the isobornyl acrylate can be added to the polymer to lower the viscosity and contribute to Tg; NVP can be added to contribute to the high Tg, a fast cure, and the reduced viscosity of the polymer; and dipentaerythritol pentaacrylate can be added to improve the equilibrium modulus by increasing the crosslinking density. Suitable monomers may be straight or branched chain alkyl, cyclic or partially aromatic monomers, and can comprise, for example, a monomer or monomers having an acrylate or vinyl ether functionality and a C4-C20 alkyl or polyether moiety. Examples of such reactive monomers include hexylacrylate, 2-ethylhexylacrylate, isobornylacrylate, decylacrylate, laurylacrylate, stearylacrylate, ethoxyethoxy-ethylacrylate, laurylvinylether, 2-ethylhexylvinyl ether, N-vinyl formamide, isodecyl acrylate, isooctyl acrylate, vinylcaprolactam, N-vinylpyrrolidone, acrylamide, nonylphenol acrylate and the like. In some examples, none of the monomers are transesterified.

In some instances, a reactive monomer is a compound comprising an aromatic group. Examples include, but are not limited to, ethyleneglycolphenyletheracrylate, polyethyleneglycolphenyletheracrylate, polypropyleneglycolphenyletheracrylate, phenoxyethylacrylate, and alkyl-substituted phenyl derivatives of the above monomers, such as polyethyleneglycolnonylphenyletheracrylate.

Further examples of suitable monomers include C2-C18 hydrocarbondioldiacrylates, C4-C18 hydrocarbondivinylethers, C3-C18 hydrocarbontrioltriacrylates, the polyether analogs thereof, and the like, such as 1,6-hexanedioldiacrylate, trimethylolpropanetriacrylate, hexanedioldivinylether, triethyleneglycol diacrylate, and alkoxylated bisphenol A diacrylate. In some instances, the reactive monomers will be added in an amount ranging between about 25 and 75 weight percent of the total composition, such as 30 and 65 weight percent. If more than one reactive monomer is present, the amounts of monomers are added together to determine the amount of this component in the polymer. In some instances, certain compositions are excluded, for example, compositions where one of the monomers is taught in U.S. Pat. No. 5,998,497 when a polyether urethane acrylate and photoinitiator are also present. In some instances, monomers of the polymer do not have to be specially purified, for example, as disclosed in U.S. Pat. No. 6,323,255.

When there are three or more cyclic rings in 20 to 85 weight percent of the radiation curable urethane components, and there is also a polymerizable mono-functional vinyl monomer having a Tg greater than about 50° C., the urethane bonds are present in the polymer at a concentration of less than $2.0 \times 10^{-3}$ mol per gram.

In some instances, the polymer can be cured by free radical cure. In some instances, free radical cure includes steps of initiation, propagation, chain transfer and termination. When cationic curable functional groups are included in the composition, they can also be cured by cationic polymerization processes. Cure can be provoked by the use of actinic light, electron beam or heat depending on the application requirements; suitable initiators may also be included to effect initiation.

When radiation cure is desired, the polymer may include at least one photoinitiator. Conventional photoinitiators can be used, including benzophenones, acetophenone derivatives, such as alpha-hydroxyalkylphenylketones, benzoin alkyl ethers and benzyl ketals, monoacylphosphine oxides, and bisacylphosphine oxides. The conventional photoactive onium salts can be used to effect cationic cure. Particularly suitable free radical photoinitiators are combinations of an acetophenone derivative and a bisacylphosphine oxide, although in some instances, the bisacrylphosphine oxides described in U.S. Pat. No. 6,359,025 are specifically excluded.

When the liquid curable resin composition is to be heat cured, a thermal polymerization initiator such as a peroxide or an azo compound can be used. Specific examples include benzoyl peroxide, t-butyl oxybenzoate and azobisisobutyronitrile.

In certain instances, the amount of photoinitiator or thermal inhibitor in the polymer will typically range from about 0 to 15 weight percent, such as from about 1 to 8 weight percent, with weight percent being based on the total weight of the polymer.

In some instances, the polymer includes additives standardly known in the art. These additives can include less than about 15 weight percent of the polymer. For example, a release agent can be added. Examples include γ-aminopropyl triethoxysilane, γ-mercaptopropyl trimethoxysilane, and polydimethylsiloxane derivatives. In some instances, the release agent or agents will be present in an amount of between about 2 and 3 weight percent. In some examples, a portion of the release agent is particulate, and would be in particulate form even after the polymer is cured.

In certain instances, to improve shelf life or storage stability of the polymer prior to cure as well as to increase thermal and oxidative stability of the cured polymer, one or more stabilizers or anti-oxidants can be included in the polymer.

Examples of suitable stabilizers include tertiary amines such as diethylethanolamine and trihexylamine; hindered amines; organic phosphites; hindered phenols; mixtures thereof; and the like. Some particular examples of antioxidants that can be used include propionates such as octadecyl-3-(3',5'-di-tert-butyl-4'-hydroxyphenyl)propionate and hydrocinnamates such as thiodiethylene bis(3,5-di-tert-butyl-4-hydroxy)hydrocinnamate and tetrakis[methylene(3,5-di-tert-butyl-4-hydroxyhydrocinnamate)]methane. Suitable commercially available antioxidants include IRGANOX® 1010, 1035, 1076, and 1222, manufactured by BASF.

UV absorption agents can also be included including those commercially available from Ciba Geigy as TINUVIN P234, 320, 326, 327, 328, 329, and 213.

Still other additives or components that may appear in the final coating include pigments, lubricants, wetting agents, adhesion promoters and leveling agents. These additives may be present in an effective amount that is usual for the additive when used in optical fiber coatings or protective materials.

In some instances, the viscosity of the coating composition is between about 1,000 and 10,000 centipoises (cps) as measured using a Brookfield viscometer No. 34 spindle at 6 rpm and 25° C.; however, viscosity can be adjusted. An example viscosity between 4000 and 8000 cps is suitable for optical ribbon matrix and secondary coating applications.

The polymer can be formulated using techniques and methods that are standard in the art.

In some instances, in addition to high Tg and high elongation, the polymer can have numerous additional characteristics that render them suitable for use as optical ribbon coating materials. For example, some compositions will typically have an equilibrium modulus after cure of greater than about 1 MPa and as high as 60 MPa or more. For some example matrix coatings, an equilibrium modulus of 1 to 20 is suitable and for secondary coatings 20 to 60 is suitable. Equilibrium modulus can be measured using a dynamic mechanical analyzer. It has been determined that the use of a radiation curable oligomer comprising three or four radiation curable functionalities imparts a higher equilibrium modulus to the polymer than does a radiation curable oligomer comprising only two radiation curable functionalities. Because there are more functional groups on the present oligomers, there is a higher crosslink density and hence a higher equilibrium modulus. The higher the crosslink density the "harder" the coating and the harder it will be for water, oil and the like to penetrate the coating. Thus, in certain instances, the polymer is suitable for applications in which water, oil, etc. penetration is not desired; in contrast, a difunctional oligomer may not provide this desired characteristic.

In some instances, the Youngs modulus of the polymer, when cured, is greater than about 400 MPa, typically from 500 to 1200 MPa. Youngs modulus is also derived from dynamic mechanical analysis.

In some instances, the Secant modulus of the polymer, when cured, is greater than about 300 MPa, typically from 300 to 1000 MPa. Secant modulus is measured using an Instron according to ASTM D-882.

In some instances, the Tensile stress at break of the polymer, when cured, is greater than about 22 MPa, typically between 25 and 50 MPa. Tensile stress is measured at 25° C. using an Instron according to ASTM D-882.

In some instances, the polymer excludes unsaturated substituted siloxane adhesion promoters and/or the adhesion promoters, for example, as described in U.S. Pat. Nos. 5,977,202; 6,316,516; and 6,355,751. In some instances, the polymer does not include a phospholipid nor a chromaphoric indicator.

The polymer (e.g., VES) can be molded into a variety of shapes and tools, such as a ball, wiper plug, open hole packer, swab cups, and/or other shapes and tools, or components thereof.

In some instances, the polymer may swell when exposed to diesel and/or other hydrocarbons in the wellbore. To prevent or delay swelling, the following methods and compounds could be used to form a cover on the molded shape.

In certain instances, a hydrocarbon resistant shell can be overmolded using a 2K molding process that applies an elastomeric layer including any one of several recognized fuel resistant elastomers. Examples include Nitrile (NBR), Hydrogenated Nitrile (HNBR), Urethane, Chloroprene (CR), Polyepichlorohydrin (ECH, ECO, GECO) or Fluoropolymer (FKM, FFKM).

In certain instances, a hydrocarbon resistant shell can be applied using a dip or spray process that utilizes a liquid elastomeric material. This could be a solvent borne solution of any of the compositions referenced above. It could also refer to a liquid reactive polymer such as a castable urethane or rubber modified epoxy.

In certain instances, a hydrocarbon resistant shell could also be applied using a thermoplastic material such as a pure or modified polyamide, PEEK, Acetal, PBT, a fluoroplastic (THV, FEP), thermoplastic urethane (TPU) or a fuel resistant thermoplastic vulcanizate (TPV).

In certain instances, additional components can be used in a variety of composite configurations with the polymer. In some instances, at least one additional component in a composite structure is used with the polymer. In some instances, at least one additional component is used to cover at least a portion of the surface of the polymer. For example, the at least one additional component is used as a substantial portion of a protective cover of the polymer for providing chemical resistance. Such composite structures (i.e. a chemical resistant surface layer, coating, or other) would provide protection from liquids or gases that may encounter the polymer including but not limited to those originating from a well (hydrocarbons, Hg, $H_2S$ or other fluids) or chemical treatments used in the completion and operation of the well (amines, acids, etc.). For example, chemical treatments can include oxygen scavengers, scale inhibitors, Biocides, hydrogen sulfide scavengers, Iron sulfide dissolvers, and corrosion inhibitors. In some examples, the at least one additional component is used as a substantial portion of a protective cover of the polymer for providing protection against mechanical damage (compression, tension, shear, abrasion, impact, etc.). In some instances, a coating or cover protects a polymer ball plug from erosion from proppant, slurry, or other harmful material passing through a wellbore. Similarly, a coating or cover can protect the plug from wear while passing through a tubing or wellbore. In some instances, a coating or cover can protect an outermost surface of a packer from damage while traveling through a casing or wellbore. Such composite structures (i.e. a mechanical resistant surface layer, coating, or other) would provide protection from sources of kinetic energy liquids that may encounter the polymer including in the completion and operation of the well (amines, acids, etc.). In some instances, a well tool comprises soluble/corrodible components (i.e. polymers, galvanic metals, salts) that aid in the removal of the well tool. In some instances, the tool comprises weighting agents (i.e. metal cores, sands, minerals such as barium sulfite or iron oxide, other) or lower density components (i.e. gases, foaming agents, hollow spheres) to aid in the control of the overall tool's density. In some examples, a metal core of a polymer plug element could be used to aid the plug element in withstanding high stress of high pressure pumping operations. In certain instances, the density of a tool is substantially matched to the density of a pumping fluid which enables its proper transport and placement along a lateral segment of a wellbore—neutral buoyance avoids undesired settling, trapping, or resistance to pumping of said tool. In some instances, the composite structure of the tool comprises magnets which aid in its proper transport and placement at a designated location. For example, magnets promote the attraction of a tool to another tool for the purpose of facilitating placement and/or the repulsion of the tool to another tool for the purpose of avoiding improper placement. In some instances, magnets are used to signal a tool with GMR sensors, and/or RFID tags embedded in the tool (e.g., a polymer ball plug) signal a sensor on another tool as the tool passes the other tool. Some examples of composite structures include balls. In some instances, the composite structure includes more than one of the above-mentioned additional components, for example, to impart more than one functionality.

All references to the Periodic Table of the Elements herein shall refer to the Periodic Table of the Elements, published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight.

The term "polymer", includes both conventional homopolymers, that is, homogeneous polymers prepared from a single monomer, and copolymers (interchangeably referred to herein as interpolymers), meaning polymers prepared by reaction of at least two monomers or otherwise containing chemically differentiated segments or blocks therein even if formed from a single monomer. The term "crystalline" if employed, refers to a polymer or polymer block that possesses a first order transition or crystalline melting point (Tm) as determined by differential scanning calorimetry (DSC) or equivalent technique. The term may be used interchangeably with the term "semicrystalline". The term "amorphous" refers to a polymer lacking a crystalline melting point.

Test Methods
Differential Scanning Calorimetry (DSC)

Differential Scanning calorimetry is performed on a TA Instruments (New Castle, Del., United States) Q1000 DSC equipped with an RCS cooling accessory and an auto sampler. A nitrogen purge gas flow of 50 ml/min is used. The sample is pressed into a thin film and melted in the press at about 190° C. and then air-cooled to room temperature (25° C.). About 3-10 mg of material is then cut, accurately weighed, and placed in a light aluminum pan (ca 50 mg) which is later crimped shut. The thermal behavior of the sample is investigated with the following temperature profile: the sample is rapidly heated to 190° C. and held isothermal for 3 minutes in order to remove any previous thermal history. The sample is then cooled to −90° C. at 10° C./min cooling rate and held at −90° C. for 3 minutes. The sample is then heated to 150° C. at 10° C./min heating rate. The cooling and second heating curves are recorded.

Dynamic Mechanical Thermal Analysis (DMTA)

The dynamic mechanical measurements (loss and storage modulus vs. temperature) are measured on TA instruments ARES. The dynamic modulus measurements are performed in torsion on a solid bar of ca. 2 mm thickness, 5 mm wide and ca. 10 mm in length. The data is recorded at a constant frequency of 10 rad/s and at a heating/cooling rate of 5° C./min. The temperature sweeps are performed from −50 to 250 C at 5° C./min. Constant temperature dynamic frequency sweeps in the frequency range of 0.1 to 100 rad/s are performed under nitrogen purge using a TA Instruments Advanced Rheometric Expansion System (ARES) equipped with 25 mm parallel plates. TPO or TPV samples are die cut from compression or injection-molded plaques into 3 mm thick×1 inch diameter circular specimens. The sample is placed on the plate and allowed to melt for 5 minutes. The plates are then closed to 2.1 mm, the sample trimmed, and the gap closed to 2.0 mm before starting the test. The method has an additional 5 minute delay built-in to allow for temperature equilibration. Both TPO and TPV samples are measured at 230° C. The strain amplitude is held constant at 10%. The stress response is reported as the storage moduli (G'), loss moduli (G") and the complex viscosity ($\eta^*$).

Shore A Hardness

Hardness measurements are taken with a Shore A type durometer. The durometer is placed onto a plaque of ~3 mm thickness, prepared by compression or injection molding.

Compression Set

Compression set is measured according to ASTM D 395 at 70° C. and 120° C. Pucks of 29 mm (±0.5 mm) are extracted from the compression or injection molded plaques of ~3 mm thickness. For each sample, four pucks are inspected for notches, uneven thickness and inhomogeneity, and are stacked such that the total height is 12.5 mm (±0.5 mm), equating to compressive strain of 25%. Compression set is performed on two specimens for each sample at the two temperatures. The stacked pucks are placed in the compressive device and locked into place; the apparatus is then placed at the appropriate temperature for specified time (22 hrs for 70° C. and 72 hrs for 120° C.). In this test the stress is released at the test temperature and the thickness of the sample is measured after a 30 min. equilibration period at room temperature.

Compression set is a measure of the degree of recovery of a sample following compression and is calculated according to the equation $CS=(H0-H2)/(H0-H1)$; where H0 is the original thickness of the sample, H1 is the thickness of the spacer bar used and H2 is the final thickness of the sample after removal of the compressive force.

Stress-Strain Properties

Tensile properties are measured at room temperature following ASTM D-412, on micro-tensile specimens that are die cut from the same compression or injection molded plaques in the mill direction. The tensile strain is calculated from the ratio of the increment of the length between clamps to the initial gauge length. The tensile stress is determined from dividing the tensile load by the initial cross section of the sample.

Xylene Soluble Fractionation Analysis

A weighed amount of resin is dissolved in 200 ml o-xylene under reflux conditions for 2 hours. The solution is then cooled in a temperature controlled water bath to 25° C. to allow the crystallization of the xylene insoluble (XI) fraction. Once the solution is cooled and the insoluble fraction precipitates from the solution, the separation of the xylene soluble (XS) fraction from the xylene insoluble fraction is done by filtration through a filter paper. The remaining o-xylene solution is evaporated from the filtrate. Both XS and XI fractions are dried in a vacuum oven at 100° C. for 60 min and then weighed. Alternatively, if the solution crystallization temperature of the soft block polymer is above room temperature, the fractionation step can be carried out at a temperature 10-20° C. above the soft blocks crystallization temperature but below the hard blocks crystallization temperature. The temperature of separation can be determined by TREF or CRYSTAF measurement as described by reference, TREF and CRYSTAF technologies for Polymer Characterization, Encyclopedia of Analytical Chemistry. 2000 Issue, Pages 8074-8094. This fractionation can be carried out in a laboratory heated dissolution and filtration apparatus or a fractionation instrument such as the Preparatory mcg (available from Polymer Char, Valencia, Spain).

Melt Index and Melt Flow Rate:

Melt Index, or 12 is measured in grams per 10 minutes, is done in accordance with ASTM D 1238, condition 190° C./2.16 kg. The MFR of the PP resins is measured in accordance to ASTM D 1238, condition 230° C./2.16 kg.

Shore A Hardness

Shore A hardness is carried out according to ASTM D 2240. Compression set is measured according to ASTM D 395 at 70° C. Tensile strength and ultimate elongation are carried out according to ASTM D-412.

Atomic Force Microscopy (AFM)

Samples are polished under cryogenic conditions using a Leica UCT/FCS microtome operated at −120° C. Some thin sections (about 160 nm) are cut from the sample and placed on the mica surface for AFM analysis. Topography and phase images are captured at ambient temperature by using a Digital Instruments (now Veeco) Multi-Mode AFM equipped with a NanoScope IV controller. Nano-sensor probes with a spring constant of 55 N/m and a resonant frequency in the vicinity of 167 kHz are used for phase imaging. The samples are imaged at a frequency of 0.5-2 Hz and a set point ratio of ~0.8.

Gel Content

Gel content is measured by small scale Soxhlet extraction method. Samples are cut into small pieces ranging from about 35 mg to 86 mg. Three pieces of each sample are individually weighed to 4-place accuracy on a top-loading electronic analytical balance. Each piece is placed inside a small cylinder composed of aluminum window screen. The ends of the cylinders are closed with ordinary paper staples. Six aluminum cylinders are placed inside one fritted glass extraction thimble. The thimbles are placed in jacketed Soxhlet extractors and extracted overnight with refluxing xylenes. At the end of the minimum 12 hour extraction, the still warm thimbles are quenched in methanol. The methanol precipitates the gel and makes it easier to remove the gels intact from the cylinders. The cylinders containing precipitated gels are purged briefly with nitrogen to drive off free methanol. The gels are removed from the aluminum cylinders with forceps and placed on aluminum weighing pans. The pans with gels are vacuum dried for 1 hour at 125° C. The dried, cool gels are removed from aluminum weighing pans and weighed directly on the top-loading analytical balance. The dry extracted gel weight is divided by the starting weight to give the percent gel content.

There is a broad class of viscoelastic polymers—including dense, foamed and comminuted materials—that respond differently under different types of stresses or impacts. These materials differ from traditional polymers in that some of their molecular bonds are permanent and others temporary, allowing the materials to exhibit unique properties. A viscoelastic silicone rubber is one example within the broad class of these viscoelastic polymers. Details on this broad class of viscoelastic polymers are described, for example, in US 2009/0286910, entitled Viscoelastic and Dilatant Composition, Device and Method of Use and Manufacture and US 2012/0329896, entitled Viscoelastic Silicon Rubber Compositions.

The polymer is solid, possessing an equilibrium shape to which it returns in the absence of imposed stresses. Unlike traditional polymers, however, the present polymer exhibits time-dependent stiffness: it is stiffer at short timescales as compared to long timescales. Accordingly, the polymer is relatively stiff and elastic when subjected to brief stresses, which causes it to resist changing shape. In contrast, when subjected to lingering stresses, the polymer is relatively soft and accommodating and gradually changes shape.

In view of the discussion above, certain aspects encompass a well system including a well tubing and a drop plug element. The well tubing includes an internal plug seat in an internal flow path of the tubing, and at least one of the plug seat or the drop plug element includes a polymer. The polymer is deformable, having a first stiffness when subjected to a first strain rate, to allow the drop plug element to pass through the plug seat. The polymer resists deformation, having a second, higher stiffness when subjected to a second, higher strain rate, to resist allowing the plug element to pass through the plug seat and to seal the plug element and plug seat.

Certain aspects encompass a method including deforming, in response to a first strain rate, a polymer of a drop plug element or a plug seat in an internal flow path of a well tubing to allow the drop plug element to pass through the plug seat, the polymer having a first stiffness in response to the first strain rate of the polymer. The method includes activating a well tool in the well tubing due to a pressure increase in the well tubing while resisting deformation of the polymer to seal the plug seat and the drop plug element and retain the drop plug element at the plug seat. The method includes resisting deformation of the polymer, in response to a second, higher strain rate, to seal the plug seat and the drop plug element and retain the drop plug element at the plug seat, the polymer having a second, higher stiffness in response to the second, higher strain rate.

Certain aspects encompass, a well system including a plug seat in an enclosed fluid path and a plug to engage and pass the plug seat. The plug or plug seat includes a polymer that deforms more readily at a first stiffness when subjected to a first strain rate than at a second, higher stiffness when subjected to a second, higher strain rate.

The aspects above can include some, none, or all of the following features. The stiffness of the polymer is responsive to a fluid characteristic of fluid in the flow path to have the first stiffness when subjected to the first strain rate and the second, higher stiffness when subjected to the second, higher strain rate, where the fluid characteristic is selected from the group consisting of pressure, flow rate, temperature, and fluid density. The well tubing includes multiple internal plug seats in the flow path of the tubing, at least one of the drop plug element or the multiple internal plug seats includes the polymer. Two or more plug seats of the multiple internal plug seats are the same size. The drop plug element includes the polymer and has a largest outer diameter larger than a smallest inner diameter of the plug seat. The drop plug element includes a core surrounded by the polymer. The core includes one or more of a disintegrating material, sand, salt, or a magnet. The internal plug seat includes a ring of the polymer with a smallest inner diameter smaller than a largest outer diameter of the drop plug element. The internal plug seat is coupled to a shifting sleeve in the well tubing where the shifting sleeve shifts along a length of the well tubing when the drop plug element seals to the internal plug seat. The shifting sleeve shifts to open a flow port in the well tubing. The well system includes a ring adjacent the internal plug seat to block the drop plug element from passing the internal plug seat. The ring includes a compressible C-ring. The drop plug element is a ball, and the internal plug seat is a ball seat. The polymer is a viscoelastic polymer. The viscoelastic polymer is a silicone rubber polymer. The first strain rate and the second, higher strain rate depend on a fluid characteristic selected from the group consisting of pressure, flow rate, temperature, and fluid density. Deforming, in response to a first strain rate, a polymer includes deforming a ring portion of the plug seat, the ring portion including the polymer. Deforming, in response to a first strain rate, a polymer includes deforming at least a portion of the drop plug element that engages the plug seat. The method includes restoring the polymer to an original, molded shape after deforming, in response to the first strain rate, the polymer. The method includes deforming again, in response to the first strain rate, the polymer of the drop plug element or a second plug seat in the internal flow path of the well tubing to allow the drop plug element to pass through the second plug seat. The method includes resisting deformation of the polymer, in response to the second, higher strain rate, to seal the drop plug element and a second plug seat in the internal flow path of the well tubing and retain the drop plug element at the second plug seat, the drop plug element or the second plug seat including the polymer. The polymer is responsive to a fluid characteristic of fluid in the fluid path, the fluid characteristic selected from the group consisting of pressure, flow rate, temperature, and fluid density.

Certain aspects encompass a method including initially plugging a fluid loss opening of a well with a plurality of discrete stop loss elements, the stop loss elements including a polymer, the polymer, while initially plugging the fluid loss opening, resisting deformation at an initial stiffness in response to an initial strain rate of the polymer to produce a specified initial pressure signal. The method includes continuing to plug the fluid loss opening with the plurality of discrete stop loss elements, the polymer, while continuing to plug the fluid loss opening, deforming at a subsequent, lower stiffness in response to a subsequent, lower strain rate to produce a subsequent, different specified pressure signal.

Certain aspects encompass a well treatment for treating a well. The well treatment includes a plurality of discrete stop loss elements to seal a fluid loss opening of a well. The discrete stop loss elements include a polymer resistive to deformation with an initial stiffness in response to an initial strain rate of the polymer to produce a specified initial pressure signal and deformable with a subsequent, lower stiffness in response to a subsequent, lower strain rate of the polymer to produce a subsequent, different specified pressure signal.

The aspects above can include some, none, or all of the following features. The method includes sealing the fluid loss opening with a sealing material within the plurality of discrete stop loss elements. The subsequent, lower strain rate is a substantially constant strain to allow the polymer to deform at the subsequent, lower stiffness. Initially plugging a fluid loss opening of a well with a plurality of discrete stop loss elements includes clumping the plurality of stop loss elements together at the fluid loss opening. The method includes continuing to plug the fluid loss opening with the plurality of discrete stop loss elements, the polymer, while continuing to plug the fluid loss opening, resisting deformation at the initial stiffness in response to the initial strain rate of the polymer. Initially plugging a fluid loss opening of a well with a plurality of discrete stop loss elements includes initially plugging a fluid loss opening of a well tool with a plurality of discrete stop loss elements. The method includes passing the plurality of discrete stop loss elements through the fluid loss opening to unplug the fluid loss opening, the polymer deforming at the subsequent, lower stiffness in response to a constant applied stress on the polymer. The method includes forming the polymer of the discrete stop loss elements by combining, in the well, materials including the discrete stop loss elements for in-well curing. The method includes flowing the plurality of discrete stop loss elements in a treatment fluid to the fluid loss opening, the treatment fluid comprising plugging material. The method further includes, while initially plugging the fluid loss opening with discrete stop loss elements, allowing the plugging material of the treatment fluid to cure in the fluid loss opening to plug the fluid loss opening. Allowing the plugging material of the treatment fluid to cure in the fluid loss opening to plug the fluid loss opening includes allowing cement to cure in the fluid loss opening to permanently plug the fluid loss opening. The fluid loss opening of the well is selected from the group consisting of a fluid loss opening in a well casing, a fluid loss opening in a wellbore wall of the well, and a fluid loss opening of a well tool. The initial strain rate is a substantially oscillating strain rate and the subsequent, lower strain rate is a substantially constant strain rate. The well treatment includes a pressure sensor of the well to assess pressure signals in the well. The discrete stop loss elements include a filler material within the stop loss elements. The filler material is at least one of sand, proppant, fiber, cement, or chemical treatment.

Certain aspects encompass a well seal tool including a base tubing and a seal element carried on an exterior of the base tubing. The seal element includes a polymer changeable between a compressed state and a sealing state, the seal element having a first stiffness in response to a first strain rate of the polymer and a second, substantially higher stiffness in response to a second, higher strain rate of the polymer.

Certain aspects encompass a method including expanding a polymer of a seal element of a well seal tool from an initial, compressed state to a second, sealing state while the well seal tool is in a wellbore, while sealing with the seal element, providing a first stiffness with the polymer in response to a first strain rate of the polymer, and, while sealing with the seal element, providing a second, substantially higher stiffness with the polymer in response to a second strain rate of the polymer.

Certain aspects encompass a well seal tool including a polymer carried on a base tubing, where the polymer expands to a sealing shape when exposed to a specified strain rate.

The aspects above can include some, none, or all of the following features. The well seal tool includes a release system to allow the polymer to expand to the sealing state and seal against a wall of a wellbore or another tubular element into which the base tubing is inserted. The release system includes a release element mounted to the base tubing and a latch bonded to the polymer, where the release element retains the latch to hold the polymer in the compressed state and releases the latch in response to a signal. The signal is selected from the group consisting of an electrical signal, a mechanical signal, and an acoustic signal. The release system includes an actuator connected to the latch to return the latch to the release element. The well seal tool includes a track on the base tubing to guide movement of the latch. The well seal tool includes a second polymer and a second release system oriented opposite the first mentioned polymer and the first mentioned release system. The first mentioned polymer holds pressure in the wellbore or other tubular element from a first direction, and the second polymer holds pressure in the wellbore or other tubular element from a second, opposite direction. The well seal tool includes a swellable rubber about the base tubing and exterior to the polymer. The polymer includes at least one molded ring about the base tubing between the base tubing and the swellable rubber. The swellable rubber wraps about the base tubing over the polymer to retain the polymer in its compressed state on the base tubing, and the polymer expands to the sealing state when the swellable rubber subjects the first strain rate on the polymer. The swellable rubber includes a string of swellable rubber material wound about the base tubing over the polymer. Expanding the polymer of a seal element of a well seal tool from an initial, compressed state to a second, sealing state while the well seal tool is in a wellbore includes releasing a latching mechanism retaining the polymer in the initial, compressed state. The method includes pressing the polymer against walls of the wellbore. Expanding a polymer of a seal element of a well seal tool from an initial, compressed state to a second, sealing state while the well seal tool is in a wellbore includes reinforcing a swellable rubber about the viscoelastic polymer material to engage and seal the swellable rubber against walls of the wellbore. The method includes winding a string of swellable rubber over the polymer in the initial, compressed state. Expanding a polymer of a seal element of a well seal tool from an initial, compressed state to a second, sealing state while the well seal tool is in the wellbore includes winding a retention cord over the polymer in the initial, compressed state. The polymer deforms at the specified strain rate and resists deformation at a second, higher strain rate. The specified strain rate depends on a strain characteristic selected from the group consisting of pressure, temperature, fluid flow rate, and fluid density.

Certain aspects encompass a wellbore cementing plug that includes a plug element including a polymer. The polymer is deformable at a first stiffness when subjected to a first strain rate to allow the plug element to pass through a wellbore while sealing against passage of cement past the plug element. The polymer resists deformation at a second, higher stiffness when subjected to a second, higher strain rate to resist allowing the plug element to pass through the wellbore while sealing against passage of cement past the plug element.

Certain aspects encompass a method including deforming a polymer of a well plug element having a first stiffness in response to a first strain rate of the polymer to allow the well plug element and cement in a wellbore to pass through the wellbore while sealing against passage of cement past the well plug element. The method includes gripping with the polymer of the well plug element having a second, higher stiffness against movement of the well plug element through the wellbore in response to a second, higher strain rate of the polymer while sealing against passage of cement past the well plug element.

Certain aspects encompass a wellbore plug including a plug element. The plug element includes a polymer deformable at a first stiffness in response to a first strain rate to allow the plug element to pass through a wellbore and seal against passage of cement past the plug element, and the polymer resists deformation at a second, higher stiffness in response to a second, higher strain rate to allow the plug element to seal the wellbore against passage of cement past the plug element and resist movement of the plug element and cement through the wellbore.

The aspects above can include some, none, or all of the following features. The stiffness of the polymer is responsive to a fluid characteristic of a fluid in the wellbore to have the first stiffness when subjected to the first strain rate and the second, higher stiffness when subjected to the second, higher strain rate, the fluid characteristic selected from the group consisting of pressure, flow rate, temperature, and fluid density. The plug element comprises a plurality of discrete polymer elements that stick together. The plug element includes a single mass of the polymer, a cross-section of the single mass of the polymer in an initial, sealing state being equal to or larger than a cross-section of the wellbore. The plug element includes a core and fins extending radially from the core to walls of the wellbore, the fins or the core or both including the polymer. The core element is cylindrical and the fins are disc-shaped fins about the core. The wellbore cementing plug includes a second plug element in the wellbore, the second plug element including the polymer and sealing against passage of cement past the second plug element, the cement in the wellbore between the first mentioned plug element and the second plug element. The polymer is a viscoelastic polymer. The viscoelastic polymer is a silicone rubber polymer. The first strain rate and the second, lower strain rate depend on a fluid characteristic of a fluid in the wellbore, the fluid characteristic selected from the group consisting of pressure, flow rate, temperature, and fluid density. The method includes deforming the polymer of a second well plug element having the first stiffness in response to the first strain rate of the polymer to allow the second well plug element and cement in the wellbore between the first mentioned well plug element and the second well plug element to pass through the wellbore while sealing against passage of cement past the second well plug element, and gripping with the polymer of the second well plug element having the second, higher stiffness against movement of the second well plug element through the wellbore in response to the second, higher strain rate of the polymer while sealing against passage of cement past the second well plug element. Sealing against passage of cement pass the well plug element includes resisting fluidic communication between the cement and fluid in the wellbore on an opposite side of the well plug element. Gripping the polymer of the well plug element having a second, higher stiffness against movement of the well plug element through the wellbore in response to a second, higher strain rate of the polymer includes activating a well tool in the wellbore with the well plug element. Deforming a polymer of a well plug element having a first stiffness in response to a first strain rate of the polymer to allow the well plug element and cement in the wellbore to pass through the wellbore while sealing against passage of cement past the well plug element includes deforming polymer fins of a cement wiper. Sealing against passage of cement past the well plug element includes sealing against passage of cement past a plurality of discrete polymer elements of the well plug element by allowing the plurality of discrete polymer elements to stick together and seal the wellbore. The method includes activating a well tool in the wellbore due to a pressure increase in the wellbore while gripping with the polymer of the well plug element against movement of the well plug element through the wellbore. The plug element is a cement wiper including a composite core and fins including the polymer. The plug element is a spherical mass of the polymer with an initial, sealing shape diameter greater than a diameter of the wellbore or a diameter of a restriction in the wellbore. The plug element is a plurality of discrete polymer elements that stick together. The polymer is a viscoelastic silicone rubber polymer.

A number of embodiments have been described. Nevertheless, it will be understood that various modifications may be made. Accordingly, other embodiments are within the scope of the following claims.

What is claimed is:

1. A well system, comprising:
   a well tubing comprising an internal plug seat in an internal flow path of the tubing; and
   a drop plug element, at least one of the plug seat or the drop plug element comprises a polymer, the polymer comprising a viscoelastic polyurethane, a viscoelastic phenolic resin or a viscoelastic epoxy resin, wherein the polymer has:
   a glass transition temperature in a range from about 78 to 156° C.,
   a ratio of Moduli of Glassy to Rubbery State log $((E'_g)/(E'_r))$ in a range from 0.5 to 2, wherein $E'_g$ is a glassy modulus of the polymer and $E'_r$ is a rubbery modulus of the polymer,
   a loss modulus in a range from greater than about 80 MPa to 240 MPa for a tan δ peak equal to 0.2, and
   a storage modulus in a range from greater than about 400 to 1200 MPa; and
   the polymer is deformable, having a first stiffness when subjected to a first strain rate, to allow the drop plug element to pass through the plug seat, and
   the polymer resists deformation, having a second, higher stiffness when subjected to a second, higher strain rate, to resist allowing the plug element to pass through the plug seat and to seal the plug element and plug seat.

2. The well system of claim 1, where the stiffness of the polymer is responsive to a fluid characteristic of fluid in the flow path to have the first stiffness when subjected to the first strain rate and the second, higher stiffness when subjected to the second, higher strain rate, the fluid characteristic selected from the group consisting of pressure, flow rate, temperature, and fluid density.

3. The well system of claim 1, where the well tubing comprises multiple internal plug seats in the flow path of the tubing, at least one of the drop plug element or the multiple internal plug seats comprises the polymer.

4. The well system of claim 3, where two or more plug seats of the multiple internal plug seats are the same size.

5. The well system of claim 1, where the drop plug element comprises the polymer, the drop plug element having a largest outer diameter larger than a smallest inner diameter of the plug seat.

6. The well system of claim 5, where the drop plug element comprises a core surrounded by the polymer.

7. The well system of claim 6, where the core comprises one or more of a disintegrating material, sand, salt or a magnet.

8. The well system of claim 1, where the internal plug seat comprises a ring of the polymer with a smallest inner diameter smaller than a largest outer diameter of the drop plug element.

9. The well system of claim 1, where the internal plug seat is coupled to a shifting sleeve in the well tubing where the shifting sleeve shifts along a length of the well tubing when the drop plug element seals to the internal plug seat.

10. The well system of claim 9, where the shifting sleeve shifts to open a flow port in the well tubing.

11. The well system of claim 9, further comprising a ring adjacent the internal plug seat to block the drop plug element from passing the internal plug seat.

12. The well system of claim 11, where the ring comprises a compressible C-ring.

13. The well system of claim 1, where the drop plug element is a ball, and the internal plug seat is a ball seat.

14. A method, comprising:
   deforming, in response to a first strain rate, a polymer of a drop plug element or a plug seat in an internal flow path of a well tubing to allow the drop plug element to pass through the plug seat, the polymer having a first stiffness in response to the first strain rate of the polymer, the polymer comprising a viscoelastic polyurethane, a viscoelastic phenolic resin or a viscoelastic epoxy resin, wherein the polymer has:
   a glass transition temperature in a range from about 78 to 156° C.,
   a ratio of Moduli of Glassy to Rubbery State log $((E'_g)/(E'_r))$ in a range from 0.5 to 2, wherein $E'_g$ is a glassy modulus of the polymer and $E'_r$ is a rubbery modulus of the polymer,
   a loss modulus in a range from greater than about 80 MPa to 240 MPa for a tan δ peak equal to 0.2, and
   a storage modulus in a range from greater than about 400 to 1200 MPa; and
   resisting deformation of the polymer, in response to a second, higher strain rate, to seal the plug seat and the drop plug element and retain the drop plug element at the plug seat, the polymer having a second, higher stiffness in response to the second, higher strain rate.

15. The method of claim 14, where the first strain rate and the second, higher strain rate depend on a fluid characteristic selected from the group consisting of pressure, flow rate, temperature, and fluid density.

16. The method of claim 14, where deforming, in response to the first strain rate, a polymer comprises deforming a ring portion of the plug seat, the ring portion comprising the polymer.

17. The method of claim 14, where deforming, in response to the first strain rate, a polymer comprises deforming at least a portion of the drop plug element that engages the plug seat.

18. The method of claim 14, further comprising activating a well tool in the well tubing due to a pressure increase in the well tubing while resisting deformation of the polymer to seal the plug seat and the drop plug element and retain the drop plug element at the plug seat.

19. The method of claim 14, further comprising restoring the polymer to an original, molded shape after deforming, in response to the first strain rate, the polymer.

20. The method of claim 14, further comprising deforming again, in response to the first strain rate, the polymer of the drop plug element or a second plug seat in the internal flow path of the well tubing to allow the drop plug element to pass through the second plug seat.

21. The method of claim 14, further comprising resisting deformation of the polymer, in response to the second, higher strain rate, to seal the drop plug element and a second plug seat in the internal flow path of the well tubing and retain the drop plug element at the second plug seat, the drop plug element or the second plug seat comprising the polymer.

22. A well system, comprising:
   a plug seat in an enclosed fluid path; and
   a plug to engage and pass the plug seat, the plug or plug seat comprising a viscoelastic silicon rubber polymer that deforms more readily at a first stiffness when subjected to a first strain rate than at a second, higher stiffness when subjected to a second, higher strain rate, wherein the polymer comprises a viscoelastic polyurethane, a viscoelastic phenolic resin or a viscoelastic epoxy resin, wherein the polymer has:
- a glass transition temperature in a range from about 78 to 156° C.,
- a ratio of Moduli of Glassy to Rubbery State log $((E'_g)/(E'_r))$ in a range from 0.5 to 2, wherein $E'_g$ is a glassy modulus of the polymer and $E'_r$ is a rubbery modulus of the polymer,
- a loss modulus in a range from greater than about 80 MPa to 240 MPa for a tan δ peak equal to 0.2, and
- a storage modulus in a range from greater than about 400 to 1200 MPa.

23. The well system of claim 22, where the polymer is responsive to a fluid characteristic of fluid in the fluid path, the fluid characteristic selected from the group consisting of pressure, flow rate, temperature, and fluid density.

* * * * *

UNITED STATES PATENT AND TRADEMARK OFFICE
CERTIFICATE OF CORRECTION

PATENT NO. : 9,677,370 B2
APPLICATION NO. : 14/414667
DATED : June 13, 2017
INVENTOR(S) : William Mark Richards et al.

Page 1 of 2

It is certified that error appears in the above-identified patent and that said Letters Patent is hereby corrected as shown below:

In the Specification

In Column 23, Lines 51 and 52, after "dihydric phenois," delete "chlorophenols" and please insert --chlorphenols--

In Column 23, Line 63, after "2-bromo-4-methylphenol;" delete "2-allylphenol;" and please insert --2-allyphenol;--

In Column 23, Line 67 and Column 24, Line 1, after "1,8-dihydroxyanthraquinone;" delete "1,6-dihydroxynaphthalene;" and please insert --1,6-dihydroxnaphthalene;--

In Column 25, Line 9, after "triethylene" delete "tetramine" and please insert --tetrarnine--

In Column 25, Lines 64 and 65, after "cyclohexanedithiol," delete "2-mercaptoethyl-2,3-dimercaptosuccinate," and please insert --2-mercaptoethyl-2,3-dimercaptosuceinate,--

In Column 26, Lines 12 and 13, after "amino-4,6-dithiol-sym-triazine," delete "alkoxy-4,6-dithiol-symtriazine," and please insert --alkoxy-4,6-dithiol-sym-triazine,--

In Column 36, Line 20, delete "2,6-tolylene" and please insert --2,6-toylene--

In Column 36, Lines 51 thru 55, delete "limited to hydroxyalkyl(meth)acrylates such as hydroxyethyl(meth)acrylate, hydroxypropyl(meth)acrylate, hydroxybutyl(meth)acrylate, 2-hydroxy-3-phenyloxypropyl (meth)acrylate, 1,4-butanediol mono(meth)acrylate, 4-hydroxycyclohexyl (meth)acrylate, 1,6-hexanediol" and please insert --limited to hydroxyalkyl(meth)acrylates such as hyd roxyethyl(meth)acrylate, hydroxypropyl(meth)acrylate, hydroxybutyl(meth)acrylate, 2-hyd roxy-3-phenyloxypropyl (meth)acrylate, 1,4-butanediol mono(meth)acrylate, 4-hyd roxycyclohexyl (meth)acrylate, 1,6-hexaned iol- --

Signed and Sealed this
Third Day of April, 2018

Andrei Iancu
*Director of the United States Patent and Trademark Office*

CERTIFICATE OF CORRECTION (continued)
U.S. Pat. No. 9,677,370 B2

In Column 38, Line 11, after "be used here." delete "Tetramethylxylylene" and please insert --Tetramethylxylyiene--

In Column 39, Line 57, after "not limited to," delete "ethyleneglycolphenyletheracrylate" and please insert --ethyleneg lycolphenyletheracrylate--

In Column 39, Line 65, after "such as" delete "1,6-hexanedioldiacrylate," and please insert --1,6-hexaned ioldiacrylate,--

In Column 41, Lines 5 thru 6, delete "hydrocinnamate and tetrakis [methylene (3,5-di-tert-butyl-4-hydroxyhydrocinnamate)] methane." and please insert --hydrocin namate and tetrakis [methylene (3,5-di-tert-butyl-4-hydroxyhyd rocinnamate)] methane.--